3,373,172
PHARMACOLOGICALLY ACTIVE 10α-METHYL, 9β-STEROIDS OF THE PREGNANE SERIES
Engbert Harmen Reerink, Pieter Westerhof, and Hendrik Fredrik Louis Scholer, Van Houtenlaan, Weesp, Netherlands, assignors to North American Philips Company, Inc., New York, N.Y., a corporation of Delaware
No Drawing. Continuation-in-part of application Ser. No. 201,824, June 12, 1962, which is a continuation-in-part of application Ser. No. 805,020, Apr. 8, 1959. This application Feb. 7, 1964, Ser. No. 343,233
Claims priority, application Netherlands, Apr. 12, 1958, 226,774
6 Claims. (Cl. 260—397.45)

This invention relates to a novel class of steroids which exhibit important pharmacological properties and/or are useful as intermediates in the preparation of pharmacological active compounds.

This application is a continuation-in-part of our co-pending application Ser. No. 201,824, now Patent No. 3,198,792, which in turn is a continuation-in-part of Ser. No. 805,020 filed April 8, 1959 now abandoned.

All the known pharmacologically active steroids of the normal series which have a methyl substitute at the carbon atom 10 of the nucleus have this substituent in the β position. In general these compounds are characterized in having a substantially flat or planar molecular configuration of the nucleus, with the 10β methyl group projecting from the plane of the nucleus.

It is now well accepted that the pharmacological activity of the compounds of the normal series is attributable to the fact that the steroid molecule is capable of conforming to the configuration of the receptor. As a result, those skilled in the art believed heretofore that steroids of the normal series are highly stereo-specific in their interaction with the receptors. Since, in general, the nuclei of the pharmacologically active compounds of the normal series are substantially flat, it would be expected that the pharmacological activity is connected with a substantially flat structure of the nucleus and therefore it would not be expected that steroids having a substantially non-planar configuration of the nucleus would possess useful pharmacological properties.

A principal object of our invention is to prepare a new and novel class of steroids. This and other objects of our invention will be apparent from the description that follows.

Quite unexpectedly, we have discovered a novel class of steroids which behaves contrary to the aforesaid expectations in the steroid art. In contrast to the normal steroids wherein the methyl at the carbon atom 10 is in the β position and the substituent at the carbon atom 9 is in the α position, in our novel class of steroids, the 10 methyl substituent is in the α position while the substituent at the carbon atom 9 is in the β position.

In addition to what has been mentioned above, with respect to the configuration of the 10 methyl group, and the substituent at the carbon atom 9, there is evidence to indicate that the structure of the nucleus of our novel compounds is non-planar. It is suggested that the nucleus of our novel steroids lies in two planes which intersect at a line drawn through the 8th and 9th carbon atoms of the nucleus. While this is a theory and we do not intend to be bound thereby, nevertheless, the indications are strong that the structure of the nucleus is non-planar. In view of the stereo specificity of the receptors, one would expect that such a deviation in the stereochemical structure of the steroid nucleus would render such steroids incapable of associating with the receptors. Consequently, it is surprising that our novel steroids possess any of the pharmacological properties of the steroids of the normal series.

The steroids of our invention even posses a specificity which manifests itself in a fewer number of pharmacological activities than those possessed by the known corresponding compounds of the normal series, and/or exhibit new properties which are not possessed by the corresponding steroid of the normal series. In some cases, our novel steroids are unexpectedly superior in activities which are possessed in common with the corresponding compound of the normal series. Coupling the novel stereo-chemical configuration of the steroid nucleus with unexpected properties of our novel steroids, it is clear that an entirely new class of steroids has been discovered.

It is believed from all the experimental work accomplished to date that the specific 10α methyl 9β configuration of our novel steroids is the common dominant characteristic which produces the tendency for the highly specific actions thereof. Further, in this respect, the 10α methyl, 9β configuration of the nucleus in cooperation with the other substituents creates the particular properties possessed by our novel steroids. Hence, the configuration of the nucleus in our novel steroids is dominant with respect to the manner in which they differentiate from the steroids of the normal series.

Those novel steroids of the present invention in which the substituents at the carbon atoms 8, 9, 10, 13 and 14 have the same stereo-configuration as those in dihydro-isolumisterone (lumista-4,22-dien-3-one) are designed hereinafter as "retrosteroids." Castells et al., Proc. of the Chemical Society, Jan. 1958, page 7 has shown that dihydroisolumisterone has the configuration 8β, 9β, 10α methyl, 13β, 14α.

All the novel retrosteroids of the present invention exhibit highly specific pharmacological properties with respect to the following activities: parenteral progestational, oral progestational, pregnancy maintaining, deciduoma-inducing, fertility stimulating, anti-tumor, anti-arteriosclerosis, fertility inhibiting, ovulation stimulating, ovulation inhibiting, anti-estrogenic, uterotrophic, anti-uterophic, anabolic, renotrophic, anti-androgenic, pituitary stimulating, pituitary inhibiting, glucocorticoidal, anti-inflammatory, diuretic, etc.

With respect to the highly specific pharmacological propertes exhibited by the retrosteroids in comparison with the corresponding compounds of the normal series, it will be found that the retrosteroids have fewer or none of the properties in common with the corresponding compounds of the normal series and/or the retrosteroids may have one or more pharmacological properties which are not possessed by the corresponding compounds of the normal series. In addition the retrosteroids can be unexpectedly superior in one or more of the pharmacological properties which are common to the corresponding compounds of the normal series. One of the outstanding advantages of our novel retrosteroids is that they can be used to produce a desired pharmacological activity with a substantially reduced number of side effects in comparison with the steroids of the normal series.

To illustrate the differences between our novel retrosteroids and those of the normal series, reference will now be had to comparisons for that purpose.

As previously stated, the retrosteroids of our invention are so different in the scope and specificity of their pharmacological properties that they are not comparable with their corresponding steroids of the normal series. The following examples will make these differences readily apparent.

The compound Epi of French Patent 1,091,734 has no glycogen storage activity and no anti-inflammatory activity while the corresponding retrosteroid of the invention has glycogen storage activity and is not anti-inflammatory.

The 17α-methylandrosta-1,4-diene-17-ol-3-one of British Patent 750,834 is anabolic, non-parenteral progestational, and not pituitary inhibiting. The corresponding retrosteroid is anabolic, parenterally progestationally active and pituitary inhibiting.

Androst-4-ene-3,17-β-diol of United States Patent 2,911,403 is androgenic, anabolic, not pituitary inhibiting, non-thymolytic, non-glucocorticoidal and is not anti-inflammatory, whereas the corresponding retrosteroid is non-androgenic, non-anabolic, renotrophic, pituitary inhibiting, thymolytic, non-gluccorticoidal and is not anti-inflammatory.

The 7-dehydroprogesterone of United States Patent 2,876,237 is progestationally active and metabolizes androgenic, while the corresponding retrosteroid is anti-estrogenic, non-progestationally active, renotrophic and non-androgenic.

17α-ethynylandrosta - 4,6 - dien-17-ol-3-one of United States Patent 2,882,282 is parenterally progestationally active, not orally progestationally active, anabolic, androgenic and renotrophic, whereas the corresponding retrosteroid is not parenterally progestationally active, orally progestationally active, non-anabolic, non-renotrophic, non-androgenic and anti-estrogenic. 6-dehydro-progesterone of United States Patent 2,882,282 has a decreased parenteral progestational activity in comparison to progesterone, is non-orally progestationally active and is metabolized androgenic, whereas the corresponding retrosteroid has an increased parenteral progestational activity in relation to retro-progesterone which by itself is more progestationally active than progesterone, is orally progestationally active and is non-androgenic even if incorrectly metabolized, 21 - acetoxypregna - 4,6 - diene - 3,20-dione of the same patent is weakly parenteral progestationally active, non-orally progestationally active, produces an increase in the Na/K ratio, has no glycogen storage activity, is not anti-inflammatory and is androgenic, whereas the corresponding retosteroid is orally and parenterally progestationally active, diuretic with no increase in Na/K ratio, non-androgenic, and is anti-inflammatory. The pregna-1,4,6-triene-3,20-dione has no glycogen storage activity but is parenterally progestationally active but not orally progestationally active and is metabolized androgenic whereas the corresponding retrosteroid is not progestationally active but induces corpora lutea, is pituitary inhibiting and is non-androgenic even if metabolized incorrectly.

The 3,17β-diacetoxyandrosta-3,5-diene of United States Patent 2,885,397 is androgenic, anabolic and is not pituitary inhibiting, whereas the corresponiing retrosteroid is non-androgenic, non-anabolic, renotrophic and pituitary inhibiting.

The activities which are mentioned above in connection with the compounds of the normal series are reported in the patents in which such compounds are disclosed.

Many additional comparisons based on our own experiments will be found in Table I following the examples.

In particular the novel steroids of our invention are the 10α methyl, 9β steroids which contain at least 18 carbon atoms in the molecule and wherein any acyclic carbon chain when present and directly attached to the $C_{17}$ carbon atom, in the β position, contains at least one and not more than five successive carbon atoms.

An important class of these novel steroids of our invention are those in which there is a substituent having a carbon atom directly attached to the $C_{13}$ carbon atom which substituent is preferably in the β position. In addition it is preferred that the substituent at the carbon atom 14 be in the α position and that the substituent at the carbon atom 8 be in the β position.

More particularly the pharmacologically active steroids of our invention are those designated by the following general formula in which the substituents are designated as being in the α-position by means of a broken line (- - -) joining the substituent to the steroid nucleus, the substituents are designated as being in the β-position by means of a solid line (———) joining the substituent to the steroid nucleus and in those cases in which the substituent may be either in the α- or β-position the substituents are indicated as being joined to the steroid nucleus by a broken line and a solid line placed side to side (- - -):

FORMULA I

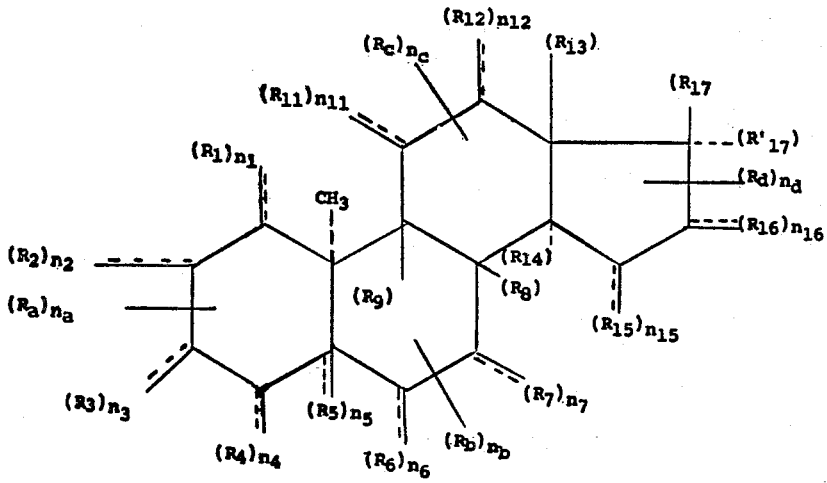

wherein $R_a$ is a member of the group consisting of carbon to carbon double bonds present at the positions 1, 2, 3 and 4 and $n_a$ is a whole number from 0 to 2;

$R_b$ is a member of the group consisting of carbon to carbon double bonds present at the positions 5 and 6 and $n_b$ is a whole number from 0 to 1;

$R_c$ is a carbon to carbon double bond present at the position 11 and $n_c$ is a whole number from 0 to 1;

$R_d$ is a member of the group consisting of carbon to carbon double bonds present at one of the positions 15, 16 and 17 (20), and $n_d$ is a whole number from 0 to 2;

$R_1$ is a member of the group consisting of hydrogen, alkyl containing from 1–3 carbon atoms, hydroxy, acyloxy, aralkoxy, alkoxy and acylthio, and $n_1$ is a whole number from 1 to 2;

$R_2$ is a member of the group consisting of hydrogen, alkyl containing from 1 to 3 carbon atoms, methylene, hydroxymethylene, alkoxymethylene, the methylene group —$CH_2$—, joining $R_1$ and $R_2$, hydroxy, acyloxy, alkoxy, aralkoxy, oxo, F, Cl and Br and $n_2$ is a whole number from 1 to 2;

$R_3$ is a member of the group consisting of hydrogen, alkyl containing from 1 to 3 carbon atoms, alkyl containing from 1 to 2 carbon atoms, substituted with hydroxy, oxo or both of the same, alkenyl containing from 2 to 3 carbon atoms, alkynyl containing from 2 to 3 carbon atoms, hydroxy, acyloxy, alkoxy and aralkoxy groups, the thio analogues of said hydroxy, acyloxy, alkoxy and aralkoxy groups, oxo, ketalized oxo, F, Cl, Br, —$NH_2$

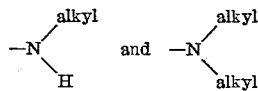

wherein each alkyl group contains from 1 to 3 carbon atoms and (2,3-d)-isoxazole, (3,2-c)-pyrazole, 2′-methyl - (3,2 - d)-thiazole and 2′-amino-(3,2-d)pyrimidine heterocyclic groups wherein each of said heterocyclics is formed by $R_2$ together with carbon atoms 2 and 3 of the steroid nucleus and $R_3$ and $n_3$ is a whole number from 1 to 2;

$R_4$ is a member of the group consisting of hydrogen, alkyl containing from 1 to 3 carbon atoms, hydroxy, acyloxy, aralkoxy, alkoxy, oxo, F, Cl and Br and $n_4$ is a whole number from 1 to 2;

$R_5$ is a member of the group consisting of hydrogen, alkyl containing from 1 to 3 carbon atoms, hydroxy, acyloxy, alkoxy, acylthio, aralkoxy, F, Cl and Br and $n_5$ is a whole number from 0 to 1;

$R_6$ is a member of the group consisting of hydrogen, alkyl containing from 1 to 3 carbon atoms, methylene trifluoromethyl, trichloromethyl, tribromomethyl, alkenyl containing from 2 to 3 carbon atoms, alkynyl containing from 2 to 3 carbon atoms, hydroxy, acyloxy, alkoxy, aralkoxy, acylthio, oxo, nitro, amino, F, Cl and Br and $n_6$ is a whole number from 1 to 2;

$R_7$ is a member of the group consisting of hydrogen, alkyl containing 1 to 3 carbon atoms, hydroxy, acyloxy, acylthio, alkoxy, aralkoxy, oxo, amino, F, Cl and Br, and $n_7$ is a whole number from 1 to 2;

$R_8$ is a member of the group consisting of hydrogen, hydroxy, acyloxy, alkoxy and aralkoxy and $R_9$ is a member of the group consisting of hydrogen, alkyl containing from 1 to 3 carbon atoms, hydroxy, acyloxy, alkoxy, aralkoxy, F, Cl and Br and $R_{11}$ is a member of the group consisting of hydrogen, alkyl containing from 1 to 3 carbon atoms, methylene, alkenyl containing from 2 to 3 carbon atoms, alkynyl containing from 2 to 3 carbon atoms, hydroxy, acyloxy, alkoxy, aralkoxy, oxo, amino, F, Cl and Br and $n_{11}$ is a whole number from 1 to 2;

$R_{12}$ is a member of the group consisting of hydrogen, alkyl containing from 1 to 3 carbon atoms, hydroxy, acyloxy, alkoxy, aralkoxy, oxo, F, Cl and Br and $n_{12}$ is a whole number from 1 to 2;

$R_{13}$ is a member of the group consisting of hydrogen, methyl, hydroxymethyl, formyl and together with $R_{11}$ the radical

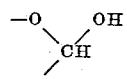

wherein the carbon atom of said radical is connected to the carbon atom 13 and the oxygen atom is connected to the carbon atom 11;

$R_{14}$ is a member of the group consisting of hydrogen, alkyl containing from 1 to 3 carbon atoms, hydroxy, acyloxy, alkoxy and aralkoxy and $R_{15}$ is a member of the group consisting of hydrogen, alkyl containing from 1 to 3 carbon atoms, hydroxy, acyloxy, alkoxy, aralkoxy, oxo, F, Cl and Br and $n_{15}$ is a whole number from 1 to 2;

$R_{16}$ is a member of the group consisting of hydrogen, alkyl containing from 1 to 3 carbon atoms, methylene, trifluoromethyl, trichloromethyl, tribromomethyl, alkenyl containing from 2 to 3 carbon atoms, alkynyl containing from 2 to 3 carbon atoms, hydroxy-methylene, hydroxy, acyloxy, alkoxy, aralkoxy, oxo, amino, F, Cl and Br and $n_{16}$ is a whole number from 1 to 2;

$R_{17}$ is a member of the group consisting of hydrogen, hydroxy, acyloxy, alkoxy, aralkoxy, thio-analogues of said hydroxy, alkoxy and aralkoxy groups, alkyl containing from 1 to 6 carbon atoms, alkenyl containing from 2 to 6 carbon atoms, alkynyl containing from 2 to 6 carbon atoms, and said alkyl, alkenyl and alkynyl groups substituted with at least one member of the group consisting of hydroxy-, hydroxy esterified with inorganic acid, hydroxy esterified with inorganic acid of which one of the hydrogen atoms is replaced by an alkali metal atom, acyloxy-, alkoxy-, aralkoxy-, oxo-, amino-, F-, Cl-, Br- and the thio analogues of said hydroxy, alkoxy and aralkoxy groups and $R'_{17}$ is a member of the group consisting of hydrogen, hydroxy, acyloxy, alkoxy, aralkoxy, thio-analogues of said hydroxy, alkoxy and aralkoxy groups, F, Cl, Br, alkyl containing from 1–6 carbon atoms, alkenyl containing from 2–6 carbon atoms, alkynyl containing from 2–6 carbon atoms, said alkyl, alkenyl, and alkynyl groups substituted with at least one member selected from the group consisting of hydroxy-, acyloxy-, alkoxy-, aralkoxy-, the thio-analogues of said hydroxy, alkoxy and aralkoxy groups, carboxy-, oxo-, amino-, F, Cl and Br, the oxo group joining $R_{17}$ and $R'_{17}$, the group —$CH_2$— joining $R_{16}$ and $R_{17}$ and a spirolactone containing from 3–6 carbon atoms joining $R_{17}$ and $R'_{17}$, a ketal group joining $R_{17}$ and $R_{16}$ and a ketal group joining $R'_{17}$ and $R_{16}$.

An interesting group of the hormonal retrosteroids of our invention are the 10α methyl steroids corresponding to the general structural formula:

FORMULA II

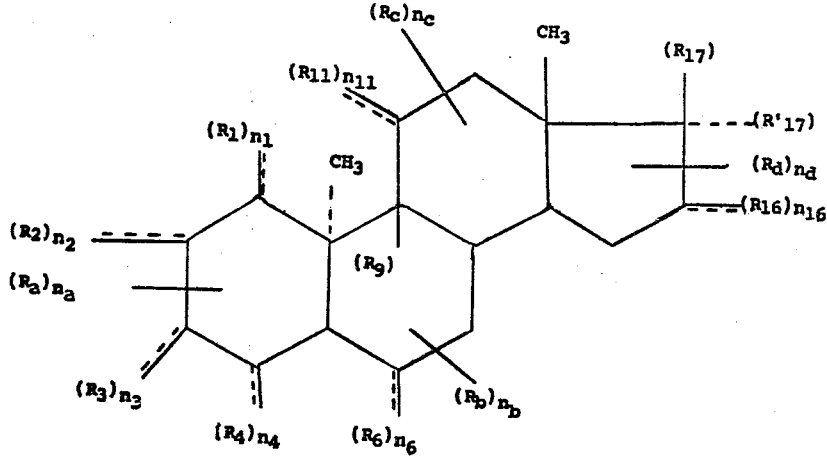

$R_1$ is a substituent selected from the group consisting of hydrogen and the methyl radicals and $n_1$ is a whole number from 1 to 2;

$R_2$ is a substituent selected from the group consisting of hydrogen, methyl, ethyl, hydroxy, etherified hydroxy and esterified hydroxy radicals and $n_2$ is a whole number from 1 to 2;

$R_3$ is a substituent selected from the group consisting of keto, hydroxy, esterified hydroxy and etherified hydroxy radicals and $n_3$ is a whole number from 1 to 2;

$R_4$ is a substituent selected from the group consisting of hydrogen, chlorine and fluorine and $n_4$ is a whole number from 1 to 2;

$R_6$ is a substituent selected from the group consisting of hydrogen, bromine, chlorine, fluorine, hydroxy, methyl, etherified hydroxy and esterified hydroxy radicals and $n_6$ is a whole number from 1 to 2;

$R_9$ is a substituent selected from the group consisting of hydrogen, bromine and fluorine and $R_{11}$ is a substituent selected from the group consisting of hydrogen, the hydroxy radical and keto radicals and $n_{11}$ is a whole number from 1 to 2;

$R_{16}$ is a substituent selected from the group consisting of hydrogen, hydroxy, etherified hydroxy, esterified hydroxy and ethyl and methyl radicals and $n_{16}$ is a whole number from 1 to 12;

$R_{17}$ and $R'_{17}$ are each selected from the group consisting of hydrogen, aliphatic hydrocarbon radicals containing from 1–6 carbon atoms, hydroxy derivatives of said aliphatic hydrocarbon radicals, etherified hydroxy derivatives of said aliphatic hydrocarbon radicals, esterified hydroxy derivatives of said aliphatic hydrocarbon radicals and keto derivatives of said aliphatic radicals, and jointly the keto radical with the proviso that at least one of the substituents defined by $R_{17}$ and $R'_{17}$ being a substituent other than hydrogen.

$R_a$ is a carbon to carbon double bond present at at least one of the positions 1, 2, 3, 4 and $n_a$ is a whole number from 0–2;

$R_b$ is a member of the group consisting of carbon to carbon double bonds present at the positions 5, 6, 7 and 8 and $n_b$ is a whole number from 0 to 2;

$R_c$ is a member of the group consisting of carbon to carbon double bonds present at the positions 8 (14) and 9 (11) and $n_c$ is a whole number from 0 to 2;

$R_d$ is a member of the group consisting of carbon to carbon double bonds present at one of the positions 15 and 16 and $n_d$ is a whole number from 0 to 2.

A particular group of compounds of Formula II are those in which there is a conjugated carbon double bond system at the carbon atoms 5 and 7 of the steroid nucleus.

Referring to the general Formula I, three particular groups of retrosteroids having female hormonal activity are those in which all substituents are the same as defined therein except that:

*Group A*

$R_{17}$ is

and $R'_{17}$ is H

*Group B*

$R_{17}$ is OR' wherein R' is hydrogen, alkyl or acyl and $R'_{17}$ is alkyl of 2–6 carbon atoms, alkenyl or alkynyl each of 2–6 carbon atoms.

*Group C*

$R_{17}$ is

and $R'_{17}$ is OR" wherein R" is acyl

With respect to the retrosteroids of these formulae having female hormonal activity they have at least one of the following pharmacological activities namely, oral and/or parenteral progestational, anti-progestational, utero- trophic, anti-uterotrophic, anti-estrogenic, fertility stimulating, fertility inhibiting, anti-arteriosclerosis, corpora lutea induction, ovulation inhibiting and/or ovulation stimulating activities. In addition some of these compounds may have anti-tumor, pituitary stimulating and/or pituitary inhibiting activities.

As to the compounds falling within the groups A, B and C, the introduction of a double bond at the carbon atom number 1 has a tendency to decrease progestational activity and to enhance ovulation stimulating activity. The presence of a keto group at carbon atom number 3 and a double bond at carbon atom 4 has a tendency to enhance oral and parenteral progestational activity as compared with the same activity of the corresponding compound of the invention in which such a keto atom and such a double bond are absent.

The presence of a keto group at carbon atoms number 3 and double bonds at carbon atoms numbers 4 and 6 has a tendency to enhance oral and parenteral progestational activity and anti-uterotrophic activity as compared with the same activities of the corresponding compound of the invention in which such a keto group and such double bonds are absent. The presence of an alkoxy or acyloxy group at carbon atom number 3 and double bonds at carbon atoms 3 and 5 have a tendency to decrease the intensity of progestational activity but prolong the same as compared with the same activities of the corresponding compound of the invention in which such alkoxy, acyloxy, and double bonds are absent. A fluoro or chloro atom at carbon atom number 6 has a tendency to increase any female hormonal activity already possessed by the compound. A double bond at carbon atom number 7 has a tendency to decrease any female hormonal activity already possessed by the compound but to enhance anti-arteriosclerotic activity.

Referring to the Formula I three particular groups of retrosteroids having male hormonal activity are those in which all substituents are as defined therein except that

*Group D*

$R_{17}$ is hydrogen, or OR, wherein R is hydrogen or acyl, and $R'_{17}$ is hydrogen or OR, wherein R is hydrogen or acyl, provided that $R_{17}$ and $R'_{17}$ are neither both hydrogen nor both OR.

*Group E*

$R_{17}$ and $R'_{17}$ together form the oxo

*Group F*

$R_{17}$ is OR' wherein R' is hydrogen, alkyl or acyl, and $R'_{17}$ is methyl.

The compounds falling within the above groups D, E and F possess at least one of the following pharmacological activities, namely, anti-androgenic, anabolic, renotrophic, anti-catabolic, catabolic, increase or decrease of spermatogenesis and/or anti-anemic activities.

In addition some of these compounds may have anti-tumor, pituitary stimulating and/or pituitary inhibiting activities.

With regard to the compounds falling within the groups D, E and F the combination of a keto group at the carbon atom number 3 with a double bond at carbon atom number 4, has a tendency to enhance anabolic and/or renotropic activities. The combination of a keto group at carbon atom number 3 with double bonds at carbon atoms 4 and 6 in the compounds falling within the groups D, E and F tends to impart anti-androgenic and/or pituitary inhibiting activities. A halogen atom especially a fluorine or chlorine atom at the carbon atom number 6 in compounds falling within the group D–F has a tendency to increase the anabolic activity.

Referring to Formula I, particular groups of retrosteroids having cortiocoidal activity are those in which all substituents are as defined therein except that

*Group G*

$R_{17}$ is

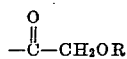

and
$R'_{17}$ is hydrogen;

*Group H*

$R_{17}$ is

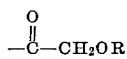

and
$R'_{17}$ is OR;

*Group I*

One of the substituents at carbon atom 11 is hydroxy. $R_{17}$ is

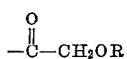

and
$R'_{17}$ is OR;

*Group J*

The substituent at carbon atom 11 is oxo, $R_{17}$ is

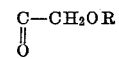

and $R'_{17}$ is OR and wherein in these groups G, H, I, J, R is hydrogen or acyl The compounds falling with the G, H, I and J groups possess at least one of the following properties, namely, gluco-corticoid, anti-gluco-corticoid, anti-inflammatory, mineralo-corticoid, anti-mineralo-corticoid, diuretic, antidiuretic, anti-allergic, and/or anti-diabetic activities.

In addition some of these compounds may have antitumor, pituitary stimulating and/or pituitary inhibiting activities.

The presence of a keto group at carbon atom number 3 and an olefinic double bond at carbon atom number 4 has a tendency to enhance one or more of the corticoidal activities of the retrosteroids falling within the groups G, H, I and J as compared with the corresponding activities of the corresponding compounds of the invention in which such a keto group and such a double bond is absent. Introduction of another olefinic double bond at carbon atom number 6, in addition to the keto group at carbon atom number 3 and the double bond at carbon atom number 4, has a tendency to enhance the corticoidal activity still further as compared with the corresponding activities of the corresponding compound of the invention in which such a double bond is absent.

In general, the activity of the retrosteroids of the groups A–J inclusive of the present invention show a tendency to be enhanced by the introduction of a double bond at carbon atom number 6, as compared with the corresponding activity of the corresponding compound of the invention in which such a double bond is absent.

Among the representative retro-steroids of our invention are the following:

2β,21-difluoro-retro-progesterone
1-dehydro-2,21-difluoro-retro-progesterone
11-oxo-retro-progesterone
11β-hydroxy-retro-progesterone
1,6-bisdehydro-6-methoxy-retro-progesterone
6β-methoxy-retro-progesterone
1-dehydro-6β-methoxy-retro-progesterone
1-dehydro-6β-fluoro-21-acyloxy-retro-progesterone
6-dehydro-6-methoxy-21-acyloxy-retro-progesterone
6β-methoxy-21-acyloxy-retro-progesterone
1-dehydro-21-acyloxy-retro-progesterone
6β-fluoro-21-acyloxy-retro-progesterone
16α-hydroxy-21-acyloxy-retro-progesterone
3-enolether of 21-acyloxy-retro-progesterone
3-enolacylate of 21-acyloxy-retro-progesterone
3-desoxy-6-dehydro-retro-progesterone
retro-pregna-4,6-dien-20-ono-(2,3-d)-isoxazole
retro-pregna-4,6-dien-20-ono-(3,2-c)-pyrazole
6-dehydro-6-fluoro-retro-progesterone
1,6-bisdehydro-6-fluoro-retro-progesterone
1,6-bisdehydro-6-chloro-retro-progesterone
6-dehydro-21-fluoro-retro-progesterone
1,6-bisdehydro-21-fluoro-retro-progesterone
6-dehydro-21,21-difluoro-retro-progesterone
1,6-bisdehydro-2,21-difluoro-retro-progesterone
6-dihydro-16α,17α-dihydroxy-retro-progesterone 16,17-ketal
6-chloro-6-dehydro-16α,17α-dihydroxy-retro-progesterone 16,17-ketal
6-chloro-6-dehydro-16α,17α-dihydroxy-retro-progesterone
6-dehydro-16α,17α-dihydroxy-retro-progesterone
6-dehydro-6-fluoro-21-acyloxy-retro-progesterone
1,6-bisdehydro-21-acyloxy-retro-progesterone
6-dehydro-16α-hydroxy-21-acyloxy-retro-progesterone
2β,21-difluoro-6-dehydro-retro-progesterone
6α-chloro-retro-testosterone 17-acylate
1-dehydro-2-methyl-retro-testosterone (13)
1-dehydro-2-methyl-retro-testosterone 17-acylate (13)
4-methyl-retro-testosterone
3-enolacylate of 4-methyl-retro-testosterone 17-acylate
4-methyl-6-dehydro-retro-testosterone
4-methyl-6-dehydro-retro-testosterone 17-acylate
4-chloro-retro-testosterone
4-chloro-retro-testosterone 17-acylate
4-bromo-retro-testosterone
4-hydroxy-retro-testosterone
4-hydroxy-6-dehydro-retro-testosterone
2β-fluoro-retro-testosterone (16)
17α,21-diacyloxy-retro-progesterone
3-enolacylate of 17α,21-diacyloxy-retro-progesterone
6β-fluoro-17α,21-diacyloxy-retro-progesterone
6-dehydro-6-methoxy-17α,21-diacyloxy-retro-progesterone
1,6-bisdehydro-17α-acyloxy-retro-progesterone
1,6-bisdehydro-1-methyl-17α-acyloxy-retro-progesterone
3-desoxy-6-dehydro-17α-acyloxy-retro-progesterone
3-enolether of 6-dehydro-17α-acyloxy-retro-progesterone
6-chloro-6-dehydro-17α-acyloxy-retro-progesterone
6-dehydro-6-fluoro-17α-acyloxy-retro-progesterone
1,6-bisdehydro-6-fluoro-17α-acyloxy-retro-progesterone
1,6-bisdehydro-6-chloro-17α-acyloxy-retro-progesterone
6-dehydro-17α,21-diacyloxy-retro-progesterone
6-dehydro-6-fluoro-17α,21-diacyloxy-retro-progesterone
6-chloro-6-dehydro-17α,21-diacyloxy-retro-progesterone
16α-methyl-retro-progesterone
16β-methyl-retro-progesterone
6-dehydro-16α-methyl-retro-progesterone
6-dehydro-16α-methyl-17α-acyloxy-retro-progesterone
16-methylene-17α-acyloxy-retro-progesterone
3-enolacylate of 16α-methyl-17α-acyloxy-retro-progesterone
16α-methyl-17α-acyloxy-retro-progesterone
16β-methyl-17α-acyloxy-retro-progesterone
6-dehydro-16-methylene-17α-acyloxy-retro-progesterone
16α,17α-dihydroxy-retro-progesterone 16,17-ketal
16α-methyl-21-acyloxy-retro-progesterone
16α,17α-dihydroxy-21-acyloxy-retro-progesterone 16,17-ketal
6β,16α-dimethyl-17α-acyloxy-retro-progesterone
6-dehydro-6,16α-dimethyl-17α-acyloxy-retro-progesterone
6-dehydro-6,16α-dimethyl-retro-progesterone
16α-methyl-retro-progesterone
3-enolacylate of 17α-methyl-retro-progesterone
6-dehydro-17α-methyl-retro-progesterone
17α-bromo-retro-progesterone
1-dehydro-17α-bromo-retro-progesterone 6-dehydro-17α-bromo-retro-progesterone
1,6-bisdehydro-17α-bromo-retro-progesterone
6β-chloro-17α-bromo-retro-progesterone
6β-fluoro-17α-bromo-retro-progesterone
6β,16α-dimethyl-retro-progesterone
1-dehydro-2-methyl-retro-progesterone
1,6-bisdehydro-2-methyl-retro-progesterone
1,6-bisdehydro-2-methyl-17α-acyloxq-retro-progesterone
1-dehydro-2-methyl-17α-acyloxy-retro-progesterone
2β-methyl-21-acyloxy-retro-progesterone
2β-methyl-6-dehydro-21-acyloxy-retro-progesterone
6β,17α-dimethyl-retro-testosterone
6-dehydro-6,17α-dimethyl-retro-testosterone
6-dehydro-7-methyl-retro-progesterone
6-dehydro-7-methyl-17α-acyloxy-retro-progesterone
2β-fluoro-7β-methyl-retro-androst-4-ene-3α,17β-diol
7-methyl-retro-androsta-4,6-diene-3α,17β-diol
7β-methyl-17α-ethynyl-retro-androst-4-ene-3α,17-diol
7β-methyl-17α-acyloxy-retro-progesterone
7β-methyl-17α-ethynyl-retro-testosterone
6-dehydro-7-methyl-retro-testosterone
2β-fluoro-7β-methyl-retro-testosterone
1-dehydro-2-fluoro-7β-methyl-retro-testosterone
1-dehydro-2-fluoro-retro-progesterone
1-dehydro-2-fluoro-17α-acyloxy-retro-progesterone
1,6-bisdehydro-2-methyl-17α-acyloxy-retro-progesterone
2β-fluoro-6-dehydro-21-acyloxy-retro-progesterone
11β,17α,21-trihydroxy-retro-progesterone 21-acylate
1-dehydro-11α,17α,21-trihydroxy-retro-progesterone 21-acylate
1-dehydro-11β,17α,21-trihydroxy-retro-progesterone 21-acylate
1-dehydro-11-oxo-17α,21-dihydroxy-retro-progesterone 21-acylate
6-dehydro-11α,17α,21-trihydroxy-retro-progesterone 21-acylate
6-dehydro-11β,17α,21-trihydroxy-retro-progesterone 21-acylate
1,6-bisdehydro-11α,17α,21-trihydroxy-retro-progesterone 21-acylate
1,6-bisdehydro-11β,17α,21-trihydroxy-retro-progesterone 21-acylate
9-fluoro-11α,17α,21-trihydroxy-retro-progesterone 21-acylate
9-fluoro-11β,17α,21-trihydroxy-retro-progesterone 21-acylate
1-dehydro-9-fluoro-11α,17α,21-trihydroxy-retro-progesterone 21-acylate
1-dehydro-9-fluoro-11β,17α,21-trihydroxy-retro-progesterone 21-acylate
6β-fluoro-11α,17α,21-trihydroxy-retro-progesterone 21-acylate
6β-fluoro-11β,17α,21-trihydroxy-retro-progesterone 21-acylate
6-dehydro-6-fluoro-11α,17α,21-trihydroxy-retro-progesterone 21-acylate
6-dehydro-6-fluoro-11β,17α,21-trihydroxy-retro-progesterone 21-acylate
6β-methyl-11α,17α,21-trihydroxy-retro-progesterone 21-acylate
6β-methyl-11β,17α-21-trihydroxy-retro-progesterone 21-acylate
6-dehydro-6-methoxy-11α,17α,21-trihydroxy-retro-progesterone 21-acylate
6-dehydro-6-methoxy-11β,17α,21-trihydroxy-retro-progesterone 21-acylate
11α,16α,17α,21-tetrahydroxy-retro-progesterone 21-acylate
11β,16α,17α,21-tetrahydroxy-retro-progesterone 21-acylate
11α,16α,17α,21-tetrahydroxy-retro-progesterone 16,17-ketal 21-acylate
11β,16α,17α,21-tetrahydroxy-retro-progesterone 16,17-ketal 21-acylate
1-dehydro-11α,16α,17α,21-tetrahydroxy-retro-progesterone 21-acylate
1-dehydro-11β,16α,17α,21-tetrahydroxy-retro-progesterone 21-acylate
1-dehydro-11α,16α,17α,21-tetrahydroxy-retro-progesterone 21-acylate
1-dehydro-11α,16α,17α,21-tetrahydroxy-retro-progesterone 16,17-ketal 21-acylate
1-dehydro-11β,16α,17α,21-tetrahydroxy-retro-progesterone 16,17-ketal 21-acylate
11α,17α,21-trihydroxy-16α-methyl-retro-progesterone 21-acylate
11β,17α,21-trihydroxy-16α-methyl-retro-progesterone 21-acylate
6β,9-difluoro-11α,17α,21-trihydroxy-retro-progesterone
6β,9-difluoro-11α,17α,21-trihydroxy-reto-progesterone 21-acylate
6β,9-difluoro-11β,17α,21-trihydroxy-retro-progesterone 21-acylate
11α,21-dihydroxy-retro-progesterone 21-acylate
11β,21-dihydroxy-retro-progesterone 21-acylate
6-dehydro-11α,21-dihydroxy-retro-progesterone 21-acylate
6-dehydro-11β,21-dihydroxy-retro-progesterone 21-acylate
1-dehydro-11α,21-dihydroxy-retro-progesterone 21-acylate
1-dehydro-11β,21-dihydroxy-retro-progesterone 21-acylate Examples of other pharmacological retro-steroids of our invention are the following:

2,6,9-trifluoro-6-dehydro-11-hydroxy-16-methyl-retro-progesterone
2,9-difluoro-6-dehydro-11-hydroxy-16-methyl-retro-progesterone
2-fluoro-1,6-bisdehydro-11-hydroxy-retro-progesterone
6-fluoro-6-dehydro-11-hydroxy-retro-progesterone
2,6,9-trifluoro-6-dehydro-11-hydroxy-17α-acetoxy-16-methyl-retro-progesterone
2,9-difluoro-6-dehydro-11-hydroxy-17α-propionoxy-16-methyl-retro-progesterone
2-fluoro-1,6-bisdehydro-11,17-dihydroxy-retro-progesterone
6-fluoro-6-dehydro-11-hydroxy-17α-acetoxy-retro-progesterone
2,6,9-trifluoro-6-dehydro-11,17,21-trihydroxy-16-methyl-retro-progesterone 21-acetate
2,9-difluoro-6-dehydro-11,17,21-trihydroxy-16-methyl-retro-progesterone 21-acetate
2-fluoro-1,6-bisdehydro-11,17,21-trihydroxy-retro-progesterone
6-fluoro-6-dehydro-11,17,21-trihydroxy-retro-progesterone
16-methyl-17,21-dihydroxy-retro-progesterone
2,9,21-trifluoro-6-dehydro-11-hydroxy-16-methyl-retro-progesterone
2,21-difluoro-6-dehydro-11-hydroxy-16-methyl-retro-progesterone
2,21-difluoro-1,6-bisdehydro-11-hydroxy-retro-progesterone
6,21-difluoro-6-dehydro-11-hydroxy-retro-progesterone
16-methyl-21-fluoro-retro-progesterone
2,6,9-trifluoro-6-dehydro-11,21-dihydroxy-16-methyl-retro-progesterone 21-acetate
2,9-difluoro-6-dehydro-11,21-dihydroxy-16-methyl-retro-progesterone 21-acetate
2-fluoro-1,6-bisdehydro-11,21-dihydroxy-retro-progesterone
6-fluoro-6-dehydro-11,21-dihydroxy-retro-progesterone
16-methyl-21-hydroxy-retro-progesterone
6-fluoro-6-dehydro-11-hydroxy-16-methyl-17α-allyl-retro-testosterone
2-fluoro-1,6-bisdehydro-11-hydroxy-17α-(2-methallyl)-retro-testosterone 2,6-difluoro-11-oxo-17α-ethyl-retro-testosterone
6-fluoro-6-dehydro-17-ethynyl-retro-testosterone
2-methyl-16-hydroxy-retro-progesterone
2-methyl-6-dehydro-11,16-dihydroxy-progesterone
2-methyl-6-hydroxy-retro-progesterone
1-dehydro-2-methyl-11-hydroxy-retro-progesterone
11,16-dihydroxy-retro-progesterone
2-methyl-9-fluoro-11-hydroxy-retro-progesterone
1-dehydro-2-methyl-17α-acetoxy-retro-progesterone
6,11,16,17-tetrahydroxy-retro-progesterone
2-methyl-6,17-dihydroxy-retro-progesterone dipropionate
2-methyl-9-fluoro-11,17-dihydroxy-retro-progesterone
2-methyl-9-fluoro-retro-hydrocortisone
2-methyl-16-hydroxy-retro-hydrocortisone 21-acetate
2-methyl-6-hydroxy-retro-prednisolone
6-hydroxy-retro-prednisolone
2-methyl-21-fluoro-retro-progesterone
21-fluoro-16-hydroxy-retro-progesterone
6-hydroxy-11-oxo-21-fluoro-retro-progesterone
6-dehydro-11-hydroxy-21-fluoro-retro-progesterone
9,21-difluoro-11-hydroxy-retro-progesterone
2-methyl-9-fluoro-11-hydroxy-21-acetoxy-retro-progesterone
1-dehydro-6-hydroxy-21-acetoxy-retro-progesterone
2-methyl-16-hydroxy-21-acetoxy-retro-progesterone
1-dehydro-2-methyl-21-acetoxy-retro-progesterone
2-methyl-11-hydroxy-17α-ethynyl-retro-testosterone
6,16-dihydroxy-17α,-allyl-retro-testosterone
6,11-dihydroxy-9-fluoro-17α-(2'-methallyl)-retro-testosterone
1-dehydro-2-methyl-17α-prop-1'-ynyl-retro-testosterone
2,11-dihydroxy-6-methyl-16-fluoro-retro-progesterone
6-methyl-6-dehydro-9-fluoro-11-hydroxy-retro-progesterone
2-hydroxy-6-methyl-6-dehydro-retro-progesterone
6-dehydro-16-fluoro-retro-progesterone
2,17-diacetoxy-6-methyl-6-dehydro-retro-progesterone
6-methyl-6-dehydro-17α-acetoxy-retro-progesterone
9-fluoro-11-hydroxy-17α-acetoxy-retro-progesterone
6-methyl-6-dehydro-16-fluoro-17α-acetoxy-retro-progesterone
2,17,21-trihydroxy-6-dehydro-16-fluoro-retro-progesterone 21-acetate
6-methyl-9,16-difluoro-retro-hydrocortisone 21-acetate
6-methyl-6-dehydro-retro-hydrocortisone
16-fluoro-retro-prednisolone
6-methyl-6-dehydro-21-fluoro-retro-progesterone
16,21-difluoro-retro-progesterone
6-dehydro-9,21-difluoro-11-hydroxy-retro-progesterone
2-hydroxy-6-dehydro-21-fluoro-retro-progesterone
2,11,21-trihydroxy-9-fluoro-retro-progesterone
6-methyl-16-fluoro-21-acetoxy-retro-progesterone
6-methyl-6-dehydro-21-acetoxy-retro-progesterone
2,21-dihydroxy-6-methyl-retro-progesterone
6-methyl-6-dehydro-17α-ethynyl-retro-testosterone
2-hydroxy-16-fluoro-17α-propyl-retro-testosterone
6-methyl-9,16-difluoro-11-hydroxy-17α-pentyl-retro-testosterone
2-methyl-6-dehydro-16-fluoro-17α(2'-methallyl)-retro-testosterone
1-dehydro-6-methoxy-retro-progesterone
1-dehydro-6,11-dihydroxy-retro-progesterone
2-ethyl-11-hydroxy-retro-progesterone
2-methyl-6-hydroxy-retro-progesterone
1,6-bisdehydro-6,11,17-trihydroxy-retro-progesterone
2-methyl-17-acetoxy-retro-progesterone
2-methyl-6,11,17-trihydroxy-retro-progesterone
1-dehydro-2-methyl-11,17-dihydroxy-retro-progesterone
1-dehydro-2-methyl-6,11,17,21-tetrahydroxy-retro-progesterone 17, 21-diacetate
1,6-bisdehydro-6,11,17-trihydroxy-retro-progesterone
2-methyl-6,17,21-trihydroxy-retro-progesterone 17,21-diacetate
2-methyl-21-fluoro-retro-progesterone
21-chloro-retro-progesterone
2-methyl-6-dehydro-11-hydroxy-21-fluoro-retro-progesterone
1,6-bisdehydro-21-fluoro-retro-progesterone
6-hydroxy-21-fluoro-retro-progesterone
2-ethyl-6,21-dihydroxy-retro-progesterone
1-dehydro-11,21-dihydroxy-retro-progesterone
2 - propyl - 6 - methoxy-11-oxo-21-hydroxy-retro-progesterone
6-dehydro-11,21-dihydroxy-retro-progesterone 21-propionate
17α-vinyl-retro-testosterone
6-dehydro-17α-propyl-retro-testosterone 17-acetate
2-propyl-6-dehydro-17α-ethyl-retro-testosterone
1,6-bisdehydro-11-hydroxy-17α-ethynyl-retro-testosterone
6-dehydro-6-chloro-retro-progesterone
1,6-bisdehydro-6-chloro-retro-progesterone
6-fluoro-11-hydroxy-retro-progesterone
2-chloro-17α-hydroxy-retro-progesterone
2,6-difluoro-11,17α-dihydroxy-retro-progesterone
1-dehydro-6-chloro-17α-acetoxy-retro-progesterone
6-dehydro-6-chloro-11,17α-dihydroxy-retro-progesterone
6-chloro-17α,21-dihydroxy-retro-progesterone
1,6 - bisdehydro - 17α,21 - dihydroxy-retro-progesterone - 17,21-diacetate
2-fluoro-11,17α,21-trihydroxy-retro-progesterone
2,6-difluoro-11,17α,21-trihydroxy-retro-progesterone
2,6,21-trifluoro-retro-progesterone
11-hydroxy-21-fluoro-retro-progesterone
21-chloro-retro-progesterone
1,6-bisdehydro-11-hydroxy-21-fluoro-retro-progesterone
1-dehydro-6,21-dichloro-retro-progesterone
1-dehydro-6,21-difluoro-11-hydroxy-retro-progesterone
6,21-difluoro-retro-progesterone
1-dehydro-6-chloro-11,21-dihydroxy-retro-progesterone
2,6-difluoro-11-oxo-21-hydroxy-retro-progesterone
2-fluoro-21-hydroxy-retro-progesterone
2-chloro-6-dehydro-21-hydroxy-retro-progesterone
2-fluoro-17α-ethynyl-retro-testosterone 17β-acetate
2,6-difluoro-17α-propyl-retro-testosterone
6-fluoro-11-hydroxy-17α-prop-1'-ynyl-retro-testosterone
1,6-bisdehydro-17α-butyl-retro-testosterone 17-acetate
2-chloro-6-dehydro-17α-ethyl-retro-testosterone
1,6-bisdehydro-6-hydroxy-retro-progesterone
1-dehydro-2,11-dihydroxy-6-ethyl-retro-progesterone
1,6 - bisdehydro - 2 - acetoxy - 11 - oxo - 6 - methyl-retro-progesterone
6-dehydro-17-acetoxy-retro-progesterone
1,6-bisdehydro - 2,17 - diacetoxy - 6 - methyl-retro-progesterone
1,6-bisdehydro-11,17,21-trihydroxy-retro-progesterone
2,17,21-trihydroxy-6-methyl-11-oxo-retro-progesterone
1-dehydro-2-acetoxy-21-fluoro-retro-progesterone
6-dehydro-2-hydroxy-11-oxo-21-chloro-retro-progesterone
1,6-bisdehydro-6-methyl-21-fluoro-retro-progesterone
1,6 - bisdehydro - 2,21 - diacetoxy-6-methyl-retro-progesterone
1-dehydro-11,21-dihydroxy-retro-progesterone
2,11,21-trihydroxy-6-isopropyl-retro-progesterone
1,6 - bisdehydro - 2,11 - dihydroxy - 6 - methyl - 17 - ethyl-retro-testosterone
1,6 - disdehydro - 11 - oxo-6-ethyl-17-ethynyl-retro-testosterone
2-chloro-16-methyl-retro-androsta-4,6-dien-3,11,17-trione
2-fluoro-16-methyl - 11 - hydroxy-retro-androsta - 1,4 - diene-3,17-dione
2 - chloro - 16 - methyl-retro-androsta - 1,4,6 - triene-3,17-dione
6 - dehydro - 9 - fluoro - 11 - hydroxy - 16 - methyl-retro-testosterone An important class of the novel steroids of our invention are those that serve as intermediates for the preparation of our novel hormonally active retro-steroids.

One group of these intermediates is those having the same structure as Formula I in respect to all the substituents except that $n_b$ is a whole number from 0 to 2, $R'_{17}$ is hydrogen and $R_{17}$ is the group

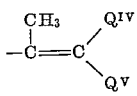

wherein $Q^{IV}$ is an alkyl of 1–3 carbon atoms, phenyl, the group

wherein R and R' are both alkyl or the cyclic group

wherein R" and R'" form together a bivalent hydrocarbon radical and $Q^V$ is phenyl, hydrogen or alkyl of 1–3 carbon atoms with the proviso that $Q^V$ is hydrogen when $Q^{IV}$ contains nitrogen and $Q^V$ is an alkyl group of 1–3 carbon atoms but not more than three carbon atoms together with $Q^{IV}$, when $Q^{IV}$ is alkyl.

Another group of these novel intermediates in those which also have the same structure as Formula I in respect to all the substituents except that $n_b$ is a whole number from 0 to 2 and $R_{17}$ together with $R'_{17}$ is the group

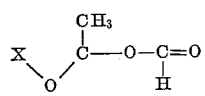

wherein X is the carbon atom 17 of the nucleus.

Other novel intermediates are those similar to the above two groups and Formula I but in which there are present a double bond at 8(9) or 9(11) and/or one or more epoxy groups joining the following pairs of nuclear carbon atoms: 1, 2; 4, 5; 5, 6; 6, 7; 9, 11; 11, 12; 14, 15 and 16, 17.

The use of these novel steroids of our invention in the preparation of our novel hormonally active retro-steroids will be apparent from the description of the methods of preparing these retro-steroids which follows:

We may start with steroids already containing the 10α methyl 9β configuration such as lumisterol 2 or lumisterol 3.

Also the 10α-methyl, 9β configuration of the retro-steroids of our invention may be prepared by irradiation with ultraviolet light of certain normal steroids having a $\Delta^{5,7}$ configuration in the same manner that ergosterol and 7-dehydrocholesterol are converted into lumisterol 2 and lumisterol 3, respectively.

Thus, irradiation (preferably with ultraviolet light) of 5,7-bisdehydro-normal steroids, having the 10-methyl group in β position, a hydrogen atom at carbon atom 9 in α position, a substituent at carbon atom 13 in β position and a substituent at carbon atom 14 in α position, followed by eliminations of the double bond between carbon atoms 7 and 8 produces steroids having a nucleus of which the configuration at the carbon atoms 10, 9, 8, 13 and 14 is that of the nucleus of our novel retro-steroids (10α methyl, 9β, 13β, 14α).

In this manner, the 10α methyl, 9β configuration in the novel steroids of our invention, can be introduced as set out in the foregoing paragraph. The starting materials used in the irradiation process may already contain the substituents as set out in Formula I. However, sometimes the presence of certain light absorbing chemical systems other than the 5,7-bisdehydro system may disturb the conversion into our novel 10α methyl, 9β steroids.

In principle this method of introducing the 10α methyl, 9β configuration by irradiation with ultraviolet light may be applied to all normal steroids (those containing a 10β methyl, 9α configuration) with two limitations. One of these limitations is that there be no substituent present providing steric hindrance of the 10-methyl group. It is particularly important that the substituents present on the 1, 9 or 11 positions of the steroid molecule do not stericly hinder the 10-methyl group. Also there must be no substituents which have a natural absorption between 220 and 330 mμ or materially influence the absorption of the $\Delta^{5,7}$ system. Thus no non-ketalized keto group or one or more double bonds in conjugation with the $\Delta^{5,7}$ system may be present.

Starting products for the preparation of the retro-steroids according to the invention may be, for example, those natural sterols which have a saturated or unsaturated aliphatic carbon chain, such for example ergosterol.

Alternatively, the starting products may be found in the classes of the sapogenines, which have a heterocyclic group in the side chain, for example, diosgenine. In both cases the $\Delta^{5,7}$-system should be provided for the radiation if it is not already present in the molecule.

The introduction of the 10α methyl, 9β configuration may be the first step to be carried out as in the following general method:

(a) Introduction of the retro-structure into steroids of the normal series by irradiation of suitable $\Delta^{5,7}$ steroids;

(b) Introduction of substituents into retro-steroids;

(c) A series of reactions to obtain a desired grouping at carbon atom 17, starting from retro-steroids with an aliphatic side chain of 6–10 carbon atoms at carbon atom 17.

The sequence of the processes as described may be varied. For example, starting from a retro-steroid which has been prepared beforehand, for example dihydroisolumisterone, the side chain degradation and introduction of the desired substituents may be carried out entirely or partially in the inverted sequence, 2-fluoro-retro-progesterone may be prepared for example by introducing a fluorine atom in the 2-position in retro-progesterone or by side chain degradation of 2-fluoro-dihydroisolumisterone.

It is also possible to carry out the irradiation with steroids of the normal series, in which all of the desired substituents have been introduced, or after entire or partial side chain degradation for example with 16-methyl-pregna-5,7-diene-3β-ol-20-one.

The sequence of the processes which is chosen can be decided separately for the product and starting materials employed.

Changes in the nuclear structure other than the introduction of the 10α methyl, 9β configuration may be carried out as follows:

14β-steroids may be prepared by hydrogenation of 14(15) unsaturated steroids, for instance with hydrogen and using palladium as a catalyst. Thus pregna-5,14,16-trien-3β-ol-20-one when hydrogenated yields 14β,17β-pregna-5-en-3β-ol-20-one. (Fieser and Fieser, "Steroids" 1959, page 567.)

13α-steroids may be prepared by irradiation of 17-keto steroids with ultra violet light according to Fieser and Fieser "Steroids," 1959, page 520. Thus irradiation of 3α-hydroxy - 5α - androstan-17-one yields 3α-hydroxy-5α, 13α-androstan-17-one.

8α steroids may be prepared by hydrogenation of 11-keto-$\Delta^{8(9)}$ steroids in the presence of a catalyst. (Tetrahedron 1, 22 (1957).) Thus 3β-hydroxy-11-oxo-androst-β(9)-ene may be hydrogenated in the presence of palladium to produce 3β-hydroxy-11-oxo-8α-androstane.

18-nor steroids may be prepared by reacting 18-hydroxy-17-keto steroids with sodium hydroxide (Fieser and Fieser "Steroids" 1959, page 470). Thus by reacting 3β, 18-dihydroxy-androst-5-en-17-one with sodium hydroxide will be produced 3β-hydroxy-18-nor-androst-5-en-17-one.

The expressions: inorganic acid, acyl, acyloxy, alkoxy, aralkoxy, acylthio, ketol and ketalized oxo, whenever used in this application, have the following meanings.

Inorganic acid is one of the following inorganic acids: phosphoric acid, sulphuric acid, nitric acid, nitrous acid, boric acid.

Acyl or acyloxy are the acyl or the acyloxy groups respectively of the following acids:

(a) Saturated or unsaturated, branched or unbranched, cyclic or non-cyclic aliphatic mono- or dicarboxylic acids having 1–20 carbon atoms wherein the aliphatic part of the molecule may be substituted by one or more halogen atoms, amino groups, sulphonic acid groups;

(b) Phenylalkyl mono- or dicarboxylic acids of which the phenyl part of the molecule may be substituted with alkyl groups containing 1–3 carbon atoms, sulphonic acid groups, alkoxy groups of which the alkyl group is branched or unbranched and contains 1–10 carbon atoms and acids of which the alkyl part of the phenyl alkyl mono- or dicarboxylic acid contains from 0–6 carbon atoms and is branched or unbranched, saturated or unsaturated. Of these acids the following specific examples may be given: formic acid, acetic acid, acroleic acid, isobutyric acid, palmitic acid, cyclohexane-mono-carboxylic acid, trichloroacetic acid, aminoacetic acid, oxalic acid, malonic acid, maleic acid, benzoic acid, terephthalic acid, p-ethyl benzoic acid, benzene sulphonic acid, m-ethoxy benzoic acid, phenyl acetic acid, and cinnamic acid.

Alkoxy is the alkoxy group of mono or di-aliphatic alcohol of which the alkyl group contains from 1–20 carbon atoms and which may be branched or unbranched, cyclic or non cyclic, saturated or non saturated and which alkyl group may be substituted with halogen or alkoxy, whereby this latter alkoxy substituent may be attached to the same carbon atom of the steroid nucleus as the main alkoxy group. Of these alcohols the following examples may be given: methanol, ethanol, propanol-2, 2-chloro ethanol-1, 2-ethoxy ethanol-1 and glycol.

Aralkoxy is the aralkoxy group of a mixed aromatic aliphatic alcohol in which the hydroxyl group is attached to the aliphatic part of the molecule and of which the alkyl (ene) group contains from 0–6 carbon atoms which may be branched or unbranched. Of these alcohols the following examples may be given: benzyl alcohol and phenol.

Acylthio is the acylthio group of acyl thiols. In acylthio the expression "acyl" has the meaning as given hereabove.

A ketal is the dihydroxy steroid ketal of an aliphatic aldehyde, aliphatic ketone, mixed aliphatic aromatic aldehyde, mixed aliphatic aromatic ketone, or a diaromatic ketone.

Ketalized oxo is the ketalized oxo group resulting from the reaction between two molecules of a monohydroxy aliphatic alcohol containing from 1 to 6 carbon atoms and one molecule of an oxo group containing $10\alpha,9\beta$-methyl steroid, or resulting from the reaction between one molecule of a dihydroxy aliphatic alcohol containing from 1 to 6 carbon atoms and one molecule of an oxo group containing $10\alpha$-methyl-$9\beta$-steroid.

The introduction of alkyl substituents may be carried out as follows:

(1) By the reaction of keto-, conjugate keto- and doubly conjugate keto-steroids with alkylation agents, such as, for example, Grignard reagents, alkyl-alkali-metal compounds or an alkyl halide, in the presence of an alkali metal alkoxide.

For example, according to the method described by Zderic et al. (J. Am. Chem. Soc., 82, 3404 (1960)) 11-keto-retro steroids lithium give the corresponding 11-methyl-11-hydroxy steroids. In this manner, 11-keto-retro-progesterone 3,20-bisethylene ketal may be converted to the corresponding 11-methyl-11-hydroxy compound. After acid hydrolysis, this provides 11-methyl-11-hydroxy-retro-progesterone.

Further, 11-keto-retro-testosterone 3-ethylene ketal may be converted into the corresponding 11-methyl-11-hydroxy compound. After acid hydrolysis, this yields the 11-methyl-11-hydroxy-retro-testosterone.

The reaction of 6-keto-retro-steroids with methyl magnesium halides gives the 6-methyl-6-hydroxy steroids, for example by the method described by Fieser et. al. (J. Am. Chem. Soc., 73, 4660 (1951)). In this manner, 6-keto-retro-pregnane-3-ol-20-one 20-ethylene ketal may be converted into 6-methyl-3,6-dihydroxy-retro-pregnane-20-one 20-ethylene ketal.

Further, 6-keto-retro-androstane-3,17-diol may be converted into 3,6,17 - trihydroxy-6-methyl-retro-androstane. The reaction of 3-keto-retro steroids with methyliodide in the presence of potassium-t-butoxide by the procedure of Ringold et al. (J. Am. Chem. Soc., 81, 427 (1959)) provides the corresponding 2,2-dimethyl steroids. In this manner, 2,2-dimethyl-retro-pregnane-3,20-dione 20-ethylene ketal may be produced from retro-pregnane-3,20-dione 20-ethylene ketal.

Further, 2,2-dimethyl-retro-androstane - 17$\beta$-ol-3-one may be produced from retro-androstane-17$\beta$-ol-3-one.

Addition of methyl Grignard reagents to $\Delta^{16}$-20-keto-retro-pregnanes according to the method described by Bernstein et al. (J. Org. Chem., 26, 269 (1961)) provides 16-methyl compounds. Thus, 3$\beta$-hydroxy-16-methyl-retro-pregn-5-ene-20-one may be produced from 3$\beta$-acetoxy-retro-pregna-5,16-diene-20-one.

Conversion of 3-keto-$\Delta^4$-retro-steroids with methyl halides in the presence of potassium-t-butoxide by the procedure of Woodward et al. (J. Am. Chem. Soc., 76, 2852 (1954)) gives 3-keto-4,4-dimethyl-$\Delta^5$-steroids. For example, such a reaction with bismethylene-dioxy-retro-hydrocortisone gives the 4,4-dimethyl-17(20),20-bismethylene-dioxy-retro-pregn-5-ene-3,20-dione.

Further, with retro-testosterone, such a reaction gives the 4-4, dimethyl-retro-androst-5-ene-17$\beta$-ol-3-one.

(2) By the addition of diazomethane to double bonds, succeeded by pyrolysis or cleavage under acid conditions of the pyrazolines, if required with subsequent hydrogenation of the compounds obtained. According to the procedure of Wiechert and Kaspar (Chem. Ber., 93, 1710 (1960)) $\Delta^{1,4,6}$-3-keto-retro-steroids react with diazomethane with the formation of pyrazolines, from which the 1,2-methylene-$\Delta^{4,6}$-3-keto-steroids are produced by pyrolysis. Under the action of, for example, acid alumina, however, the pyrazolines are converted into the $\Delta^{1}$-1-methyl steroids. For example, 17$\alpha$-acetoxy-1,2-methylene-retro-pregna-4,6-diene,3,20-dione and 17$\alpha$-acetoxy-1-methyl-retro-pregna-1,4,6-triene-3,20-dione may be produced from 17$\alpha$-acetoxy-retro-pregna-1,4,6-triene-3,20-dione.

Further, 1,2-methylene-retro-androsta-4,6-diene-17$\beta$-ol-3-one 17-acetate and 1-methyl-retro-androsta-1,4,6-triene-17$\beta$-ol-3-one 17-acetate may be produced from retro-androsta-1,4,6-triene-17$\beta$-ol-3-one 17-acetate.

(3) By the reaction of a methylene group

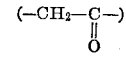

activated by a keto-group, with a mono- or dicarboxylic acid ester

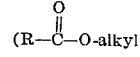

where R may be H or

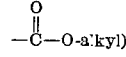

succeeded by a reaction with an alkyl halide with subsequent splitting off of the carboxylic acid group.

For example, 3-keto-$\Delta^4$-retro-steroids when reacted with diethyloxalate in the presence of sodium hydride according to the method described by Ringold et al. (J. Am. Chem. Soc., 81, 427 (1959)), after reaction with a methyl halide followed by a reaction with an alkali-alkoxide give the 2-methyl-3-keto-Δ⁴-retro-steroids. Thus, from retro-pregn-4-ene-20-ol-3-one 20 acetate the 2-methyl-retro-pregn-4-ene-20-ol-3-one 20-acetate may be produced.

Further, in this manner 2-methyl-retro-testosterone may be produced from retro-testosterone.

(4) By the reaction of retro-steroid epoxides with, for example, alkyl Grignard reagents. For example, 3-cyclo-ethylenedioxy-5(6) - epoxy - retro - steroids after reaction with methyl magnesium halides according to the method described by Babcock et al. (J. Am. Chem. Soc., 80, 2904 (1958)) give the 6-methyl-5-hydroxy compounds, from which after hydrolysis and dehydration the 6-methyl-3-keto-Δ⁴-retro-steroids can be produced. Such a reaction with, for example, 5,6-epoxy-17α-hydroxy-retro-pregnane-3,20-dione bisethylene acetal gives the corresponding 5-hydroxy-6-methyl compound which, after hydrolysis and subsequent dehydration, provides the 6-methyl-17α-hydroxy-retro-progesterone.

Further, from 5,6-epoxy-retro-androstane-3,17-diol may be obtained in this manner 5-hydroxy-6-methyl-retro-androstane-3,17-diol.

The introduction of double bonds in retro-steroids may be effected by the following methods:

(1) By microbiological dehydrogenation, as described, for example, for the production of 1-dehydro-steroids by Sih et al. (J. Am. Chem. Soc., 82, 2653 (1960)). In this manner, retro-progesterone may be converted into 1-dehydro-retro-progesterone, or, retro-testosterone may be converted into 1-dehydro-retro-testosterone.

(2) By the direct dehydrogenation of saturated or non-staturated steroid ketones and of unsaturated steroids with, for example, mercury acetate, iodine pentoxide, selenium dioxide, manganese dioxide, substituted quinones such as chloranil and dichlorodicyanobenzoquinone, for example by the methods of Heilbron et al. (J. Chem. Soc., 1935, 1221), Burn et al. (Proc. Chem. Soc. 1960, 14), Agnello et al. (J. Am. Chem. Soc., 82, 4293 (1960)) and Sondheimer et al. (J. Am. Chem. Soc., 75, 5932 (1953)). In this manner, 6-dehydro-retro-progesterone may be produced from retro-progesterone and 1,6-bisdehydro-17α-acetoxy-retro-progresterone may be produced from 6-dehydro-17α-acetoxy-retro-progresterone. 3,17-diacetoxy-retro-androsta-5,7,9(11)-triene may be obtained from 3,17-diacetoxy-retro-androsta-5,7-diene, and 1-dehydroretro-testosterone may be obtained from retro-testosterone.

(3) By the splitting off of substituents, for example dehydrohalogenation of halogenated retro-steroids, for example with an organic base, as has been described by Djerassi et al. (J. Am. Chem. Soc., 72, 4534 (1950)) for the production of 6-dehydro- from 6-halo steroids. In this manner, 6-dehydro-retro-progesterone may be produced from 6-bromo-retro-progesterone. Further, 6-dehydro-retro-testosterone 17-acetate may be produced from 6-bromo-retro-testosterone 17-acetate.

Another example of splitting off is the dehydration of hydroxylated retro-steroids, for example under the influence of phosphorus-oxychloride and an organic base, from methane sulphonyl chloride or from methyl chlorosulphite, for example by the methods described by Chamberlin et al. (J. Org. Chem., 25, 295 (1960)). In this manner, retro-hydrocortisone acetate may be converted into 17α,21-dihydroxy-retro-pregna-4,9(11)diene-3,20-dione 21-acetate. Further, 11-hydroxy-retro-androst-4-3n3-3,20-dione may be converted into retro-androsta-4,9(11)-diene-3,20-dione.

The introduction of hydroxy groups into retro-steroids may be effected as follows:

(1) By microbiological hydroxylation, for example as described by Peterson et al. (J. Am. Chem. Soc., 74, 1871 (1952)). In this manner, 11,17α,21-trihydroxy-retro-pregn-4-ene-3,20-dione may be produced by microbiological hydroxylation of 17α,21-dihydroxy-retro-pregn-4-ene-3,20-dione. Further, 11-hydroxy-retro-testosterone may be produced by microbiological hydroxylation of retro-testosterone according to the same method.

(2) By cleavage of epoxy-retro-steroids. This may be effected by means of reducing agents, such as, for example, alkali-barium- and alkali-aluminum-hydride, chromium salts, and by catalytic hydration. According to the method described by Cole et al., (J. Org. Chem., 19, 131 (1954)), the 16 hydroxy compounds may be produced from 16,17-epoxy-retro-steroids. Thus, 16,17-epoxy-retro-pregn-4-ene-21-ol-3,20-dione yields the retro-pregn-4-ene-16,21-diol-3,20-dione. Further 3,17-dihydroxy-5(6)-epoxy-retro-androstane may be converted into 3,6,17-trihydroxy-retro-androstane.

Cleavage of epoxy-retro-steroids may also be performed by means of hydro halogenic acids, for example as described by Ringold et al. (J. Am. Chem. Soc., 78, 816 (1956)) for the production of 17α-hydroxy-pregnanes from 16,17-epoxy-pregnanes. According to this method, 16,17-epoxy-retro-progesterone, after reaction with hydrogen bromide succeeded by reductive debromination, yields the 17α-hydroxy-retro-progesterone. Further, 9(11)-epoxy-retro-androst-4-ene-17β-ol-3-one with hydrogen fluoride yields 11-hydroxy-9-fluoro-retro-testosterone.

(3) By hydroxylation of double bonds, for example with osmium tetroxide. For example, osmate esters, produced by oxidation of alkenes with osmium tetroxide, are split up into the diols, employing the procedure of Baran (J. Org. Chem. 25, 257 (1960)). In this manner, 3-hydroxy-retro-pregn-5-ene-20-one may be converted into 3,5,6-trihydroxy-retro-pregnane-20-one. Further, 3β-hydroxy-retro-androst-5-ene-17-one may be converted into 3β,5,6-trihydroxy-retro-androstane-17-one.

(4) By the reaction of enol ethers or enol esters with organic peracids. If, for example, Δ³,⁵-3-enol acylates are reacted with per-acids, employing the methods of Romo et al. (J. Org. Chem., 19, 1509 (1954)), the 3-keto-Δ⁴-6-hydroxy steroids are produced. Thus, 3-acetoxy-retro-pregna-3,5-diene-20-one with monoperphtalic acid yields the 6-hydroxy-retro-progesterone. Further, 3,17β-diacetoxy-retro-androsta-3,5-diene with monoperphtalic acid yields the 6-dehydro-retro-testosterone 17-acetate.

(5) By the hydrolysis or acyloysis of halo-steroids, for example with an alkali salt of a carboxylic acid by the method of Ruschig (Ber., 88, 878 (1955)), 21-iodo-steroids being converted with potassium acetate into the 21-acetoxy compounds. Hydrolysis of these compounds, for example according to Robinson (J. Am. Chem. Soc. 82, 4611 (1960)) with perchloric acid yields the free 21-hydroxy compounds. The hydrolyses may suitably be performed with a solution of potassium bicarbonate in aqueous methanol. Thus, 21-iodo-retro-progesterone may be converted into 21-acetoxy-retro-progesterone, which again may be converted by hydrolysis into 21-hydroxy-retro-progesterone. Further, in this reaction 6-bromo-retro-testosterone 17-acetate gives 2-acetoxy-retro-testosterone 17-acetate, from which, after hydrolysis, 2-hydroxy-retro-testosterone is obtained.

(6) By reduction of keto-steroids, for example with lithium aluminum hydride by the method described by Sondheimer et al. (J. Am. Chem. Soc., 75, 5930, 5932 (1953)). In this manner, retro-progesterone may be reduced to retro-pregn-4-ene-diol. Further, for example, retro-androst-4-ene-3,17-dione may be reduced to retro-androst-4-ene-3,17-diol.

(7) By hydrolysis of esters or ethers, for example by the method of Dory et al. (C.A., 53, 17181 (1955)) with sodium methylate in methanol. The saponification may also be performed with dilute inorganic acids, dilute inorganic bases, sodium carbonate and sodium bicarbonate. Thus, hydrolysis of 17α,21-dihydroxy-retro-progesterone 21-acetate with sodium bicarbonate in dilute dioxane gives the 17α,21-dihydroxy-retro-progresterone. Further, the hydrolysis of retro-testosterone 17-acetate gives retrotestosterone.

The introduction of acyloxy groups into the retro-steroid series may be carried out as follows:

(1) By acyloysis of halo-retro-steroids as described hereinbefore.

(2) By the reaction of hydroxy- and keto-retro-steroids with acids, acid anhydrides or acid chlorides in the presence of, for example, a catalyst (for example, p-toluene sulphonic acid, pyridine-HCl) or acid binding reagents (for example organic bases) or water-binding reagents (such as, for example, trifluoro acetic acid anhydride). For example, 17α-ethyl-retro-testosterone may be esterified with the acid chloride of β-phenyl-propionate in pyridine by the method of Gould et al. (J. Am. Chem. Soc., 79, 4472 (1957)) to form 17-(β-phenyl-propionate) ester of 17α-ethyl-retro-testosterone. Further, retro-androst-4-ene-17β-ol-3-one 17-(β-phenyl propionate) may be obtained by esterification of retro-testosterone with the acid chloride of β-phenyl propionic acid in pyridine.

The introduction of alkoxy and aralkoxy groups into the 10α methyl 9β steroid series may be carried out as follows:

(1) By the reaction of keto-retro-steroids with a suitable hydroxy compound (mono or poly), for example, in the presence of a catalyst, such as, for example, hydrochloric acid, pyridine-hydrochloric acid and p-toluene sulphonic acid, employing the method described by Ercoli et al. (J. Am. Chem. Soc., 82, 746 (1960)). In this manner, the cyclopentyl enolether of 17α-acetoxy-retro-progesterone may be produced. Another example is the production of the 3-enol benzyl ether of 6-dehydro-retro-progesterone by the action of benzyl alcohol and hydrochloric acid on 6-dehydro-retro-progesterone. Further, the cyclopentyl enol ether of retro-testosterone may be produced in this manner from retro-testosterone and cyclopentanol.

(2) By an acid-catalysed interchange reaction between the chosen hydroxy compound and preformed enol ether, for example by the method of Ercoli et al. (J. Am. Chem. Soc., 82, 746 (1960)). In this manner, 3-enol ethyl ether of retro-progesterone may be converted into 3-enol benzyl ether, or, 3-enol ethyl ether of retro-testosterone may be converted into 3-enol benzyl ether.

(3) By the reaction of keto-retro-steroids with trialkyl orthoformates with the use of an acid catalyst, for example an ethanolic hydrogen chloride solution, for example by the method of Ruyle et al. (J. Org. Chem., 25, 1260 (1960)). In this manner, 17α-[2′-methallyl]-retro-testosterone may be converted into 3-ethoxy-17α-[2′-methallyl]-retro-androsta-3,5-diene-17β-ol, or retro-testosterone may be converted into 3-ethoxy-retro-androsta-3,5-diene-17β-ol.

(4) By the reaction of a hydroxy-retro-steroid with an alcohol in the presence of a catalyst, such as, for example, an inorganic acid or p-toluene sulphonic acid, for example by the method of Sondheimer et al. (Tetrahedron, 5, 15 (1959)). In this manner, 3-methoxy-retro-pregn-4-ene-20-one may be produced from 3-hydroxy-retro-pregn-4-ene-20-one, 3-methoxy-retro-androst-4-ene-17β-ol from 3,17β-dihydroxy-retro-androst-4-ene, 3-methoxy-retro-pregn-4-ene-20-one from 3-hydroxy-retro-pregn-4-ene-20-one, and 3-methoxy-retro-androst-4-ene-17β-ol from 3,17β-dihydroxy-retro-androst-4-ene.

(5) By the reaction of a hydroxy-retro-steroid with diazomethane in the presence of a catalytic amount of fluoboric acid by the method of Neeman et al. (Tetrahedron, 6, 36 (1959)). Thus 3-methoxy-retro-pregn-4-ene-20-one is obtained from retro-pregn-4-ene-3-ol-20-one. Further, 3-hydroxy-retro-androst-4-ene-17-one may be converted into 3-methoxy-retro-androst-4-ene-17-one.

The production of halo-retro-steroids may be carried out as follows:

(1) By the addition of halogen to double bonds in retro-steroids, for example by addition of chlorine to 3-hydroxy-Δ⁵-retro-steroids or addition of mixed halogens, such as BrF and JF, to Δ⁹⁽¹¹⁾-retro-steroids according to Bowers et al. (J. Am. Chem. Soc., 82, 4001 (1960)). By this method, 17α,21-dihydroxy-retro-pregna-4,9(11)-diene-3,20-dione al-acetate may be converted into the 9,11-dihalo compounds. Thus, for example, 9(11)-dehydro-retro-testosterone may be converted into 9,11-dihalo-retro-testosterone.

(2) By the substitution-halogenation at an allyl position adjacent to a double bond or of a methylene group adjacent to a keto group in retro-steroids, for example with bromine, N-bromo-succinimide, dibromo-dimethyl-hydantoin etc., for example by the method of Djerassi et al. (J. Am. Chem. Soc., 72, 4534 (1950)) for the production of 6-halo-3-keto-Δ⁴-steroids from 3-keto-Δ⁴-steroids. Thus, retro-progesterone 20-cyclo-ethylene ketal may be brominated to form the 6-bromo compound and retro-testosterone 17-acetate may be converted into 6-bromo-retro-testosterone 17-acetate. Furthermore, retro-pregn-5-ene-3β-al-20-one 3-acetate may be converted into 17α-bromo-retro-pregn-5-ene-3β-ol-20-one 3-acetate, the double bond being protected during the reaction by conversion of the dibromide by the method of Engel et al. (Can. J. Biochem. Physiol. 35, 1047 (1957) and Can. J. Chem. 38, 452 (1960)).

(3) By the reaction of enol esters, enol ethers and enamines with halogenating agents, such as, for example, halogen, N-halo-imides, perchlorylfluoride, BrF. In this manner, 3-enol esters of 3-keto-Δ⁴-retro-steroids may be converted with perchlorylfluoride according to the method of Bloom et al. (Chem. a. Ind. 1959, 1317) into the 3-keto-Δ⁴-6-fluoro-retro-steroids. By this method, the 3-enol acetate of retro-progesterone may be converted into 6α- and 6β-fluoro-retro-progesterone, and 3-enol acetate of retro-testosterone 17-acetate may be converted into 6α- and 6β-fluoro-retro-testosterone 17-acetate.

Furthermore, the 3-enol ethers of 3-keto-Δ⁴-retro-steroids may be converted with N-halo-imides by the method of Ringold et al. (J. Am. Chem. Soc., 81, 3485 (1959)) into the 6-halo-3-keto-Δ⁴-retro-steroids. Thus, reaction of 3-ethyl enol ether of 17α-acetoxy-retro-progesterone with N-chlorosuccinimide gives 6-chloro-17α-acetoxy-retro-progesterone. Further, reaction of 3-enol ethyl ether of retro-androst-4-ene-3,17-dione with N-chlorosuccinimide yields 6-chloro-retro-androst-4-ene-3,17-dione.

Furthermore, the enamines of 3-keto-Δ⁴-retro steroids may be converted by a reaction with perchlorylfluoride followed by isomerisation with, for example, hydrochloric acid by the method of Joly et al. (Bull. 1961, 569) into 3-keto-4-fluoro-Δ⁴-retro-steroids. Thus, the 3-pyrrolidyl-Δ³,⁵-enamine of 17α-acetoxy-retro-progesterone yields the 4-fluoro-17α-acetoxy-retro-progesterone, and 3-pyrrolidyl-Δ³,⁵-enamine of retro-testosterone yields 4-fluoro-retro-testosterone.

(4) By the reaction of retro-steroids of the following type: retro-steroid

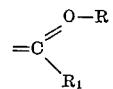

where R is an alkyl group and $R_1$ may be H or

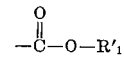

where $R'_1$ may be an alkyl group, which may be obtained by condensation of a methylene group

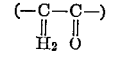

activated by a keto-group with a mono- or dicarboxylic acid ester (for example ethylformate, diethyloxalate), with halogenating agents, such as halogen and perchlorylfluoride, with subsequent splitting off of the carboxylic acid group. Thus, according to the method of Kissman et al. (J. Am. Chem. Soc. 82, 2316 (1960)), the sodium salt 21-ethoxallyl-retro-progesterone may be converted with perchloryl-fluoride and subsequent treatment with potassium acetate into 21-fluoro-retro-progesterone. Substitution of bromine for the perchlorylfluoride gives 21-bromo-retro-progesterone. Further, according to the method of Edwards et al. (J. Am. Chem. Soc. 81, 5262 (1960)) 2-fluoro-retro-testosterone may be produced from the sodium salt of 2-hydroxymethylene-retro-testosterone by reaction with perchlorylfluoride and subsequent treatment with potassium acetate.

(5) By cleavage of epoxides, for example with hydrohalogenic acids or $BF_3$, for example by the method of Romo et al. (J. Org. Chem. 21, 902 (1956)), according to which 16(17)-epoxides are treated with HBr. Thus 16(17)-epoxy-retro-progesterone may be converted into 16-bromo-17α-hydroxy-retro-progesterone. According to the method of Bowers et al. (Tetrahedron 3, 14 (1958)), 6-fluoro-3,17-diacetoxy-retro-androstane-5-ol may be produced from 3,17-diacetoxy-5(6)-epoxy-retro-androstane.

The introduction of oxo-groups in retro-steroids may be carried out as follows:

(1) By oxidation of hydroxy-retro-steroids, for example according to Oppenauer as described for the normal series by Shepherd et al. (J. Am. Chem. Soc. 77, 1212 (1955)). By this method, retro-pregn-5-ene-3-ol-20-one may be converted into retro-progesterone, or retro-androst-5-ene-3-ol-17-one may be converted into retro-androst-4-ene-3,17-dione. The oxidation may also be performed with chromic acid, for example in pyridine, by the method of Sondheimer et al. (Tetrahedron 5, 15 (1959)). Thus, 20-hydroxy-retro-pregn-4-ene-3-one may be converted into retro-progesterone. Further, from retro-testosterone will be obtained androst-4-ene-3,17-dione. The oxidation of hydroxy-groups occupying an allyl position with respect to a double bond, may suitably be performed with manganese dioxide, for example by the method of Sondheimer et al. (J. Am. Chem. Soc. 75, 5930 (1953)) and with quinones, such as, for example, dichloro-dicyano-benzoquinone as described by Burn et al. (Tetrahedron Letters 9, 14 (1960)). Thus, retro-pregn-4-ene-3,20-diol may be converted into 20-hydroxy-retro-pregn-4-ene-3-one, and according to these two manners, retro-androst-4-ene-3,17β-diol may be converted into retro-testosterone.

(2) By oxidation of $\Delta^{17(20)}$ double bonds for example by ozonisation with the formation of 17-ketones, employing the method of Pederson et al. (J. Am. Chem. Soc. 79, 115 (1957)). Thus, ozonisation of the 22-cyanohydrin of retro - bisnorchola - 4,17(20)-diene-3-on-22-al gives the retro-androst-4-ene-3,17-dione.

(3) By hydrolysis of enol esters or enol ethers of retro-steroids, for example by acid hydrolysis as described by Serini et al. (Ber. 71, 1766 (1938)). Thus, 3-ethoxy-retro-pregn-3,5-diene-20-one may be hydrolysed to retro-progesterone. Further, 3-ethoxy-retro-androsta-3,5-diene-17-one may be hydrolysed to retro-androst-4-ene-3,17-dione.

(4) By the microbiological oxidation of hydroxy-retro-steroids, for example as described by Perlman (Science, 115, 529 (1952)). Thus, retro-pregn-4-ene-3-ol-20-one may be converted into retro-progesterone, or 17-acetoxy-retro-androst-5-ene-3-ol may be converted into retro-testosterone 17-acetate. The production of acylthio-retro-steroids may be effected by the method of Dodson et al. (J. Am. Chem. Soc. 81, 1224 (1959)), for example for the introduction of 1- and 7-acylthio groups. Thus, 6-dehydro-retro-progesterone after reaction with ethanethiolic acid gives 7-acethylthio-retro-progesterone. Further, 6-dehydro-retro-testosterone after reaction with ethanethiolic acid yields the 7-acetylthio-retro-testosterone.

The production of amino-retro-steroids may be effected by reduction of retro-steroid-oximes, for example with $LiAlH_4$, as described by Shoppee et al. (J. Chem. Soc., 1956, 1649). Thus, the dioxime of 6-dehydro-retro-progesterone yields 3,20-diamino-retro-pregna-4,6-diene. Further, the oxime of retro-testosterone with $LiAlH_4$ in ether yields the 3-amino-retro-androst-4-ene-17β-ol.

The production of monoalkyl- and dialkyl-substituted amino 10α-methyl, 9β-steroids may be effected by reacting amino- or monoalkyl substituted amino 10α-methyl, 9β-steroids with alkyl halides, for example with an alkyl bromide. Thus 3-amino-retro-androstan-17β-ol when reacted with methyl bromide yields 3-(N-methylamino)-retro-androstan-17β-ol.

The production of retro-steroid [2,3-d] isoxazoles may be performed by the method of Clinton et al. (J. Org. Chem. 26, 279 (1961)), by reacting 3-keto-2-hydroxymethylene retro-steroids with hydroxylamine hydrochloride. Thus, 2-hydroxymethylene-17α-allyl-retro-testosterone may be converted into 17-hydroxy-17α-allyl-retro-androst-4-eno [2,3-d] isoxazole. Further, 2-hydroxymethylene-retro-testosterone may be converted into 17β-hydroxy-retro-androst-4-eno [2,3-d] isoxazole.

The production of retro-steroid [3,2-c] pyrazoles may be performed by the method of Clinton et al. (J. Am. Chem. Soc. 81, 1513 (1959)), by reacting 3-keto-2-hydroxymethylene retro-steroids with hydrazine. Thus, 2-hydroxymethylene-retro-pregn-4-ene-20-ol-3-one by reaction with hydrazine yields 20-hydroxy-retro-pregn-4-eno [3,2-c] pyrazole. Further, reaction of 2-hydroxymethylene-6-dehydro-retro-testosterone with hydrazine gives 17β-hydroxy-retro-androsta-4,6-dieno [3,2-c] pyrazole.

The preparation of oxido 10α-methyl-9β steroids can be performed by reacting a double bond between the carbon atoms under consideration with an oxidizing agent such as hydrogen peroxide in the presence of an alkali or with an organic peracid such as monoperphthalic acid. Thus 6-dehydro-retro-progesterone when reacted with monoperphthalic acid yields 6,7 - oxido - retro-progesterone.

The introduction of methylene groups into 10α-methyl 9β steroids may be effected by the addition of diazomethane to the double bond present in such a steroid and cleavage of the thus obtained pyrazolines according to the procedure of Wiechert and Kaspar (Chem. Ber. 93, 1810 (1960)). Thus 16-dehydro-retro-progesterone may be converted into 16-methylene-retro-progesterone.

The introduction of thiol groups (—SH) into 10α methyl 9β steroids may be effected as follows:

The reaction of a steroidtosylate with thiourea and splitting of the thus formed isothiouromium compound with alkali hydroxide affords the desired thiol 10α methyl 9β steroid. Thus 3-thioloandrost-4-en-17β-ol 17-acetate can be prepared from 3-tosyloxyandrost-4-en-17β-ol 17-acetate.

The introduction of the thio analogues of alkoxy and aralkoxy groups into 10α methyl 9β steroids can be effected by reacting an oxo-10α methyl, 9β-steroid with an alkyl thiol or an aralkyl thiol respectively in the presence of a catalyst such as p-toluene sulphonic acid. Thus retro-testosterone when reacted with ethyl mercaptane yields 3-enol ethyl thio ether and when reacted with benzyl-mercaptane yields 3-enol benzylthioether of retro-testosterone.

The preparation of 2′-methyl-(3,2-d)-thiazoles may be carried out according to the process described by Doorenbos et al. (J. Pharm. Sc. 50, 271 (1961)) by reacting 2-bromo-3-keto retro-steroids with thiacetamide. Thus 2-bromo - 17α - methyl-retro-testosterone may be converted into 2′ - methyl - (3,2-d) - thiazolo - 17α - methyl - retro - androsta-2,4-dien-17-ol.

The synthesis of 2′-amino - (3,2-d) - pyrimidino retro-steroids may conveniently be performed by the reaction of 2-hydroxy methylene-3-keto-retro-steroids with guanidine according to the process described in Bull. Off. de la Trop. Ind. 1, 344 (1961). Thus 2′-amino-(3,2-d)-pyrimidino-retro-androsta-4,6-dien-17β-ol 17-acetate can be prepared from 2 - hydroxymethylene-6-dehydro-retro-testosterone 17-acetate.

The production of 6-nitro retro-steroids may be effected by nitration of 3,5-dienylacylates of retro-steroids as described by Bowers et al. (J. Am. Chem. Soc. 81, 3707

(1959)). Thus, 3,17α-diacetoxy-retro-pregna-3,5-dien-20-one can be converted into 6-nitro-17α-acetoxy-retro-progesterone.

The introduction of an oxygen atom in the 18-methyl group in retro-steroids can for instance be carried out by the irradiation of a 11-nitrite of 11-hydroxy-retro-steroids according to the process described by Barton et al. (J. Am. Chem. Soc. 82, 2641 (1960)). Thus retro-corticosterone 21-acetate can be esterified into the corresponding 11-nitrite. Irradiation of this compound in toluene yields the retro-aldosterone 21-acetate oxime, which can be transformed by the action of sodium nitrite in acetic acid into retro-aldosterone 21-acetate.

Retro-17-spirolactones may be prepared by reaction of a 17α-acetylenic substituted retro-steroid with an alkyl Grignard halide, decomposing the complex thus formed with carbon dioxide and after hydrogenation lactonizing the thus formed hydroxy-acid, as described by Cella et al. (J. Org. Chem. 24, 743 (1959)). Thus 17α-ethinyl-3,17-dihydroxy-retro-androst-5-ene is converted into 3,17-dihydroxy-retro-androst-5-en-17α-ylpropynoic acid, after which catalytic hydrogenation yields 3-(3,17-dihydroxy-retro-androst-5-en-17α-yl) propenoic acid lactone. Repeated hydrogenation gives the corresponding 17-propanoic lactone, which by means of an Oppenauer-oxidation can be converted into the 3-keto-$\Delta^4$-retro spirolactone.

Trihalo methyl-retro-steroids can be prepared by the reaction of enol ethers of unsaturated ketones with tetrahalo methanes as described by Lusberg et al. (Tetrahedron 9, 149 (1960)). Thus the reaction of the $\Delta^{3,5}$-enolethyl ether of retro-progesterone with tetrabromomethane yields 6-tribromomethyl-retro-progesterone. In the same manner the trifluoro- and trichloro compounds may be prepared. The latter compound can by splitting off HBr and/or reduction be converted in 6-methyl-retro-progesterone.

The methods of preparing the novel retro steroids of our invention will now be explained in greater detail in the examples which follow.

*Example 1*

(a) By very vigorous stirring, 125 g. of Δ4,7,22-lumistatrien-3-one were dissolved at 10° C. in 2.2 litres of dry propanol-2, which had previously been saturated with dry hydrochloric acid gas. The hydrochloric acid gas was slowly passed through the liquid for an additional half hour. The liquid was then decanted as rapidly as possible, while stirring, into a mixture of solid sodium bicarbonate and a saturated bicarbonate solution, obtained by stirring 4 kg. of sodium bicarbonate with 8 litres of water. After a short period of time the yellowish propanol-2 layer was separated out and the salt layer extracted twice with one litre of petroleum ether. The combined layers were then washed three times with a sodium bicarbonate solution and water, then dried on sodium sulphate and evaporated to dryness after filtering. The ultraviolet absorption spectrum exhibited a maximum at 287 mμ, of which the $E^{1\%}_{1\,cm.}$ is 562 (content of pure substance about 85%).

The residue obtained was dissolved in 250 ml. of boiling petroleum ether (40 to 60° C.) and crystallized at −5° C. for a few hours and finally overnight at −25° C. Filtering yielded 80.5 g. of lumista-4,6,22-trien-3-one with a melting point of 99 to 100.5° C. (yield 64%). A portion of the last substance was recrystallized a few times with petroleum ether for analysis, the melting point rising to 101–102° C. The further analytical values were:

$[\alpha]_D^{25}=-632°$ (CHCl$_3$)·$\epsilon(\lambda=287$ m$\mu)=26,200$.

Found: C. 85.67%; H, 10.65%; C, 85.68%; H, 10.77%. Calculated for C$_{28}$H$_{42}$O: C, 85.22%; H, 10.73%.

In the infrared spectrum there were found apart from the 964 cm.$^{-1}$ band for the side chain trans-ethylene bond three characteristic bands at 1586, 1622 and 1661 cm.$^{-1}$.

(b) While stirring vigorously, a solution of 3.0 g. of lumista-4,6,22-trien-3-one in 300 ml. of dry diethylether was added to 450 ml. of liquid ammonia. During the addition of the first portion of the solution crystallization occurred but the solid dissolved after a larger portion had been added. Then, while stirring vigorously, a solution of 420 mg. of lithium in 100 ml. of ammonia was carefully added in drops until no spontaneous decoloring occurred any more. 90 ml. of dry ethanol were then added dropwise, stirring was continued for 30 minutes, the mixture was diluted with water and the reduction product was dissolved in diethyl ether. The ethereal extracts were then extensively washed with water, dried on Na$_2$SO$_4$, filtered and evaporated to dryness yielding a light-yellow resin.

($E^{1\%}_{1\,cm.}$ ($\lambda$ max. 242 m$\mu$)=196)

The resin was dissolved in 100 ml. of boiling ethanol and after the addition of 6 ml. of 2 N NaOH the solution was boiled for five minutes. The solution was then rapidly cooled. By diluting with water, absorbing in diethyl ether, washing of the ethereal layers with water, drying, filtering and evaporating to dryness, a light-brown residue was finally obtained with $E^{1\%}_{1\,cm.}$ ($\lambda$ max. 242 m$\mu$)=420

This substance was chromatographed in 25 ml. of pure benzene on 30 g. of Al$_2$O$_3$ (III) and eluated with the same solvent (total 75 ml.), a dark brown ring remaining at the upper end of the column. The dry eluate was recrystallized with 45 ml. of methanol at 5° C., after which the filtered product was washed with 20 ml. of methanol of −25° C. The yield was long light-brown needles (1.5 to 2 cms. in length), weight 2.43 g. and melting point 122 to 124° C.

500 mg. of this substance were recrystallized twice with 3 ml. of acetone at −5° C., after which finally 313 mg. of colorless crystals of lumista-4,22-dien-3-one were obtained.

The analytic values found for this pure substance were: $\epsilon(\lambda$ 242 m$\mu)=16,800$, melting point 122–124° C. $[\alpha]_D^{20}=-125°$ (CHCl$_3$).

Found: C, 84.98%; H, 19.96%; C, 84.89%; H, 11.03%. Calculated for C$_{28}$H$_{44}$O: C, 84.79%; H, 11.17%.

In the infrared spectrum an intense band was found at 1665 cm.$^{-1}$, a slightly weaker band at 1620 cm.$^{-1}$, a weak band at 962 cm.$^{-1}$, and a slightly more intense band at 978 cm.$^{-1}$.

20 g. of lumista-4,22-dien-3-one was dissolved in a mixture of 750 ml. of freshly distilled methylene chloride and 5.75 ml. of dry pyridine. The mixture, while being stirred magnetically at −80° C. (carbon dioxide ice and acetone) for 4 and ½ hours was ozonised (0.205 mol ozone per min.), speed of passing oxygen (V$_{O_2}$)=9 to 10 l./hour. The ozonide formed was then decomposed at 0° C. for one hour by stirring it with a suspension of 20 g. of zinc powder, after the addition of 105 ml. of glacial acetic acid. The reaction mixture was then warmed for 5 minutes at 35° C., and then the resultant solid substance was separated out by filtering. After the addition of ice the filtrate was washed successively with 75 ml. and 50 ml. of ice cold 10% Na$_2$CO$_3$ solution, three times with 50 ml. of 10% NaOH solution at 0° C. and four times with 300 ml. of ice water.

The methylene chloride layer was then dried on Na$_2$SO$_4$, filtered and the filtrate was distilled to dryness, the last part of which was carried out in vacuo. The colorless, practically completely crystalline residue was recrystallized with 50 ml. of diethylether at −25° C., the first crystallate being 10.1 g. of 3-keto-retro-bisnorchol-4-en-22-al with a melting point of 119 to 121° C. This material was further purified by a few recrystallizations with petroleum ether (boiling region 40 to 60° C.) to which a few drops of ethyl alcohol had been added, and with diethylether.

The analytic values of this pure substance were:
M.P. 122–130° C. $\epsilon(\lambda$ max. 242.5 m$\mu)=16,700$ $[\alpha]_D^{23}=-144°$ C. (CHCl$_3$).

Found: C, 79.87%; H, 9.73%; C, 80.06%; H, 9.81%. Calculated for C$_{22}$H$_{32}$O$_2$: C, 80.42%; H, 9.82%.

The infrared spectrum showed characteristic bands at 1712, 1642 and 1610 cm.$^{-1}$.

(c) A solution of 450 mg. of 3-keto-retro-bisnorchol-4-en-22-al obtained as described in Example 1b in 15 ml. of chloroform and 25 ml. of acetic acid, in which 200 mg. of chromic acid and 0.2 ml. of water had been dissolved was oxidized at about 30° C. for 16 hours.

After the excess quantity of chromic acid had been decomposed by stirring for 30 minutes with 1.5 ml. of methanol, the mixture was diluted with water and the substance was dissolved in benzene. The benzene extract was washed with water to neutral reaction, dried on $Na_2SO_4$ and filtered. After evaporation to dryness a crystalline residue was obtained, which by crystallization with diethylether yielded 340 mg. of 3-keto-retro-bisnor-chol-4-enic acid, melting point 194 to 198° C. A few crystallizations raised the melting point of this substance to 202 to 204° C.

The further analytic values found for this pure substance were:

$\epsilon(\lambda$ max. $=242$ m$\mu)=16,800$.
Calculated for $C_{22}H_{32}O_3$: C, 76.70%; H, 9.36%. Found: C, 76.93%; H, 9.45%; C, 76.92%; H, 9.48%.

(d) A solution of 450 mg. of an ozonide in 25 ml. of methylenechloride obtained in the manner described in Example 1b, by ozonizing lumista-4,22-dien-3-one, was oxidized with a solution of 200 mg. of chromic acid in 25 ml. of acetic acid overnight at 30° C. The excess quantity of chromic acid was then decomposed by stirring with 2 ml. of methanol for 30 minutes.

After dilution with water, the mixture was dissolved in diethyl ether and the ether methylene chloride extract was washed three times with 50 ml. of 2% NaOH. These layers were combined, extracted again with diethyl ether to remove residues of neutral constituents. The organic acid was freed by acidifying with concentrated hydrochloric acid and dissolving in diethylether. After neutral washing with water, the mixture was dried on $Na_2SO_4$, filtered and finally evaporated to dryness; the yield was 240 mg. of crystalline residue. A crystallization with methanol at —5° C. yielded 150 mg. of 3-keto-retro-bisnorchol-4-enic acid with a melting point of 200 to 203° C. When this acid was mixed with 3-keto-retro-bisnorchol-4-enic acid as obtained by the method described in Example 1c no drop in the melting point occurred.

(e) 0.11 ml. of dry, freshly distilled piperidine and 1 to 5 mg. of p-toluene sulfonic acid were added to a solution of 300 mg. of 3-keto-retro-bisnorchol-4-en-22-al as obtained by ozonization of lumista-4,22-dien-3-one. This solution was then refluxed in 5 ml. of dry benzene for 3 hours under $N_2$. The refluxing benzene was dried by being passed through powdered BaO in an extraction column.

After cooling, the reaction mixture was poured out into water, dissolved in diethylether and then washed adequately four times with water. The ether-benzene layer, dried on $Na_2SO_4$ and filtered, was dried to complete dryness in vacuo. The resinous residue was stirred with 3 ml. of methanol at —15° C., cooled to —25° C. and kept at that temperature for 2 hours and crystallized. Filtering of this solution yielded 185 mg. of needles with a melting point of 88 to 93° C. of 22-(N-piperidyl)-retro-bisnorchola-4,20(22)-dien-3-one.

Two recrystallizations with methanol raised the melting point of this substance to 94–96° C.

The analytical values of this pure substance were:

$\epsilon(\lambda$ max. 241.5 m$\mu)=21,800$, $[\alpha]_D^{20}=-139°$ (CHCl$_3$)

Found: C, 81.72%; H, 10.64%; N, 3.60%; C, 81.78%; H, 10.67%; N, 3.66%. Calculated for $C_{27}H_{41}NO$: C, 81.97%; H, 10.45%; N, 3.54%.

The infrared spectrum exhibited an intensive band at 1660 cm.$^{-1}$, which overlapped distinctly a band with lower extinction at 1650 cm.$^{-1}$. Apart from a band at 1610 cm.$^{-1}$ a weaker band was found at 874 cm.$^{-1}$.

After a few small charges of the above-mentioned piperidino compound were produced in a similar manner, in which the final substance had a melting point of 94 to 96° C., production of several more larger charges of this compound in a different manner was carried out. The resultant compound which had a different melting point (114 to 115° C.) was then obtained in large yields. Probably this effect is due to cis-trans isomerism.

This alternate method of preparing this compound was carried out as follows:

A solution of 10 g. of 3-keto-retro-bisnorchol-4-en-22-al was refluxed in 180 ml. of dry benzene with 3.8 mls. of piperidine and 30 mg. of p-toluenesulphonic acid for 3 hours under nitrogen. The refluxing benzene was dried by passing through powdered barium oxide.

The reaction mixture was evaporated to complete dryness in vacuo, a crystalline residue of 12.3 g. being obtained. Recrystallization with 10 ml. of methanol, yielded 9.3 g. of 22 - (N-piperidyl)retro-bisnorchola-4,20(22)-dien-3-one, melting point 98 to 107–111° C. A portion of this substance, which was sufficiently pure for further processing, was recrystallized a few times with acetone for analysis until a constant melting point of 114–115° C. was attained.

The analytical values of this substance were:

$\epsilon(\lambda$ max. 241.5 m$\mu)=22,000$, $[\alpha]_D^{23}=-123°$ (CHCl$_3$)

C, 81.87%; H, 10.49%; N, 3.42%. C, 81.98%; H, 10.47%; N, 3.63%.

The infrared spectrum of this substance differed only on details from that of the compound having a melting point of 94 to 96° C. The characteristic bands found for said substance were also found in this case.

(f) 0.5 g. of freshly melted sodium acetate was added to a solution of 1 g. of 3-keto-retro-bisnorchola-4-en-22-al, obtained as described in Example 1b, in 50 ml. of freshly distilled acetic acid anhydride. This mixture was then refluxed in a nitrogen atmosphere.

The solvent was then distilled off as far as possible under reduced pressure (about 10 minutes) and the residue obtained was dissolved in 25 ml. of chloroform. Undissolved sodium acetate was filtered off, the filter was washed with a small quantity of chloroform and the filtrate was diluted with the same solvent to 125 ml., a solution of 22-acetoxy-retro-bisnorchola-4,20(22)-dien-3-one being obtained.

(g) A solution of 300 mg. of 22-(N-piperidyl)-retro-bisnorchola-4,20(22)-dien-3-one in 4.5 ml. of dry thiophene-free benzene, was added dropwise at a temperature of —5° C. to +5° C., in 45 minutes, while stirring, to a solution of 453 mg. of sodium bichromate dihydrate in 4.5 ml. of acetic acid and 3 ml. of benzene. After additional stirring, for 2 hours at 0° C., 0.75 ml. of methanol was added to the dark-colored solution and stirring was continued for 30 minutes also at 0°C.

This reaction mixture was then processed by pouring it out into 25 ml. of water and by extraction twice with benzene. The combined benzene extracts were then washed successively with water, 3 ml. of cold 10% NaOH solution, twice with water, 3 ml. of cold 10% hydrochloric acid solution and four times with water. The solution was then dried on $Na_2SO_4$, filtered and evaporated to dryness producing a completely crystalline residue.

This residue was dissolved in 1 ml. of methylene chloride and 4 ml. of petroleum ether was added at boiling temperature. The crystallization which was completed at —25° C. yielded 150 mg. of light-yellow, hard crystal blocks of retro-progesterone with a melting point of 161 to 163° C.

A repeated recrystallization of this substance yielded 130 mg. with a melting point of 163–164° C.

The analytical values of this pure substance were:
$\epsilon(\lambda$max 241.5 m$\mu)=16,800$, $[\alpha]_D^{20}=-62°$ (CHCl$_3$)

Found: C, 79.90%; H, 9.75%. C, 79.89%; H, 9.75%. Calculated for $C_{21}H_{30}O_2$: C, 80.20%; H, 9.62%.

The infrared spectrum exhibited strong bands at 1690 cm.$^{-1}$ and 1662 cm.$^{-1}$, and a weaker band at 1615 cm.$^{-1}$.

(h) 0.5 g. of freshly melted sodium acetate was added to a solution of 1 g. of 3-keto-retro-bisnorchol-4-en-22-al, obtained as described in Example 1b, in 50 ml. of freshly distilled acetic acid anhydride and the mixture was refluxed for 16 hours in a nitrogen atmosphere.

Then the solvent was distilled off as far as possible under reduced pressure (about 10 mm. Hg) and the residue obtained was dissolved in 25 ml. of chloroform. The undissolved sodium-acetate was filtered off, the filter was washed again with a small quantity of chloroform and the filtrate was increased with the same solvent to 150 mls. A solution of 22-acetoxy-retro-bisnorchola-4,20-(22)-dien-3-one was obtained.

While cooling with ice water this solution was ozonized for 14 minutes, 10.5 mg. of ozone being absorbed per minute. Then, after the addition of 15 ml. of acetic acid and 2 g. of zinc substance for 10 minutes, the mixture was shaken and after filtering the solution was washed with 10% NaOH solution and water to neutral reaction. The solution was dried on $Na_2SO_4$, filtered and evaporated to dryness, and then refluxed to hydrolyse any 3-enolacetate present for 45 minutes in 45 ml. of methanol and 25 ml. of 2 N $H_2SO_4$. After concentration in vacuo down to half the volume the solution was dissolved in diethylether. The ethereal extract was washed with 10% NaOH solution and water to neutral reaction dried on $Na_2SO_4$, evaporated to dryness and finally crystallized with 3 ml. of diethyl ether. The crystallate obtained was recrystallized with a mixture of methylene chloride and n-hexane, the yield being 113 mg. of substance with a melting point of 160–163° C. The substance did not exhibit a reduction in melting point with the retroprogesterone obtained as described in Example 1g.

$[\alpha]_D^{20} = -61.5°$ ($CHCl_3$), (mean value of $-62.1°$ and $-60.9°$).

The following compounds listed with their starting materials are prepared according to the methods of Example 1:

7-dehydro-retro-progesterone from lumista-4,7,22-trien-3-one;
6-dehydro-retro-progesterone from lumista-4,6,22-trien-3-one;
1-dehydro-retro-progesterone from lumista-1,4,22-trien-3-one;
retro-pregna-1,4,6-triene-3,20-dione from lumista-1,4,6,-22-tetraen-3-one;
retro-pregnane-3,20-dione from lumist-22-en-3-one;
2-methyl-retro-progesterone from 2-methyl-lumista-4,6,-22-trien-3-one;
6-methyl-retro-progesterone from 6-methyl-lumista-4,22-dien-3-one;
6-fluoro-retro-progesterone from 6-fluorolumista-4,22-dien-3-one;
6-chloro-retro-progesterone from 6-chloro-lumista-4,22-dien-3-one;
6-hydroxy-retro-progesterone from 6-hydroxy-lumista-4,22-diene-3-one;
4-chloro-retro-progesterone from 4-chloro-lumista-4,22-dien-3-one;
1-methyl-retro-progesterone from 1-methyl-lumista-r, 22-dien-3-one;
2-hydroxy retro-progesterone from 2-hydroxy-lumista-4,22-dien-3-one;
retro-pregn-5-ene-3,20-dione from lumista-5,22-dien-3-one;
9 fluoro-11-hydroxy-retro-progesterone from 9-fluoro-11-hydroxy-lumista-4,22-dien-3-one;
16-hydroxy-retro-progesterone from 16-hydroxy-lumista-4,22-dien-3-one;
16-methyl-retro-progesterone from 16-methyl-lumista-4,22-dien-3-one;
3-hydroxy-retro-pregn-5-en-20-one from 3-hydroxy-lumista-5,22-diene and 3-hydroxy-retro-pregnan-20-one from 3-hydroxy-lumist-22-ene.

*Example 2*

(a) To 3.2 ml. of anhydrous ethanol there was added a mixture of 70 ml. of dry benzene and 12 ml. of 2.86 sodium methoxide in dry methanol. This mixture was then concentrated by evaporation under $N_2$ to about 30 ml. After cooling, while stirring, the resultant paste had added to it, 8.6 ml. of freshly distilled diethyloxalate, so that the reaction mixture became quite clear. Then, a solution of 10 g. of retro-progesterone, prepared as described in Example 1g, in 70 mls. of dry benzene was quickly added and stirring was continued for about 90 minutes. By the rapid dropwise addition of 400 ml. of dry diethylether, the precipitation of the sodium enolate was completed. After stirring for an additional 45 minutes the resultant substance was filtered and washed adequately with 100 ml. of dry diethylether. After drying, for 15 hours, on concentrated $H_2SO_4$, 10.8 g. of yellow sodium enolate of 21-ethoxy-oxalyl-retro-progesterone was obtained.

(b) The sodium enolate derivative thus obtained was dissolved at $-20°$ C., while stirring, in a nitrogen atmosphere, in 150 ml. of dry methanol. At the same temperature a solution of 5.9 g. of iodine in 210 ml. of dry methanol was added within 40 minutes to the reaction mixture while stirring and stirring was continued for 90 minutes. The decomposition of the iodine compound was carried out by adding 6.6 ml. of 3.56 N sodium-methoxide solution stirring was continued at 0° C. for one hour in dry methanol. From the solution obtained the reaction product was precipitated by adding dropwise, while stirring for 45 minutes 90 ml. of water and by then adding 120 g. of sodium chloride.

The filtered precipitate, after being washed adequately with water, was dried overnight, the yield being 5.55 g. of 21-iodo-retro-progesterone. From the filtrate, after one night, another 2.35 g. of this compound was obtained.

(c) The first fraction of 21-iodo-retro-progesterone (weight 5.55 g.) obtained this way, was refluxed in 200 ml. of purified dry acetone (purified with $KMnO_4$ and $K_2CO_3$) for 18 hours with 12 g. of freshly prepared potassium acetate purified by remelting. After evaporation of the acetone, 300 ml. of water were added and the oil separated was dissolved in methylene chloride. The extract, after drying on $Na_2SO_4$, was evaporated to dryness (weight 1.4 g.) and chromatographed in benzene on 10 g. of neutralized $Al_2O_3$. Eluation with benzene yielded 700 mg. of residue, from which after recrystallization with acetone, 150 mg. of a substance with a melting point of 159 to 164° C. was obtained.

Corresponding acetylation of the post-fraction thus obtained of 21-iodo-retro-progesterone (2.35 g.) yielded 2.6 g. of crude acetoxy-compound, from which 90 mg. of solid substance with a melting point of 160–161° C. could be crystallized. Chromatography of the mother liquor as described above, after recrystallization with a mixture of acetone, and petroleum ether (40–60° C.) yielded 400 mg. with a melting point of 160–163° C.

Recrystallization of the combined crystallates with acetone yielded 425 mg. with a melting point of 164–167° C., from which, by recrystallization with ethanol, finally 335 mg. of pure retro-desoxycorticosterone acetate with a melting point of 165–168° C. were obtained.

The analytical values of this pure substance were:

$\epsilon E_{1cm}^{1\%}$ ($\lambda$ max = 242 m$\mu$) =

457 and 462, $\epsilon$ 242 m$\mu$ = 17,000

Calculated for $C_{23}H_{32}O_4$ (372.49): C, 74.15%; H, 8.66%. Found: C, 74.03%; H, 8.55%; C, 74.27%; H, 8.77%.

The infrared spectrum exhibited bands at 1226, 1609, 1663, 1724 and 1751 cm.$^{-1}$.

The following compounds, listed with their starting materials are prepared according to the methods used in Example 2:

21-acetoxy-6-dehydro-retro-progesterone from 6-dehydro-retro-progesterone;
21-propionoxy-1,6-bisdehydro-retro-progesterone from 1,6-bisdehydro-retro-progesterone;
21-butyroxy-retro-pregnane-3,30-dione from retro-pregnane-3,20-dione;
the hemi-succinate of 21-hydroxy-6-methyl-retro-progesterone from 6-methyl-retro-progesterone;
21-acetoxy-9-fluoro-11-hydroxy-retro-progesterone from 9-fluoro-11-hydroxy-retro-progesterone;
21-formate of 21-hydroxy-2-methyl-retro-progesterone from 2-methyl-retro-progesterone;
21-acetoxy-17-hydroxy-retro-progesterone from 17-hydroxy-retro-progesterone;
9-fluoro-retro-hydrocortisone 21-acetate from 9-fluoro-11,17-dihydroxy-retro-progesterone;
21-acetoxy-16-methyl-9-fluoro-11,17-dihydroxy-retro-progesterone from 16-methyl-9-fluoro-11,17-dihydroxy-retro-progesterone and
21-acetoxy-9-fluoro-11,16,17-trihydroxy-retro-progesterone from 9-fluoro-11,16,17-trihydroxy-retro-progesterone.

From all the above named compounds there can be prepared the unesterified corresponding 21-hydroxy derivatives by mild hydrolysis methods described in literature, for instance by reacting the esters with dilute alkali as potassium hydroxide or potassium bicarbonate.

*Example 3*

(a) A solution of 7.5 g. of retro-progesterone in 500 ml. of freshly distilled tertiary butyl alcohol was refluxed with 12.75 g. of finely powdered chloranil, while stirring, for 5 hours in a nitrogen atmosphere. After cooling, 2 litres of water were added and extraction was performed three times with 200 ml. of methylene dichloride. The combined extracts were then diluted with 1 litre of petroleum ether (40–60° C.) washed successively with 100 ml. of diluted $Na_2SO_4$ (100 ml.) four times with 75 ml. of 1 N NaOH and water to neutral reaction.

By drying this solution on $Na_2SO_4$ and evaporating to dryness (last part in vacuo) 3.7 g. of crystalline residue was obtained.

This residue was then dissolved in benzene.

Filtration in benzene filtered through via 35 g. of alumina (according to Brockmann, strength II) and then the alumina was eluated with benzene. Evaporation of the benzene yielded 3.11 g. of crystalline residue. By crystallization with 15 ml. of acetone at room temperature (at lower temperatures a by-product crystallized out) 900 mg. of crystallate with a melting point of 165–170° C. were obtained. Transfer of the acetone mother liquor into a mixture of ethanol and hexane yielded 1.7 g. of a solid substance with a melting point of 130 to 145° C. This solid was then recrystallized with acetone at room temperature, yielding 600 mg. of a solid with a melting point of 166 to 171° C. The two fairly pure fractions (600 mg. and 900 mg.) yielded, after crystallization with a mixture of acetone and hexane, finally 1.0 g. of 6-dehydro-retro-progesterone, melting point 169 to 170° C. From the mother liquors an additional fraction of 0.44 g. with a melting point of 168 to 169° C. was obtained.

A small portion of the 6-dehydro-retro-progesterone was recrystallized with acetone for analysis and had the following analytical values:

Melting point 169–170° C, $E^{1\%}_{1cm.}$ ($\lambda$ max=286.5 m$\mu$)=842 and 848

$\epsilon$($\lambda$ 286.5 m$\mu$)=26,400.

Calculated for $C_{21}H_{28}O_2$ (311.43): C, 80.73%; H, 9.03%. Found: C, 81.11%; H, 9.20%; C, 81.25%; H, 9.07%.

The infrared spectrum exhibited inter alia bands at 1695 cm.$^{-1}$ (strong, non-conjugated keto-group), 1656 cm.$^{-1}$ (strong, conjugated keto-group), 1617 cm.$^{-1}$ (strong, double bond in conjugation), 1574 cm.$^{-1}$ (moderately strong, double bond) and 888 cm.$^{-1}$ (strong).

According to the method described in this Example 3a the following compounds listed with their starting materials are prepared:

1,6-bisdehydro-retro-progesterone from 1-dehydro-retro-progesterone;
2-methyl-6-dehydro-retro-progesterone from 2-methyl-retroprogesterone;
1,6-bisdehydro-17$\alpha$-hydroxy-retro-progesterone 17-acetate from 1-dehydro-17$\alpha$-hydroxy-retro-progesterone 17-acetate;
6-dehydro-9-fluoro-retro-hydrocortisone from 9-fluoro-retro-hydrocortisone;
6-dehydro-16-hydroxy-9-fluoro-retro-prednisolone from 16-hydroxy-9-fluoro-retro-prednisolone;
6-dehydro-16-methyl-9-fluoro-retro-prednisolone from 16-methyl-9-fluoro-retro-prednisolone and
6-dehydro-retro-desoxycorticosterone 21-acetate from retro-desoxycorticosterone 21-acetate.

(b) 3.95 g. of the isolumisterone obtained as described in Example 1a were dissolved in 150 ml. of dry methylene dichloride. To this solution there was then added 0.81 ml. of dry pyridine. The solution thus obtained was cooled to −80° C. and then, within 26 minutes, 15 mmol. of ozone (i.e. 140% of the theoretical volume) was passed through. The reaction mixture was then vigorously stirred, after which 15 g. of para-formaldehyde was added. Under constant stirring the temperature rose within 4 hours to about room temperature. After standing overnight the solid substance was filtered off, washed with petroleum ether and diethyl ether. The ether solution was then extracted with water, cold 1 N NaOH and water. After drying on $Na_2SO_4$ this solution was evaporated and 3.08 g. of residue were obtained.

$E^{1\%}_{1cm.}$ ($\lambda$ max 286 m$\mu$)=770

This residue was crystallized from acetone and then recrystallized twice from acetone. The resultant pure 3-keto-retro-bisnorchola-4,6-dien-22-al had a melting point of 153–155° C. The other analytical values of this substance were as follows:

The ultraviolet absorption spectrum had a maximum at 286 m$\mu$.

$E^{1\%}_{1cm.}$=780; $\epsilon$=25,400

Calculated for $C_{22}H_{30}O_2$ (326.48): C, 80.94%; H, 9.26%; O, 9.80%. Found: C, 81.07%; H, 9.16%; O, 9.94%; C, 80.87%; H, 9.05%; O, 10.00%.

The following bands in the infrared spectrum were found: 1410 cm.$^{-1}$ (weak), 1654 cm.$^{-1}$ (strong), 1717 cm.$^{-1}$ (strong), 1584 cm.$^{-1}$ (strong), 1621 cm.$^{-1}$ (fairly strong).

(c) 3.5 g. of 3-keto-retro-bisnorchola-4,6-dien-22-al obtained as described in Example 3b (crude crystalline form, melting point 146–151° C.) were dissolved in 50 ml. of absolute benzene. To this solution there was then added 1.27 ml. of piperidine and 20 mg. of p-toluenesulphonic acid. This reaction mixture was refluxed for two and a half hours and the refluxing benzene dried with BaO. Then the solvent was distilled off in vacuo and 4.4 g. of residue was left (105%). This residue was crystallized from 30 ml. of methanol at −25° C. Yield: 2.1 g. of 22-(N-piperidyl)-retro-bisnorchola-4,6,20(22)-trien-3-one with a melting point of 127–135° C. After two recrystallizations with acetone this substance was pure. The analytical values of this material were as follows:

Melting point (in vacuo) 135–136° C.

Ultraviolet absorption spectrum had a maximum at 287 m$\mu$.

$E^{1\%}_{1cm.}$=661 and 657, $\epsilon$=26,000 and 25,800

Calculated for $C_{27}H_{39}NO$ (393.62): C, 82.39%; H, 9.99%; O, 4.06%; N, 3.56%. Found: C, 82.40%; H, 9.86%; O, 4.35%; N, 4.13%.

There were found bands in the infrared spectrum at 870 cm.$^{-1}$ (strong), 1656 cm.$^{-1}$ (strong), 1622 cm.$^{-1}$ (strong) and 1410 cm.$^{-1}$ (weak).

(d) 16.7 g. of 22-(N-piperidyl)-retro-bisnorchola-4,6,20(22)-trien-3-one obtained as described in Example 3c and dissolved in 250 ml. of dry thiophen-free benzene, were added in drops, in 45 minutes, to an adequately stirred solution of 25.2 g. of sodium bichromate in 250 ml. of acetic acid+170 mls. of benzene cooled to 0° C. After two hours of stirring at 0° C., 42.0 ml. of methanol were added and stirring was continued for half an hour at 0° C. The reaction mixture was then poured out in water and extracted with ether. The extract was washed with water, diluted sodium hydroxide solution and water. After drying on $Na_2SO_4$ the solvent was distilled off. Yield: 12.24 g. (92%) of residue. This residue was crystallized with acetone-hexane (6.6 g.) and then by two crystallizations with acetone the substance obtained was pure. The melting point of the 6-dehydro-retro-progesterone thus obtained was 168–169° C.

(e) 3.95 g. of lumisterone were dissolved in 150 ml. of dry methylene dichloride and to this solution there was added 0.81 ml. of pyridine. This solution was then cooled to −70° C. and within 26 minutes, 14 mmol. of ozone was passed through. Then 15 g. of paraformaldehyde were added and, while stirring, the temperature was slowly raised to +5° C. The paraformaldehyde was filtered off, and washed with methylene dichloride. The filtrate was washed with water, 1 N NaOH solution and water. After drying on $Na_2SO_4$ the organic solvent was distilled off, after which 3.11 g. of crystalline residue was left. This residue was recrystallized with a mixture of methylene dichloride and acetone. After three recrystallizations pure 3-keto-retro-bisnorchola-4,7-dien-22-al was obtained with a melting point of 196–200° C. and the following analytical values:

The ultraviolet absorption spectrum had a maximum at 241 m$\mu$.

$E_{1\,cm.}^{1\%}$=433 and 436. $\epsilon$=14,150 and 14,200

Calculated for $C_{22}H_{30}O_2$ (326.48): C, 80.94%; H, 9.26%; O, 9.80%. Found: C, 80.15%; H, 9.1%; O, 10.10%; C, 80.28%; H, 9.09%; O, 10.04%.

The infrared absorption spectrum had bands, inter alia, at 1410 cm.$^{-1}$ (weak), 1660 cm.$^{-1}$ (strong), 1610 cm.$^{-1}$ (strong) and 1714 cm.$^{-1}$ (strong).

When the aldehyde thus obtained was converted in the manner described in Example 1e or 3c into 22-(N-piperidyl)-retro-bisnorchola-4,7,20(22) - trien - 3 - one, and this compound was oxidized with sodium bichromate in benzene and acetic acid in the manner described in Example 1g or 3d, 7-dehydro-retro-progesterone was obtained. By isomerisation of the 3-keto-4,7-dehydro-system of this latter compound into the 3-keto-4,6-dehydro-system with dry HCl-gas in anhydrous isopropanol, in the manner described in Example 1a, the 6-dehydro-retro-progesterone is obtained.

Example 4

According to the methods described in the Journal American Chemical Society 75 5369 (1953), 74, 5933 (1952) and 74, 3962 (1952) retro-progesterone was microbiologically hydroxylated with the microorganism *Rhisopus nigricans*. The resultant hydroxy-retro-progesterone had the following analytical values:

Melting point 214(s)—217–218° C.

$E_{1\,cm.}^{1\%}$ ($\lambda$ max=242 m$\mu$)=477

Found: C, 76.08, 76.21; H, 9.01, 9.10; O, 14.28, 14.61. Calculated for $C_{21}H_{30}O_3$: C, 76.32; H, 9.15; O, 14.53.

The infrared spectrum exhibited bands among others 3420, 1699, 1653, 1615, 1423, 1008 and 869 cm.$^{-1}$.

(b) Microbiological hydroxylation of 17$\alpha$,21-dihydroxy-retro-progesterone with Aspergillus orchraceus yielded retrohydrocortisone with a melting point of ~269° (dec.).

$E_{1\,cm.}^{1\%}$ ($\lambda$ max=242 m$\mu$)=476

The infrared absorption spectrum showed bands inter alia at 3310, 1693, 1642, 1611, 1417, 1275, 1238, 1213, 1117, 1077, 1037, 1000, 949 and 870 cm.$^{-1}$.

According to this process the following compounds are prepared: 11,17$\alpha$-dihydroxy-retro-progesterone from 17$\alpha$-hydroxy-retro-progesterone, 1 - dehydro-11,17$\alpha$,21-trihydroxy-retro-progesterone from 1-dehydro-17$\alpha$,21 - dihydroxy-retro-progesterone and 6-methyl-11,17$\alpha$,21-trihydroxy - retro - progesterone from 6-methyl-17$\alpha$,21-dihydroxy-retro-progesterone.

Example 5

A solution of 5.0 g. of retro-progesterone and 4.0 g. of dichloro-dicyano-benzoquinone in 250 ml. of dry, thiophene-free benzene was refluxed for 7 hours, in a nitrogen atmosphere. The resultant mixture was then cooled to room temperature, filtered and, after dilution with benzene, poured out on ice. The benzene layer was washed successively 4 times with 300 ml. of N caustic soda lye and 6 times with 300 ml. of water to neutral reaction. After drying on sodium sulphate and filtering, the solvent was distilled off, the last part being carried out in vacuo. The residue (3.49 g.) was crystallized from acetone hexane at −5° C. to yield 2.807 g. of a solid substance with a melting point of 150.5–153° C. This substance was dissolved in 100 ml. of benzene. 1 g. of silica gel was added to this solution after filtration, the solution was stirred and it was again evaporated to dryness. The residue (2.73 g.) was crystallized from acetone-hexane at −5° C. The melting point of the 1-dehydro-retro-progesterone (2.14 g.) thus obtained was 153.5–154.5° C. A small quantity was recrystallized to obtain a constant melting point and had the following analytical values:

Melting point 154–155.5° C.

The infrared absorption spectrum exhibits, inter alia, maxima at 1694, 1661, 1625, 1606, 1423, 1366, 1166, 889 and 814 cm.$^{-1}$.

$E_{1\,cm.}^{1\%}$ ($\lambda$ max=242.5 m$\mu$)=496 and 502 $\epsilon$(242.5 m$\mu$)=15,600 ($CH_3OH$)

Found: C, 80.12, 80.54; H, 8.99, 9.22. Calculated for $C_{21}H_{28}O_2$ (312.45): C, 80.73; H, 9.03.

By this process there are prepared 1-dehydro-6-fluoro-retro-progesterone from
   6-fluoro-retro-progesterone;
1-dehydro-6-methyl-retro-progesterone from
   6-methyl-retro-progesterone;
1-dehydro-6-chloro-17$\alpha$-acetoxy-retro-progesterone from
   6-chloro-17$\alpha$-acetoxy-retro-progesterone;
1-dehydro-2,21-difluoro-17$\alpha$-acetoxy-retro-progesterone
   from 2,21-difluoro-17$\alpha$-acetoxy-retro-progesterone;
1-dehydro-16-methyl-17$\alpha$-acetoxy-retro-progesterone
   from 16-methyl-17$\alpha$-acetoxy-retro-progesterone;
1-dehydro-17$\alpha$-bromo-retro-progesterone from
   17$\alpha$-bromo-retro-progesterone and
retro-prednisolone from retro-hydrocortisone.

Example 6

A solution of 2.5 g. of hydroxylamine HCl in 100 ml. of boiling ethanol was added to a solution of 2.5 g. of sodium acetate in 100 ml. of boiling ethanol. After 10 minutes of boiling the resultant precipitate was filtered off by means of a glass filter and to the boiling filtrate there was added a boiling solution of 2.5 g. of 6-dehydro-retro-progesterone in 100 ml. of ethanol (in total rinsed subsequently with 50 mls. of ethanol). Subsequently, the resultant mixture was refluxed under nitrogen gas for one hour and then 250 ml. of solvent was distilled off in the course of one hour. To the warm solution there were then added 300 ml. of water. While stirring occasionally the solution was cooled for ten minutes at room temperature and for 15 minutes in ice water. The resultant dioxime was filtered off, washed with water and dried at 100° C. in high vacuo. 2.85 g. of a substance with a melting point of 279–281° C. was produced.

A quantity (1 g.) of this substance was boiled with 30 ml. of ethanol and the residue (0.67 g.) was dissolved in boiling tetrahydrofurane. The resultant solution was filtered and to the filtrate there was added an equal quantity of petroleum-ether. The crystallization was achieved at −5° C. Yield 208 mg. of dioxime of 6-dehydro-retro-progesterone with a melting point of 279–282° C. (0.0) was produced. This compound had the following analytical values:

The infrared absorption spectrum exhibits maximum at 1642, 1624, 1604, 1370, 980, 960, 889 and 878 cm.$^{-1}$.

$E_{1\,cm.}^{1\%}$ ($\lambda$ max=278 m$\mu$)=1080 and 1071 (methanal)$\epsilon$= 36,800

The ultraviolet spectrum exhibits shoulders at ~267 and 288 m$\mu$.

Found: C, 73.88, 74.25; H, 8.79, 8.89; N, 7.68, 7.88. Calc. for $C_{21}H_{30}O_2N_2$ (343.49): C, 73.64; H, 8.83; N, 8.18.

By this process the dioximes of 6-dehydro-retro-hydrocortisone; of 6-dehydro-16-hydroxy-9-fluoro-retro-prednisolone; of 6-dehydro-6-fluoro-17α-acetoxy-retro-progesterone and of 6-dehydro-21-fluoro-retro-pregesterone are produced.

*Example 7*

To a solution of 300 mg. of retro-pregnane-3,20-dione in 20 ml. of anhydrous ethanol there were added 36.6 mg. of calcium chloride, 2 H$_2$O and 16.3 mg. of sodium borohydride at a temperature of −20° C. The reaction mixture was then kept at this temperature for 3 hours and then neutralised with 8 ml. of 2% acetic acid. After filtration the resultant retro-pregnane-3-ol-20-one was crystallized from ethanol+ether, a melting point of 167–171° C. being obtained and had the following additional analytical values:

The infrared absorption spectrum showed inter alia bands at 3480, 1700, 1363, 1177, and 1073 cm.$^{-1}$.

By this process the following compounds, shown with their starting materials are produced: 17α-acetoxy-retro-pregnan-3-ol-20-one from 17α-acetoxy-retro-pregnane-3,20-dione, 21-acetoxy-retro-pregnan-3-ol-20-one from 21-acetoxy - retro - pregnane - 3,20 - dione; 3,11,17α,21-tetrohydroxy - retro- pregnane - 3 - one from 11,17α,21-trihydroxy - retro - pregnane - 3,20 - dione and 3,17α,21-trihydroxy - retro - pregnan - 3 - one from 17α,21 - dihydroxy - retro - pregnane - 3,20 - dione.

*Example 8*

A solution of 0.6 g. of potassium hydroxide in 9 ml. of methanol was added to a solution of 2.826 g. of retro-progesterone in 150 ml. of sodium-distilled dioxane. This mixture was shaken at a slight excess pressure with hydrogen in the presence of 0.3 g. of 10% palladium on carbon as a catalyst. After the absorption of 1 mol of hydrogen per molecule of the substance the mixture was filtered, the reduction product obtained being crystallized from a mixture of ether and hexane. Recrystallization yielded finally retro-pregnane-3,20-dione with a melting point of 108.5 (s) −115–116° C. and the following additional analytical values.

Found: C, 79.76; 79.66; H, 9.87; 10.17. Calc. for $C_{21}H_{32}O_2$ (316.49); C, 79.70; H, 10.19.

The substance did not show absorption in the ultraviolet range.

Thus is produced 17α - acetoxy - retro - pregnane - 3,20-dione from 17α - acetoxy - retro - progesterone; 21 - acetoxy - retro - pregnane - 3,20 - dione from 21 - acetoxy-retro - progesterone; 11,17α - 21 - trihydroxy - retro-pregnane - 3,20 - dione from retro - hydrocortisone or 17α - acetoxy - retro - pregnane - 1 - ene - 3,20 - dione from 17α - acetoxy - 1 - dehydro - retro- progesterone and 17α,21 - dihydroxy - retro - pregnane - 3,20 - dione from 17α,21 - dihydroxy - retro- progesterone.

*Example 9*

(a) 5 g. of 6-dehydro-retro-progesterone, 7.5 g. of chloranil and 25 g. of powdered calcium carbonate were introduced into 170 ml. of isoamyl alcohol and the mixture was refluxed in a nitrogen atmosphere, while stirring thoroughly, for 3 hours. After cooling, the precipitate was filtered off and washed with methylene chloride. Water was added dropwise to the very dark filtrate and the solvent was azeotropically distilled off in vacuo at a temperature of less than 75° C. The resultant residue was absorbed in methylene-chloride and the solution was intensely washed with a sodium dithionite solution, then with water and with a N aqueous solution of sodium hydroxide. During the last-mentioned washing process emulsifying occurred, which could be counteracted for the major part by using a greater quantity of methylene chloride and by adding a saturated sodium chloride solution. The washing with the sodium hydroxide solution was continued until the washing layer no longer absorbed any color. After washing with water to neutral reaction, drying on sodium sulphate and filtering, the solvent was evaporated and 4.4 g. of a dark green, semisolid substance was obtained. Crystallization from 25 mls. of diethyl-ether at −5° C. yielded 0.9 g. of a gray substance with a melting point of 145–148° C. Recrystallization of a part of this substance from methanol raised the melting point to 150–155° C. From the ultraviolet spectra of the crystallizates and the initial mother liquor it was found that the former consisted for the major part of 6-dehydro-retro-progesterone, the latter, however, for 50% of the 1,6-bisdehydro compound.

The mother liquor was evaporated to dryness and introduced into 100 ml. of a mixture of petroleum ether and methylene chloride (4:1), arranged on a column of 70 g. of silica gel and eluated as follows:

| Fraction | Solvent | Volume (l.) | Weight (mg.) |
|---|---|---|---|
| FA | p.e.+CH$_2$Cl$_2$ (4+1) | 1.20 | 50 |
| FB | p.e.+CH$_2$Cl$_2$ (3+2) | 1.00 | 150 |
| FC | p.e.+CH$_2$Cl$_2$ (3+2) | 0.90 | 75 |
| FD | CH$_2$Cl$_2$ | 0.30 | 75 |
| FE | CH$_2$Cl$_2$ | 1.00 | 900 |
| FF | CH$_2$Cl$_2$ | 1.40 | 450 |
| FG | CH$_2$Cl$_2$+ether (4+1) | 0.65 | 440 |
| FH | CH$_2$Cl$_2$+ether (1+1) | 0.50 | |
| | Ether | 1.00 | 50 |
| FK | Methanol | 0.40 | 200 |

Fraction FE with $E_{1\,cm.}^{1\%}$ (286 m$\mu$)=694 is substantially pure 6-dehydro-retro-progesterone. For fraction FF was found:

$E_{1\,cm.}^{1\%}$ (226 m$\mu$)=370, $E_{1\,cm.}^{1\%}$ (254 m$\mu$)=308 and $E_{1\,cm.}^{1\%}$ (299 m$\mu$)=383

For fraction FG 380, 308 and 372 respectively. Crystallization of the fraction FF from acetone+n-hexane at −5° C. yielded crystals (150 mgs.) with a melting point of 137–139° C. A mixed melting-point determination with the 1,6-bisdehydro-retro-progesterone produced in a different manner did not shown a reduction.

(b) A solution of 5 g. of 6-dehydro-retro-progesterone and 5.1 g. of dihydro-quinone in 250 ml. of dry, thiophene-free benzene was refluxed under a slow flow of nitrogen for 6 hours. The initially orange-red-colored solution turned to green-red after about 1.5 hours and to green after about 2.5 hours. During the last-mentioned period crystals of the dihydro-quinone began to separate out.

After cooling to room temperature the reaction mixture was diluted with 250 ml. of benzene and then washed four times with 250 ml. of N sodium lye and 7 times with 250 ml. of water to a neutral reaction. Owing to the washing with sodium lye the reaction product had a light yellow color. The wash liquids were shaken with 250 ml. of benzene. The combined benzene layers were dried on sodium sulphate, filtered and the solvent was evaporated, the last part in the water-jet-pump vacuo. After removal of the benzene traces, with the aid of an oil pump, 3.16 g. of the crystalline residue was obtained, which had $E_{1cm.}^{1\%}$ (300 m$\mu$)=404 and $E_{1cm.}^{1\%}$ (254 m$\mu$)=299

This residue was recrystallized from acetone-hexane at $-5°$ C. Filtering and washing with acetone-hexane (1+8) at $-5°$ C. yielded a melting point of 139.5–141.5° C. Stirring twice with 1 g. of silica gel each discolored the light green solution of this crystallizate in 100 ml. of benzene. The residue obtained after the evaporation of the benzene was crystallized from acetone-hexane at $-5°$ C., which yielded 1.52 g. of 1,6-bisdehydro-retro-progesterone with a melting point of 141.5–142–143.5° C.

Further processing of the mother liquors yielded a subsequent fraction of 410 mg., having a melting point of 138–140° C.

A small quantity was recrystallized to obtain a constant melting point. The analytical values of the pure substance were as follows: A melting point of 142.5–143–143.5° C. was found. The infrared absorption spectrum showed inter alia maxima at 1704, 1655, 1608, 1582, 1463, 1410 (weak and broad), 887 and 768 cm.$^{-1}$. The band at 1655 cm.$^{-1}$ exhibits a distinct shoulder on the long-wave side.

$E_{1cm.}^{1\%}$ ($\lambda$ max=254 m$\mu$)=305$\epsilon$(254 m$\mu$)=9,450(CH$_3$OH)

$E_{1cm.}^{1\%}$ ($\lambda$ max=301 m$\mu$)=403$\epsilon$(301 m$\mu$)=12,500(CH$_3$OH)

Found: C, 81.02; 81.16; H, 8.54; 8.61. Calc. for C$_{21}$H$_{26}$O$_2$ (310.44): C, 81.25; H, 8.44.

By these processes there are produced 6-dehydro-retro-prednisolone from 6-dehydro-hydrocortisone;
6-dehydro-16-methyl-9-fluoro-prednisolone from 6-dehydro-16-methyl-9-fluoro-hydrocortisone;
2-fluoro-6-methyl-6-dehydro-retro-prednisolone from 2-fluoro-6-methyl-6-dehydro-retro-hydrocortisone;
2,6-dimethyl-1,6-bisdehydro-retro-progesterone from 2,6-dimethyl-6-dehydro-retro-progesterone;
6-fluoro-1,6-bisdehydro-retro-progesterone from 6-fluoro-6-dehydro-retro-progesterone;
1,6-bisdehydro-17$\alpha$-acetoxy-retro-progesterone from 6-dehydro-17$\alpha$-acetoxy-retro-progesterone;
1,6-bisdehydro-21-fluoro-retro-progesterone from 6-dehydro-21-fluoro-retro-progesterone and 1,6-bisdehydro-6-chloro-17$\alpha$-acetoxy-retro-progesterone from 6-dehydro-6-chloro-17$\alpha$-acetoxy-retro-progesterone

*Example 10*

A rapid flow of perchlorlfluoride was introduced into a solution of 7.5 g. of 3-enolacetate of retro-progesterone in 450 mls. of distilled peroxide-free dioxane at room temperature, in a nitrogen atmosphere, while stirring very vigorously for 30 seconds. After this 250 ml. of water was added. After another 5 minutes of rapid introduction of the fluoride gas, the fluoride was allowed to flow into the solution slowly for 30 minutes. The excess quantity of reagent was expelled from the solution by passing nitrogen through it, after which 1 liter of water was added. Extractions were then carried out twice with 200 ml. of methylene chloride and with 500 ml. of petroleum ether. The combined extracts were washed twice with water, twice with an aqueous sodium bicarbonate solution and twice with water. By drying on sodium sulphate, filtering and evaporating to dryness 7.33 g. of the crystalline residue was obtained, which contained 5.52 percent of fluorine ($E_{1cm.}^{1\%}$ (235 m$\mu$)=362)

The substance was dissolved in 300 mls. of a mixture of petroleum ether and benzene (1+1) and chromatographed on 240 gs. of neutral alumina.

| Fraction | Eluant | Vol. (l.) | Weight (g.) | $\lambda$m$\mu$ | 1% E 1 cm. | Crystallization at 20° C. from acetone-hexane | Cryst. |
|---|---|---|---|---|---|---|---|
| 1 | p.e. id. benzene | 0.5 | | | | | |
| 2 | (1+1) | 0.5 | 0.825 | 234 | 376 | −0.57 g. M.P. 139–146° | 2-K$_1$ |
| 3 | do | 0.5 | 1.875 | 234 | 384 | −1.1 g. M.P. 131–135° | {34-K$_1$ |
| 4 | do | 0.5 | 0.96 | 234.5 | 408 | −0.71 g. M.P. 133–137° | {34-K$_1$ |
| 5 | do | 0.5 | 0.40 | 235 | 420 | | |
| 6 | do | 1.5 | 0.57 | 235.5 | 438 | {−1.2 g. M.P. 158–162° | 58-K$_1$ |
| 7 | Benzene | 0.5 | 0.34 | 325.5 | 451 | | |
| 8 | do | 1.5 | 0.40 | 235.5 | 456 | | |
| 9 | Benzene-ether (3+1) | 2 | 0.26 | 239 | 205 | Resin | |
| 10 | Ether | 3 | 0.39 | 240 | 269 | Yellow crystalline residue | |
| 11 | Ethanol | 1 | 0.86 | 240 | 358 | −0.4 g. M.P. 206(s)–211–215° (ethanol-hexane). | 11-K$_1$ |

Recrystallization of 34-K$_1$ from methanol yielded a mixture of blocks and scales, which were separated as far as possible (fraction 34-BK$_2$ and 34-SK$_2$ respectively). The fraction 34-BK$_2$, together with 2-K$_1$, was recrystallized in order of succession from acetone-hexane, ethanol-hexane and further twice from acetone-hexane. 185 mg. of 6$\alpha$-fluoro-retro-progesterone having a melting point of 148(s)–150–151° C. were then obtained. This sample had the following analytical values:

The infrared absorption spectrum showed inter alia maxima at 1705, 1683, 1428, 1354 and 974 cm.$^{-1}$.

$E_{1cm.}^{1\%}$ ($\lambda$ max=235 m$\mu$)=384 and 390 (methanol) $\epsilon$ (235 m$\mu$)=12,800

Found: C, 76.20; 75.82; H, 8.95; 8.83. Calc. for Calc. for C$_{21}$H$_{30}$O$_3$ (330.45): C, 76.32; H, 9.15; O, 14.53

The fraction 58-K$_1$ was recrystallized from acetone-hexane at 5° C., 0.87 g. of 6-$\beta$-fluoro-retro-progesterone with a melting point of 161(s)–163–165° C. being thus obtained.

$E_{1cm.}^{1\%}$ (237 m$\mu$)=465 and 472

All the filtrates were collected and evaporated to dryness. The residue was dissolved with the fraction 34-SK$_2$ (3.4 gs.) in 200 mls. of chloroform and to the solution was added 2.5% of ethanol. For two hours dry hydrochloric acid gas passed through the solution at room temperature. The acid was hen expelled for the major part with the aid of nitrogen from the solution, which was then washed with a bicarbonate solution and water. Drying on sodium sulphate, filtering and evaporating to dryness yielded a residue which was crystallized from methanol Yield 1.235 g. having a melting point of 159 (s)–161–163° C. (FK$_2$). Recrystallization from methanol (subsequent to a color treatment with silica gel in benzene at $-5°$ C.) Yielded finally 1.16 gs. of 6-$\beta$-fluoro-retro-progesterone having a melting point of 161 (s)–163–165° C. (FK$_3$). The analytical values of the recrystallized substance having a constant melting point were:

Melting point 164–166° C. (decomposition at ~190° C.).

The infrared absorption spectrum showed inter alia maxima at 1700, 1678, 1622, 1416, 1364, 1232, 1187, 1040, 945 and 875 cm.$^{-1}$.

$E_{1cm.}^{1\%}$ ($\lambda$ max=237.5 m$\mu$)=459 and 642 (methanol) $\epsilon$ (237.5 m$\mu$)=15,300

Found: C, 75.38; H, 8.85. Calcd. for $C_{21}H_{29}FO_2$ (332.46): C, 75.86; H, 8.79.

Three crystallization of the fraction 11–K$_1$ from acetone yielded finally 77 mg. of a compound having a melting point of 219(s)–220–222° C. The infrared spectrum showed inter alia bands at 3470, 1682, 1666, 1616, 1420, 1364, 12033,0, 1183, 1065, 948 and 882 cm.$^{-1}$. The infrared spectrum is identical to that of 6-hydroxy-retro-progesterone obtained by the reaction of the 3-enolacetate of retro-progesterone with monoperphthalic acid. The infrared spectra of the two preparations were also identical is measuring in a chloroform solution.

$E_{1cm.}^{1\%}$ ($\lambda$ max=242 m$\mu$) = 467 and 468 (methanol) $\epsilon$ (242 m$\mu$)=15,600

Found: C, 76.39; 76.39; H, 8.97; 9.04; O, 14.85; 14.78. Calc. for $C_{21}H_{30}O_3$ (330.45): C, 76.32; H, 9.16; O, 14.53.

(b) In 10 ml. of chloroform, containing 1% of ethanol there were dissolved 50 mg. of 6-$\alpha$-fluoro-retro-progesterone. Then, for one hour, dry hydrochloric acid gas was passed through the solution at room temperature. After the acid had been expelled with the aid of nitrogen, the reaction mixture was dissolved, the residue showed a value of $E_{1cm.}^{1\%}$ (236 m$\mu$) of 450

Crystallization from acetone-hexane yielded crystals having a melting point of 165–166° C. After mixing with 6-$\beta$-fluoro-retro-progesterone no drop in melting point occurred.

By this process thus are prepared the 6$\alpha$ and 6$\beta$ isomers of 6-fluoro-retro-hydrocortisone from the 3-enolacetate of retro-hydrocortisone; 6-hydroxy-17$\alpha$-acetoxy-retro-progesterone from the 3-enolacetate of 17$\alpha$-acetoxy - retro - progesterone; 6 - fluoro - 17,21 - dihydroxy-retro-pregesterone, or 21-acetate from the 3-enolacetate of 17,21 - dihydroxy - retro - progesterone 21-acetate; 6,21 - difluoro - 17$\alpha$ - acetoxy - retro - progesterone from the 3 - enolacetate of 21 - fluoro - 17$\alpha$-acetoxy - retro - progesterone, or 6 - fluoro - 17$\alpha$-bromo - retro - progesterone from the 3-enolacetate of 17$\alpha$ - bromo - retro - progesterone and 6 - fluoro - 17$\alpha$ - (2$^1$-methallyl)-retro-testosterone from the 3-enolacetate of 17$\alpha$ - (2$^1$-methally) - retro-testosterone.

Example 11

1.5 g. of powdered iodine were added in one batch to a solution of 1.0 g. of 17$\alpha$-hydroxy-retro-progesterone in 15 ml. of tetrahydrofurane and 2.5 ml. of methanol was added, while stirring at −4° to 0° C. The excess quantity of iodine was then removed at the same temperature by adding dropwise, within about 20 minutes, a 10% solution of sodium hydroxide in water. After the addition of 13 ml. the solution still had a bright yellow color. This mixture was poured out into 150 ml. of water and extracted three times with 40 ml. of ether. The ether extracts were washed with water to neutral reaction. After drying on Na$_2$SO$_4$ the ether was distilled off in vacuo almost to dryness, after which 3 gs. of dry potassium acetate and 50 mls. of acetone were rapidly added to the resultant concentrated solution of 21-iodo-17$\alpha$-hydroxy-retro-progesterone. This hetergenous mixture was then refluxed for 16 hours. After cooling the potassium salts were filtered off and washed with acetone. The filtrate was evaporated in vacuo almost to dryness, poured out into water and extracted from methylene chloride and ether. The extracts were washed with water to neutral reaction, dried on Na$_2$SO$_4$ and inspissated in vacuo. Yield 772 mg. of crude 17$\alpha$, 21-dihydroxy-retro-progesterone 21-acetate, $E_{1cm.}^{1\%}$ (242.5 m$\mu$)=395

Crystallization from acetone and subsequently from alcoholic-hexane produced a melting point of 218(s)→238° C. (dec.);

$E_{1cm.}^{1\%}$ (242.5 m$\mu$)=416, $\epsilon$(242.5 m$\mu$)=16,160

Calculated for $C_{23}H_{30}O_5$ (338.51): C, 71.10; H, 8.30; O, 20.60. Found: C, 70.63; H, 8.35; O, 19.72.

In the infrared spectrum bands were found inter alia at 3465, 1755, 1728, 1653, 1612, 1419, 1231, 1098, 1085, 1061 and 1034 cm.$^{-1}$.

Example 12

To a solution of 1.0 g. of 17$\alpha$-hydroxy-6-dehydro-retro-progesterone in 15 ml. of tetrahydrofurane and 2.5 ml. of methanol there were added while stirring at −4° C. to 0° C., 1.5 gs. of powdered iodine. The brown solution obtained was discolored at the same temperature by dropwise addition within about 10 minutes, of 10 ml. of 10% sodium hydroxide solution. The reaction mixture was poured out into 150 ml. of water and extracted from ether and methylene chloride. The extract was washed to neutral reaction with water, dried on Na$_2$SO$_4$ and evaporated to dryness in vacuo, directly after which a mixture of 3 g. of dry potassium acetate and 50 ml. of acetone was added to the resultant crude 21-iodo-6-dehydro-17$\alpha$-hydroxy-retro-progesterone. This reaction mixture was refluxed for 16 hours. After cooling the salts were filtered off and washed with acetone. The filtrate was evaporated to dryness, absorbed in methylene chloride and ether and washed to neutral reaction with water. After drying on Na$_2$SO$_4$ the solvent was distilled off in vacuo, after which 915 mg. of residue was obtained. After two recrystallizations from a mixture of acetone and methylene chloride 6-dehydro-17$\alpha$, 21-dihydroxy-retro-progesterone 21-acetate was obtained. The sample had the following analytical values: a melting point of 238.5–244(s) —257–259° C. (dec.) (Tottoli) or 270° C. (Kofler).

$E_{1cm.}^{1\%}$ (286.5 m$\mu$)=6.0. $\epsilon$(286.5 m$\mu$)=25,200

Calculated for $C_{23}H_{30}O_5$ (386.49): C, 71.74; H, 7.82; O, 20.44. Found: C, 70.90, H, 7.91, O, 20.59; C, 70.89; H, 8.06; O, 20.47.

In the infrared spectrum bands were found inter alia at 3440, 1751, 1726, 1645, 1619, 1584, 1425, 1235, 1085, 1067, 1046 and 1036 cm.$^{-1}$.

By this process thus are produced
6-dehydro-11,17$\alpha$,21-trihydroxy-retro-progesterone 21-acetate from 6-dehydro-11,17$\alpha$-dihydroxy-retro-progesterone;
6-dehydro-6-methyl-17$\alpha$, 21-dihydroxy-retro-progestrone 21-acetate from 6-dehydro-6-methyl-17$\alpha$-hydroxy-retro-progesterone retro-prednisolone 21-acetate from 1-dehydro-11, 17$\alpha$-dihydroxy-retro-progesterone;
2-fluoro-6-dehydro-17$\alpha$, 21-dihydroxy-retro-progesterone 21-acetate from 2-fluoro-6-dehydro-17$\alpha$-hydroxy-retro-progesterone;
16-methyl-6-dehydro-17$\alpha$, 21-dihydroxy-retro-progesterone 21-acetate from 16-methyl-6-dehydro-17$\alpha$ dihydroxy-retro-progesterone;
9-fluoro-retro-hydrocortisone 21-acetate from 9-fluoro-17$\alpha$, 11-dihydroxy-retro-progesterone and 2-methyl-17$\alpha$, 21-dihydroxy-retro-progesterone 21-propionate from 2-methyl-17$\alpha$-hydroxy-retro-progesterone.

Example 13

A solution of 216 mg. of K$_2$CO$_3$ in 6 ml. of water was added to a suspension of 1.2 g. of 17$\alpha$, 21-dihydroxy-retro-progesterone 21-acetate in 30 ml. of methanol at 24° C. The mixture was then stirred at 24° C. for 2 hours. After half an hour the solid substance apparently began dissolving and after one hour the whole quantity was practically dissolved. Then neutralization was carried out with 1 N acetic acid and the solution obtained was filtered off.

The filtrate was collected in a constantly stirred solution of 9 gs. of NaCl in 200 mls. of water. Then stirring was continued for half an hour at 0° C. After drying in a desiccator on CaCl₂ 897.5 mg. of a substance was obtained, having a melting point of 201–208 (s)→220–221° C. (dec.) (Tottoli) or 240° C. (Kofler);

$E_{1 cm.}^{1\%}$ (241.5 mμ)=480, ε(241.5 mμ)=16,600

The filtrate yielded after extraction from methylene chloride a second fraction of 115 mg., so that the yield was substantially quantitative. Crystallization of 246 mg. of the 17α, 21-dihydroxy-retro-progesterone thus obtained from methanol yielded 107 mg. having the following analytical values:

Melting point of 196.5(s)→203.5–217° C. (dec.) (Tottoli) or 240° C. (Kofler).

$E_{1 cm.}^{1\%}$ (242.5 mμ)=471. ε(242.5 mμ)=16,300

Calculated for $C_{21}H_{30}O_4$ (346.47): C, 72.80; H, 8.73; O, 18.47. Found: C, 72.63; H, 8.62; O, 18.78.

In the infrared spectrum inter alia bands were found at 3490, 3368, 1706, 1649, 1614, 1416, 1086, 1074, 1061, 1040 and 1006 cm.⁻¹.

All solvents were rendered free of oxygen as far as possible prior to use by evacuation and subsequent washing with nitrogen.

By this process thus are produced
retro-hydrocortisone from retro-hydrocortisone 21-acetate;
9-fluoro-retro-prednisolone from 9-fluoro-retro-prednisolone 21-acetate;
9-fluoro-16-hydroxy-retro-prednisolone from 9-fluoro-16-hydroxy-retro-prednisolone 21-acetate;
9-fluoro-16-methyl-retro-prednisolone from 9-fluoro-16-methyl-retro-prednisolone 21-butyrate and 6-methyl-9-fluoro-retro-hydrocortisone from 6-methyl-9-fluoro-retro-hydrocortisone 21-trimethylacetate.

*Example 14*

About 15 ml. of the benzene of a solution of 12.5 g. of retro-progesterone and 1.25 g. of p-toluene-sulphonic acid in 300 mls. of absolute thiophene-free benzene was distilled off in a slow nitrogen flow until the distilled benzene became clear. Then 20 ml. of benzene was added and about 5 ml. was distilled off again. To the reaction mixture was then added 15 ml. of isopropenyl acetate and the assembly was subjected to slow distillation. To this end the test bulb was provided with a Vigreux column (length about 30 cms.). After heating for about 30 minutes the first drops of distillate came over by the first drops, after which in about 140 minutes 240 ml. of solvent was distilled off. By removing the test bulb from the heating mantle the reaction mixture cooled to room temperature within 30 to 45 minutes under a slow flow of nitrogen. The mixture was then poured out on about 250 ml. of ice, diluted with 250 ml. of ether and the organic liquid layers were subsequently washed three times with 250 ml. of ice cold saturated bicarbonate solution and five times with 200 ml. of ice water to neutral reaction. After drying on sodium sulphate the mixture was filtered and to the filtrate there was added 1% of the total volume of dry pyridine. Then the ether was distilled off under normal pressure, the benzene for the major part in the water-jet-pump vacuo and the last quantity of solvent was finally distilled off with the aid of an oil pump. Distillation was always carried out from a water bath of which the temperature was <60° C.

The resinous residue (15.3 g.) was crystallized from 15 ml. of methanol, to which previously 1% of dry pyridine was added, at −5° C., and finally at −25° C. Filtering and washing with cold methanol (−25° C.) yielded 9.61 g. of 3-enolacetate of retro-progesterone having a melting point of 74 (s)—82–87.5° C. (open tube) and 85 (s) —87–89° C. (vacuo). A few recrystallizations to a constant melting point yielded a product having the following analytical values:

Melting point 90–92° C. (in vacuo).

The infrared absorption spectrum showed maxima at 1750, 1698, 1654, 1640, 1617 (the last three very weak), 1356, 1198, 1012, 919 and 879 cm.⁻¹.

$E_{1 cm.}^{1\%}$ (λ max=236 mμ)=530 and 530 (methanol) ε(2.6 mμ)=18,900

Found: C, 77.44, 77.42; H, 9.25, 9.23. Calc. for $C_{23}H_{32}O_3$ (356.51): C, 77.48; H, 9.05.

By this process thus are produced 3-enolacetates of 17α,21-dihydroxy-retro-progesterone 21-acetate, of 6-methyl-21-acetoxy-retro-progesterone, of 16-methyl-9α-fluoro-hydrocortisone 21-acetate, of 2-methyl-17α-acetoxy-retro-progesterone, of 1-dehydro-2-fluoro-17α-acetoxy-retro-progesterone, of 21-fluoro-retro-progesterone and 21-fluoro-17α-acetoxy-retro-progesterone.

*Example 15*

A mixture of 10.5 ml. of a 3.45 N sodium methylate solution in dry methanol, 70 ml. of anhydrous benzene and 3.2 ml. of dry ethanol was concentrated by evaporation under nitrogen to a volume of 30 ml. Then, while stirring, first 8.5 ml. of diethyl oxalate and then a solution of 10 g. of 6-dehydro-retro-progesterone in 70 ml. of benzene were added and the mixture was stirred for 90 minutes. After the addition of 400 ml. of anhydrous ether, stirring was continued for 45 minutes and finally filtering of the resultant sodium-enolate of 21-ethoxy-oxalyl-6-dehydro-retro-progesterone was carried out. After drying the weight of this compound was 12.2 g.

This sodium enolate was dissolved at −25° C. in 170 ml. of dry methanol, with stirring, in a nitrogen atmosphere. Then, while still stirring at said temperature, a solution of 7.2 g. of iodine in 170 ml. of methanol was added dropwise. After stirring for another 90 minutes 8.2 ml. of a 3.45 N sodium methylate solution in methanol was added and stirring was carried out at 0° C. for one hour. Within 45 minutes 1070 ml. of water was added in drops at 0° C. and 150 g. of NaCl was added and stirring was continued at 0° C. for 15 minutes. Filtering and drying yielded the 21-iodo-6-dehydro-retro-progesterone.

The 21-iodo-derivative thus obtained was washed with 540 ml. of acetone in a solution of 11.6 g. of potassium acetate in 130 ml. of water and 6 ml. of acetic acid. After boiling for 5 hours the acetone was distilled off in vacuo and extracted from methylene chloride. The 6-dehydro-21-acetoxy-retro-progesterone thus obtained was recrystallised in order of succession from ethanol, ethylacetate and acetone.

The analytical values of this compound were as follows:

Melting point 194.5–197.5° C.

ε(λ max=286 mμ)=25,500

Found: C, 74.08, 74.16; H, 8.15, 8.14. Calc. for $C_{23}H_{30}O_4$: C, 74.56; H, 8.16.

The infrared spectrum showed inter alia bands at 1747, 1723, 1654, 1617, 1578, 1414, 1235, 1072, 891, and 844 cm.⁻¹.

By this process there are produced 6-dehydro-retro-hydrocortisone 21-acetate from 6-dehydro-11,17α-dihydroxy-retro-progesterone, 1,6-bisdehydro-retro-hydrocortisone 21-acetate from 1,6-bisdehydro-11,17α-dihydroxy-retro-progesterone, 6-dehydro-16-methyl-retro-hydrocortisone 21-acetate from 6-dehydro-11,17α-hydroxy-16-methyl-retro-progesterone and 6-methyl-6-dehydro-retro-hydrocortisone 21-acetate from 6-methyl-6-dehydro-11,17α-dihydroxy-retro-progesterone.

*Example 16*

A solution of 500 mg. of bromine in 10 ml. of carbon tetrachloride was added dropwise into a solution of 937 mg. of 6-dehydro-retro-progesterone in 125 ml. of carbon tetrachloride cooled to −10° C. The addition took about 50 minutes. After the addition of 6 ml. of collidine the carbon tetrachloride was distilled off in vacuo and the residue was heated for 10 minutes at 140° C., in a nitrogen atmosphere. After processing the resultant 4-bromo-6-dehydro-retro-progesterone was crystallized from methanol.

The analytical values of this compound were:
Melting point 121–122° C. (dec. in vacuo)

$\epsilon(\lambda \max = 301 \text{ m}\mu) = 21,500$

Found: C, 63.95, 64.31; H, 7.13, 6.96; Br, 19.71, 19.30. Calc. for $C_{21}H_{27}O_2Br$: C, 64.45; H, 6.96; Br, 20.42.

The infrared spectrum showed inter alia bands at 1690, 1675, 1619, 1538, 1279, 1183, 961, and 793 cm.$^{-1}$.

If chlorine was used instead of bromine in this process, the 4-chloro-6-dehydro-retro-progesterone was obtained.

The analytical values of this compound were:
Melting point 183° C. (s) —185–188° C. (vacuo).

$\epsilon(\lambda \max = 298 \text{ m}\mu) = 22,500$

Found: C, 72.66, 72.39; H, 7.94, 7.96; Cl, 10.23, 10.25. Calc. for $C_{21}H_{27}O_2Cl$: C, 72.71; H, 7.84; Cl, 10.23.

The infrared spectrum showed inter alia bands at 1689, 1681, 1626, 1547, 1417, 1208, 939, 811 and 793 cm.$^{-1}$.

By this process there is produced: 4-chloro- and 4-bromo - 6 - dehydro-17α-acetoxy-retro-progesterone from 6-dehydro-17α-acetoxy-retro-progesterone, 4-chloro- and 4-bromo - 6 - dehydro-17α-ethyl-retro-testosterone from 6-dehydro - 17α - ethyl-retro-testosterone, 4-chloro- and 4-bromo - 6 - dehydro-21-fluoro-retroprogesterone from 6 - dehydro - 21 - fluoro-retro-progesterone, 4-chloro- and 4-bromo-6-dehydro-retro-hydrocortisone 21-acetate from 6-dehydro-retro-hydrocortisone 21-acetate.

*Example 17*

700 mg. of 6-chloro-retro-progesterone and 1 g. of chloranyl were boiled in 100 ml. of tert. butanol in a nitrogen atmosphere while stirring for 30 hours. The resultant reaction mixture was poured into a solution of sodium dithionate and then extracted with ether. After crystallization of the resultant 6-chloro-6-dehydro-retro-progesterone from ethanol, crystals were obtained having the following analytical values.

Melting point 165–166° C. $\epsilon(\lambda \max = 288 \text{ m}\mu) = 19,500$.
Found: C, 72.73; H, 7.90; Cl, 10.32. Calc. for $C_{21}H_{27}O_2Cl$: C, 72.71; H, 7.84; Cl, 10.23.

The infrared absorption spectrum showed inter alia bands at 1704, 1658, 1613, 1584, 1415, 1230 and 885 cm.$^{-1}$.

By this process there is produced 6-chloro-t-dehydro-17α - acetoxy - retro - progesterone from 6-chloro-17α-acetoxy - retro - progesterone, 6-fluoro-6-dehydro-retro-progesterone from 6-fluoro-retro-progesterone, 6-fluoro-6-dehydro-17α-acetoxy-retro-progesterone from 6 - fluoro-17α-acetoxy-retro-progesterone, 6 - chloro - 6 - dehydro-17α-ethyl-retro-testosterone from 6 - chloro - 17α - ethyl-retro-testosterone, 6 - chloro - 6 - dehydro-retro-hydrocortisone from 6 - chloro - retro - hydrocortisone and 6-chloro-6-dehydro - 9 - fluoro-retro - prednisolone from 6-chloro-9-fluoro-retro-prednisolone.

*Example 18*

1.85 g. of 3-acetoxy-retro-pregna-3,5-diene-20-one were dissolved in 30 ml. of ether and a solution of 4 g. of potassium acetate in 60 ml. of 85% acetic acid was added. Then at 0° C., while stirring, a solution of 375 mg. of chlorine in 9.4 ml. of acetic acid was added in drops. After stirring for some time, 6-chloro-retro-progesterone was obtained, which was recrystallized from ethylacetate.

This compound had the following analytical values:

Melting point: 197–198.5° C. (vacuo)

$\epsilon(\lambda \max = 236 \text{ m}\mu) = 15,000$

Found: C, 72.51, 72.30; H, 8.53, 8.42; Cl, 9.86, 10.02. Calc. for $C_{21}H_{29}O_2Cl$: C, 72.29; H, 8.38; Cl, 10.16.

The infrared spectrum exhibits inter alia bands at 1700, 1668, 1620, 1415, 1362, 1232, 945, 879, 866 and 783 cm.$^{-1}$.

From the mother liquor was crystallized a substance which will probably be the 3,6,20-triketo-retro-pregnane.
Melting point 201–203° C.
Found: C, 76.22, 76.22; H, 9.05, 9.07; O, 14.84; 14.98. Calc. for $C_{21}H_{30}O_3$: C, 76.32; H, 9.15; O, 14.53.

The infrared spectrum showed inter alia bands at 1720, 1703, 1357, 1423, 1265, 1227, 1218, 1192, 1155 and 1105 cm.$^{-1}$.

If bromine instead of chlorine was used in the foregoing process the 6-bromo-retro-progesterone was obtained.

The compound had the following analytical values:
Melting point 138–140° C. (dec.)

$\epsilon(\lambda \max = 238 \text{ m}\mu) = 12,450$

Found: C, 64.00, 64.21; H, 7.51, 7.46; Br, 21.04, 21.01. Calc. for $C_{21}H_{29}O_2Br$: C, 64.12; H, 7.43; Br, 20.32.

The infrared spectrum showed inter alia bands at 1704, 1676, 1622, 1416, 1209, 944 and 873 cm.$^{-1}$.

By this process there is produced the 6-chloro or 6-bromo-derivatives of 17α-acetoxy-retro-progesterone, of 17,21-dihydroxy-retro-progesterone 21-acetate, of retro-hydrocortisone 21-acetate, of 21-fluoro-retro-progesterone, of 9-fluoro-16-methyl-retro-hydrocortisone 21-acetate by reacting the 3-enolacetates of the compounds mentioned above with chlorine or bromine.

*Example 19*

1 g. of 6-dehydro-retro-progesterone was dissolved in 10 mls. of dry methylene chloride and the solution, after cooling to 0° C. was added to 15 ml. of ethanolic hydrochloric acid of 0° C. (52 g. of hydrochloric acid gas dissolved in 100 ml. of dry ethanol). The reaction mixture was kept for 30 minutes at 0° C. and was diluted with 15 ml. of dry ethanol of −25° C. and was again kept at 0° C. for 30 minutes. After pouring out into ice water the substance was further processed and the resultant 3-ethoxy-retro-pregna-3,5,7-triene - 20 - one was crystallized from methanol. The analytical values of this compound were:

Melting point 115–116° C. (vacuo).
(320 m$\mu$)=20,000. Shoulders at 310 and 335 m$\mu$.
(215 m$\mu$)=9,000.

Found: C, 80.73, 80.71; H, 9.54, 9.66. Calc. for $C_{23}H_{32}O_2$: C, 81.13; H, 9.48.

The infrared absorption spectrum showed inter alia bands at 1710, 1646, 1619, 1565, 1236, 1174 and 846 cm.$^{-1}$.

This process may be used to produce 3-ethoxy-17α-acetoxy-retro-pregna - 3,5,7 - triene - 20 - one from 17α-acetoxy - 6 - dehydro - retro - progesterone, 3-ethoxy-17,21-dihydroxy - retro - pregna - 3,5,7-triene-20-one from 17,21-dihydroxy - 6 - dehydro - retro - progesterone or 3-cyclopentyloxy - 17α - acetoxy - retro - pregna-3,5,7-triene-20-one from 17α - acetoxy - 6 - dehydro - retro-progesterone, 3 - cyclohexyloxy - 11,17,21 - trihydroxy-retro-pregna-3,5,7-triene-20-one from 6 - dehydro - retro-hydrocortisone and 3-benzyloxy-17α-ethyl-retro-androsta-3,5,7-triene-17-ol from 6-dehydro-17α-ethyl-retro-testosterone.

*Example 20*

7.5 g. of 6-chloro-retro-progesterone was then dissolved in 200 ml. of acetic acid and to the solution there were added 21 g. of freshly melted potassium acetate. The mixture was then boiled for 4½ hours in a nitrogen atmosphere. The mixture was then cooled and poured out on 1 l. ice. The resultant 2-acetoxy-retro-progesterone was separated out by extraction with ether. By chromatography on 100 g. of silica gel, eluation being carried out with benzene+increasing quantities of ether, the compound was obtained in a substantially pure state. Crystallization from ethanol yielded the pure substance having the following analytical values:

Melting point 195.5–197° C. $\epsilon(\lambda \text{ max}=242.5 \text{ m}\mu)=15,800$.

Found: C, 74.09; H, 8.54. Calc. for $C_{23}H_{32}O_4$: C, 74.16; H, 8.66.

The infrared spectrum showed bands inter alia at 1746, 1695, 1622, 1237, 1218, 1047 and 879 cm.$^{-1}$.

By this process there is produced 2,17-diazetoxy-retro-progesterone from 6-bromo-17α-acetoxy-retro-progesterone, 2,17α,21-trihydroxy-retro-progesterone 2,21-diacetate from 6-chloro-17α, 21-dihydroxy-retro-progesterone 21-acetate-retro-hydrocortisone from 6-bromo-retro-hydrocortisone, 2-acetoxy-21-fluoro-retro-progesterone from 6-bromo-21-fluoro-retro-progesterone and 2-acetoxy-16-methyl - retro - hydrocortisone from 6 - chloro - 16-methyl-retro-hydrocortisone.

Example 21

1.5 g. of 3-acetoxy-retro-pregna-3,5-diene-20-one was dissolved in 66 ml. of ethyl acetate, containing 14.4 mg. of monoperphthalic acid per millilitre. After standing 17 hours at +5° C. in darkness the solution was diluted with ether and washed with sodium bicarbonate and water. 6-hydroxy-retro-progesterone was thus produced which was dissolved in dry pyridine and esterified with acetic acid anhydride by keeping the mixture at room temperature for one hour. Further processing yielded the 6-acetoxy-retro-progesterone, which was crystallized from ethanol.

The analytical values of this substance were:

Melting point 177–178.5° C. $\epsilon(\lambda \text{ max}=238 \text{ m}\mu)=15,600$.

Found: C, 73.79; 73.36; H, 8.56; 8.56. Calc. for $C_{23}H_{32}O_4$: C, 74.16; H, 8.66.

The infrared absorption spectrum showed bands inter alia at 1741, 1693, 1666, 1620, 1419, 1234, 1060, 1040 and 870 cm.$^{-1}$.

By this process there is produced 6,17α-diacetoxy-retro-progesterone from 3,17α - diacetox-retro-pregna - 3,5-diene-20-one, 6,17α,21-trihydroxy-retro-progesterone 6,21-diacetate from 3,17α,21-trihydroxy-retro-pregna-2,5-diene-20-one, 6,17α,21-trihydroxy-retro-progesterone 6,21-diacetate from 3,17α,21-trihydroxy-retro-pregna-2,5-diene-20-one 3,21-diacetate and 6-butyroxy-17α-ethyl-retro-testosterone from 3-acetoxy-17α-ethyl-retroandrosta-3,5-diene-17-ol.

Example 22

Oxydation of 11,17α,21-trihydroxy-retro-progesterone 21-acetate with chromic acid in acetone containing 7 N sulphuric acid yielded retro-cortisone 21-acetate with a melting point of 275° C. (dec.).

The infrared absorption spectrum showed bands inter alia at 1736, 1731, 1697, 1644, 1609, 1416, 1229, 1106, 1088, 1063, 1936 and 859 cm.$^{-1}$.

The compounds of the invention may be compounded in the form of pills, capsules, tablets and in liquid form for oral administration and in liquid form for parenteral administration.

Suitable tablets of 6-dehydro-retro-progesterone may be obtained, for example, by preparing tablets from a mixture of the following composition:

| | Mg. |
|---|---|
| 6-dehydro-retro-progesterone | 1.0 |
| Gelatine | 2.5 |
| Lactose | 220.0 |
| Talcum | 24.5 |
| Magnesium stearate | 2.0 |
| Total | 250.0 |

In order to determine the hormonal activity of the novel retrosteroids of our invention the following tests were carried out.

*Qualitative determination of progestational activity products by the Clauberg test (Procedure 300)*

*Principle of test.*—The uterus of an infantile female rabbit changes by subcutaneous administration of estrone in the same manner as it is changed by the action of heat. Owing to cell division, cell enlargement, enhanced vascularization and accumulation of liquid in tissues all layers are thickened, but apart from the larger volume there is little difference between the states termed "proliferation phase" by Clauberg and the infant or castrate uterus in regard to the histological form.

Conspicuous variations in shape occur under the action of the corpus luteum hormone, particularly in the mucosa (transformation phase or progestative phase or secretion phase).

The mucous membrane epithelium, which initially was limited to a simple four- or five-armed lumen, starts growing strongly and emits numerous strongly ramified intussusceptions in depth. The stroma is thus urged back by the epithelium and finally reduced to a minimum.

In the tests infantile female rabbit aged 6 weeks, with a weight between 500 and 1000 gms. are used. During the test the animals are fed normal fodder.

Method of test (a) Dilute 0.1 ml. of β-estradiol solution with arachidic oil to 10 ml. in a graduated bulb. Dilute 4 ml. of this solution to 250 ml. with arachidic oil (8 units/ml.).

(b) Administer daily for 8 days subcutaneously 0.5 ml. of β-estradiol solution to the rabbits.

(c) Parenteral test: Weigh 80 ml. of the steroid to be tested in a mortar of 25 ml. Dissolve in about 1 ml. of methylene chloride and add 8 ml. of arachidic oil. Evaporate subsequently the methylene chloride in vacuo (maximum temperature 40° C.) until the concentration of the resultant solution is 10 mg./ml. (solution C).

(d) Dilute 1 ml. of solution C to 10 ml. with arachidic oil resulting in solution B, concentration 1 mg./ml.

(e) Dilute 1 ml. of solution B to 10 ml. with arachidic oil resulting in solution A concentration 0.1 mg./kg.

(f) Oral test: Weigh 60 mg. of the steroid in a small stoppered bottle and dissolve the steroid in 3 ml. of methylene chloride. Add dropwise 0.1 ml. of the resultant solution on twenty-five blank tablets. Evaporate the methylene chloride so that each tablet contains about 2 mg. of the substance.

(g) If the substance to be tested is poorly soluble in methylene chloride a suspension of the steroid is made in 1% of sodium carboxymethyl cellulose in a concentration of 10 mg./ml. In order to do this the substance is powdered in a small mortar and 60 mg. is weighed. Then 60 mg. of sodium carboxymethyl cellulose is added and 6 ml. of distilled water is added slowly, with stirring continuously.

(h) Prepare a standard solution of progesterone by weighing 7.5 mg. of progesterone and by adding methylene chloride and 10 ml. of arachidic oil. Evaporate the methylene chloride in vacuo.

(i) The animals pretreated with estradiol are divided into six groups by random allocations.

(j) For five days the animals are treated according to the following procedure.

Group:
(1) arachidic oil—0.2 ml. a day by subcutaneous administration.
(2) progesterone 750/ml.—0.2 ml. a day by subcutaneous administration.
(3) steroid in solution A=0.1 mg./ml.=0.2 ml. a day by subcutaneous administration.
(4) steroid in solution B=1 mg./ml.=0.2 ml. a day by subcutaneous administration.

(5) steroid in solution C=10 mg./ml.=0.2 ml. a day by subsutaneous administration.
(6) Oral, 1 tablet or 0.2 ml. of the suspension 10 mg./ml.

(k) For these five days the animals are treated, in addition, with estradiol and have subcutaneous injections of 0.1 ml. of β-estradiol (8 units/ml.).

On the fourteenth day (or at the end of the thirteenth day) the animals are killed by a deathblow and the blood is extracted. The uterus is prepared and fiixed in formaline (4%). The uterus is macroscopically examined. Paraffin sections of 5μ are made and colored with H.E.

*Maintaining of the pregnancy after ovariectomy with the aid of a progestative steroid in the rat (Procedure 306)*

*Principle of test.*—One of the most important criteria for a progestative substance is, apart from the direct effect on the uterus endometrium (Clauberg test), the requirement of maintaining the pregnancy after the ovaria have been removed.

The ovaria must be removed between the tenth and the thirteenth day of pregnancy. If the ovariectomy is performed at a later date of the pregnancy, the mother rat is capable, even without the injection of progestatives with or without the addition of estrogenic hormones, of normally terminating the pregnancy. The placenta has then developed to an extent such that it provides itself the required hormones. This test is therefore based on the fact that a pregnant rat, subsequent to ovariectomy within the given time, is not capable of achieving the pregnancy and usually ejects the embryos or asorbs them.

*Test animals.*—A large number of adult female rats which have littered once and a number of adult male rats are used. The ratio of the number of female to male rats used in the test is 3:1.

*Method of test*

(a) The female rats are caged in groups of three. To three female rats there is added one male rat.
(b) The next morning vaginal smears are made, which are fixed in methyl alcohol and colored with methylene blue.
(c) The smears are then examined for the presence of spermatozoa.
(d) When the vaginal smear of a rat is sperma-positive, the animal is caged separately and weighed (the 0th day of the pregnancy).
(e) At the tenth, eleventh or twelfth day of the pregnancy the animals are first injected or fed orally with blank arachidic oil or with the steroid to be tested.
(f) At the eleventh, twelfth or thirteenth day ovariectomy is carried out under ether anaesthesia; at the same time the weight is determined. Directly after the ovariectomy the preparation is administered for the second time.
(g) All injections are carried out subcutaneously twice a day.

The active steroid is dissolved in 0.2 ml. of arachidic oil. Oral feeding is carried out twice a day, also 0.2 ml. each time. In this case the active steroid is suspended in a carboxymethylcellulose solution consisting of:

| | Percent |
|---|---|
| Carboxymethylcellulose | 1.0 |
| Sodium chloride | 0.9 |
| Benzyl alcohol | 1.5 |
| Tween 60 | 1.0 |
| Distilled water, to make | 100 |

(h) The animals are treated up to the twenty-first day of pregnancy.
(i) It is noted when a vaginal bleeding is observed or when fetus remains are found in the cage.
(j) At the 22nd day the rats are killed by chloroform and by means of a Caesarian section the number of living young, the number of fetus remains and the number of resorbed fetus (affixtures) per rat are determined.
(k) Each mother rat is examined on the presence of ovarium remains.
(l) It is desirable to arrange this test so that each treated group has its separate statistic data. Therefore there is a considerable difference of time between the start of the test for rat 1 and the end of the test for the rat 6 of a treated group. The desirable number of rats per group is 6 to 7 mother rats.

*Literature.*—Stucki, J. C.: Proc. Soc. Exp. Biol. (N.Y.) 99 (1958) 500. Stucki, J. C.: and Forbes A. D. Acta Endoor. 33 (1960) 73–80.

*Masculinisation effect of a steroid on the female rat fetus (rat), if any (Procedure 307)*

*Principle of the test.*—After the administration of testosterone and different progestative substances during the pregnancy important external and internal changes of the *Tractus genitalis* of the female fetus are produced.

The genital differentiation of the rat takes place between the 14th and the 17th day of pregnancy. The administration of the substance to be tested must therefore start in said period if variations in the ano-genital distance, enlarged clitoris, no modifications of vagina and no internal deviations are to be assessed.

For a progestatively acting hormone it is necessary to have no direct androgenic effect on the patient, while indirectly no masculinating effect on the female fetus should be found.

*Test animals.*—A great number of adult female rats which have littered once. A number of adult male rats. Ratio 3:1.

*Method*

(a) The female rats are caged in groups of three. To three females one male is added.
(b) Each morning vaginal smears are made. The smears are fixed in methyl alcohol and colored with methylene blue.
(c) The smears are examined on the presence of spermatozoa.
(d) When the vaginal smear of the rat is positive, the rat is separated and weighed (0th day of pregnancy).
(e) At the 15th day the rat is weighed again; increase in weight is a second indication of pregnancy.
(f) The steroids are administered once a day from the 15th day up to the 21st day of pregnancy included in a quantity of 0.2 ml., subcutaneously or orally.
(g) In subcutaneous administration the steroid is dissolved in methylene chloride in arachidic oil. With oral administration the active steroid is suspended in a carboxymethylcellulose solution, i.e.

| | Percent |
|---|---|
| Carboxymethylcellulose | 1.0 |
| Sodium chloride | 0.9 |
| Benzylalcohol | 1.5 |
| Tween 60 | 1.0 |
| Distilled water | to 100 |

(h) At the 22nd–23rd day the young are born spontaneously after the administration of small doses of the steroid. With high doses the young must be removed from the uterus by operation.
(i) Directly after birth the young are examined by measuring the ano-genital distance by means of sliding calipers.

The criteria are: Distance (ano-genital) 1–2 mm. female, 2–3 mm. intersex, 3 mms. male.
The average weight of the young is determined.
(j) Each young is fixed in formaline (4%) and the externally examined sex is indicated. It is indicated, moreover, whether the clitoris is enlarged.
(k) After fixation the animals are cut open and the presence of testicles or ovaria is indicated.
(l) The testicle, the ovarium is histologically worked and the region from the tail root to the kidneys is cut in sections.

(m) The final examination of masculinisation is based on histological phenomena. Internal deviations, for example connections between ureter and vagina, blind vaginae, "penis-like" clitoris can then be shown clearly.

(n) A few animals of each group are kept alive to the age of three weeks. When the young have been obtained by operation, they are placed with a different mother rat having littered the same day (the mother rat must be anaesthetized).

(o) After 21 days a section is carried out, the sexual organs are prepared and the *Tractus genitalis* is accurately examined histologically.

(p) The test must be arranged so that the mother rats are distributed at random and each group must comprise 6 to 7 mother rats.

*Literature.*—Revesz, C.: et al. Endocrinology 66 (1960) 140. Scholer, H. F. L.—de Wachter, A. M.: Acta Endocrinologica 38 (1961) 128–136.

*Determination of estrogenic and anti-estrogenic effect of a steroid (opening of the vagina) (Procedure 308)*

*Principle of test.*—Under the action of "estrogenics" (estradiol) the vagina of female infantile rats is prematurely opened, since the animal gets heat. Normally the vagina of the female rat opens, when the animal has reached puberty (about 7 weeks).

By means of β-estradiol or an estrogenically active steroid the time of opening of the vagina is shifted to an earlier date. When the steroid is injected in conjunction with β-estradiol, there is an estrogeno-inhibiting action of the steroid, if the instant of opening of the vagina is later than with the β-estradiol group.

*Test animals.*—In the test 32 female, infantile rats, weight 35 to 45 g.; age 21 to 23 days are used for each steroid tested. During the test the animals are freely fed water and fodder.

Method of test:

(a) The rats are divided into weight groups separated by a one gram progression.

(b) From these groups 8 replications of 4 animals.

(c) Separate out therefrom 4 groups of 8 animals by means of a random allocation.

(d) The rats are marked and their body weights are recorded.

(e) A standard solution of β-estradiol (4 units/ml.) is made.

(f) A steroid solution in oil is made by weighing 300 mg. in a round-bottomed bulb; add a few mls. of methylene chloride and 30 ml. of arachidic oil and evaporate the methylene chloride.

(g) The animals in each of the four groups (1, 2, 3 and 4) are injected subcutaneously every 48 hours with the materials and amounts designated as follows:

Group:
 (1) Blank arachidic oil: 0.2 ml.
 (2) β-Estradiol standard 4 units/ml: 0.2 ml.
 (3) Steroid 10 mg./ml.: 0.2 ml.
 (4) Steroid +β-estradiol standard (0.2+0.2) ml.

(h) The rat is checked daily for the opening of the vagina.

When the vagina is open, the body weight and the data are noted down.

(i) The criterion for terminating the test is the day, when 7 of the 8 animals in the check group have an opened vagina.

(j) By section the uterus and the two ovaria are prepared and weighed. The ovaria are tested histologically.

*Literature.*—Curtus H, Doisy, E. A.: Journal Biol. Chem. 41, 647, 1931. Long, J. A., Evans, H. M.: Mem. Univ. California 6, 84, 1932.

*Determination of the uterotrophic and anti-uterotrophic action of a steroid (Procedure 309)*

*Principle of the test.*—Under the action of the female hormone "estradiol" (also estrone and estriol) the uterus of the female, infantile animal exhibits quantitative changes. The uterus of the female infantile mouse is particularly sensitive to estrogenics and is enlarged under the action of very small quantities owing to cell division and liquid accumulation.

In this test also the anti-uterotropic action of a steroid is assessed by injecting a group of animals with a combination of β-estradiol and the steroid to be tested. If the growth of the uterus, caused by β-estradiol only:

(a) is counteracted, the steroid has an inhibiting effect, which is dependent on the inclination of the progestative activity, (b) is antagonated, the steroid has an anti-estrogenic effect.

*Test animals.*—For testing one steroid there are required 32 female, infantile mice, age 21 to 23 days, weight 9 to 13 g. Water and fodder is freely available for the animals during the test period.

*Method of test*

(a) The animals are divided into four groups separated by not more than about 0.5 g. by means of weight replications and random allocations.

(b) A standard solution of β-estradiol in arachidic oil (10 units/ml.) is prepared.

(c) The steroid to be tested is dissolved as follows: 60 mg. of the steroid is weighed in a round-bottom bulb, a few mls. of methylene chloride and 6 mls. of arachidic oil are added. The methylene chloride is evaporated in vacuo by slightly heating (solution=10 mg./ml.).

(d) The mice are marked and the individual body weights are recorded.

(e) The rats in each of the four groups are injected subcutaneously once a day for three days with the following materials:

Group:
 (1) Blank arachidic oil, 0.1 ml.
 (2) β-Estradiol dimenformon 10 units/ml., 0.1 ml.
 (3) Steroid 10 mg./ml., 0.1 ml.
 (4) Steroid 10 mg./ml.+β-estradiol 10 units/ml.: 0.1+0.1 ml.

(f) On the 4th day the mice were weighed and killed by chloroform. The uterus, ovaria and thymus are prepared.

(g) After cleaning (if necessary with the aid of a magnifying glass, moist filter paper) the weight of the uterus, the left-hand and the right-hand ovarium and the thymus is noted down, while in addition, the dry weight of the uterus, after a stay of one night in a dry cell, is determined.

*Literature.*—Betty L. Rubin, A. S. Dorfman: Journal of Endocrinology 49, 4, 429.

*Determination of androgenic, anabolic and anti-androgenic action of steroids on castrated male rats (Procedure 311)*

*Principle of the test.*—By the removal of the testicles of a male, infantile rat the (small) testosterone production is stopped. A few weeks after castration the level of the weight of testicle and prostate will be lower than that of the intact infantile animal of the same age.

These castrates are very sensitive to exogenic administration of testosterone and this test is based on the growth of the testicle and the ventral prostate. In order to assess an anabolic action the musculus levator ani is prepared. Moreover, a combination group is used to show anti-androgenic activity.

*Animals employed in test.*—Male, infantile rats of 3 weeks are used in this test. These rats weighing about 35 to 45 g. are castrated under ether anaesthesia. Three weeks after the castration the test is started. During the preliminary treatment and the test the animals have water and fodder freely at their disposal.

*Method.*—This test is carried out completely in accordance with the Procedure 310; only the concentration of the standard testosterone solution is lower, i.e. 250/ml. instead of 500/ml. For making 30 ml. of a standard solution 7.5 mg. of testosterone instead of 15 mg. is weighed.

*Determination of the anti-inflammatory action of steroid (asbestos pellet test)*

*Principle of the test.*—The implantation of a foreign body produces inflammatory reactions which becomes manifest in the formation of tissue around the foreign body with exudation. These reactions are suppressed or occur to a minor extent, when a substance having an anti-inflammatory action is administered.

*Animals employed in test.*—In the test adult female rats, weighing about 130 g. are used. The animals are fed fodder and water freely during the test.

*Method of test*

(a) 36 abestos pellets weighing from 29.0 to 31.0 mg. are formed.

(b) 18 rats are divided at random into three groups.

(c) The rats are anaesthetized with ether.

(d) The hair is cut away with a scissors from the two flanks of the animals.

(e) A small incision is made in the skin below the last rib, parallel thereto starting from the long dorsal muscle.

(f) The skin is detached from the underlying tissue with the aid of the rear side of a tweezers and the asbestos pellet is slipped as far as possible under the skin forwardly towards the front leg.

(g) The skin is closed by one or two wound clips.

(h) In the same manner the second pellet is placed on the other side of the animal.

(i) Solutions of 10 mg./ml. of the steroid to be tested and of 10 mg./ml. of hydrocortisone are prepared by dissolving 130 mg. of these substances in a mixture of a few ml. of methylene chloride and 13.0 ml. of arachidic oil and evaporating the methylene chloride in vacuo.

(j) A blank arachidic oil solution is prepared in the following manner: A few ml. of methylene chloride are introduced into a round-bottom bulb. Add 13.0 ml. of arachidic oil and evaporate the methylene chloride in vacuo.

(k) The animals in one group are injected subcutaneously twice a day for 5 days starting one hour after the implantation of the asbestos pellet with 0.2 ml. of the oil solution of the steroid tested and the second group in the same manner is injected with the hydrocortisone solution.

(l) On the sixth day the animals are killed by chloroform. The pellets, having a granulation tissue grown around them, are prepared and weighed (wet weight).

(m) The pellets are dried overnight at 60° C. and weighed again (dry weight).

*Literature.*—Dorfman, R. J., Oleson, J. J.: Triamcinolone Diacetate, April 1957. Meier, R., Schuler W.: Experienta 6, 469 (1950).

*Glucocorticoidal action of steroids (Procedure 313)*

*Principle of tests.*—Animals without adrenal glands are not capable of storing glycogen in the liver.

After the administration of a steroid with glucocorticoidal action the power of glycogen accumulation is restored.

*Animals employed in test.*—In this test adult male or female rats of 130 to 160 g. are used. After the adrenalectomy the animals have fodder and water with an addition of 1% of NaCl freely at their disposal.

On the morning of the 4th day after the adrenalectomy the fodder is removed; on the morning of the 5th day (= the test day) the water is also removed.

*Pretreatment to adrenalectomy.*—Under either anaesthesia the adrenal glands are removed on both sides. The incision on the muscular tissue is closed by yarn; the skin incision is closed by a wound clip. The test proper starts on the 5th day after this operation.

*Method of test*

(a) The rats are divided by means of a random allocation into three cages, 6 animals per cage.

(b) A standard solution of glucose is made by weighing 10 mg. and filling up with distilled water to 10 mls. (concentration 1 mg./ml.).

(c) A standard solution of hydrocortisone in arachidic oil is made according to the following procedure. Weigh 20 mg. of hydrocortisone in a round-bottom bulb. Dissolve it in a few mls. of methylene chloride, add by the pipet 10 ml. of arachidic oil and evaporate the methylene chloride (concentration 2 mg./ml.).

(d) A solution of the steroid to be tested is prepared by dissolving 70 mg. in a few ml. of methylene chloride and 7 ml. of arachidic oil and evaporating the methylene chloride in a vacuo thus yielding a concentration of 10 mg./ml.

(e) The animals are injected at once subcutaneously so that a waiting time of 10 minutes is left between the various test groups according to the following procedure:

Cage 1—Arachidic oil, 1 ml. divided over two injection spots.

Cage 2.—Hydrocortisone, 1 ml. divided over two injection spots.

Cage 3—Steroid, 1 ml. divided over two injection spots.

(f) The animals tested are injected after 5 hours with nembutal (40 mg./kg. body weight) with a 10-minute interval also being left between the groups.

(g) When the animals sleep the liver is prepared. As much blood as possible is removed with filter paper. The weight of the liver is determined and the liver is put, as a whole, in a glass stoppered tube containing 10 ml. of KOH 30%. The preparation of the liver (opening of ventral cavity to liver in lye) must not take more than half a minute. Deep anaesthesia and quick operation is required to prevent changes in the glycogen content of the liver (Pabst).

(h) The liver is destroyed by leaving it overnight in the lye or by heating for 30 minutes on a vapor bath.

*Literature.*—Pabst et al.: Endocrinology 1947, vol. 41. Seifter: Arch. of Bioch. 1950, vol. 25, W. M. Allen: J. Chin. Endocrinology 10, 1950, 71.

*Anabolic action of steroids (renotrophic test) (Procedure 314)*

*Principle of the test.*—The anabolic activity becomes manifest in the organism by:

(1) Positive N-balance,
(2) Muscular growth (musculus levator ani test),
(3) Increase in kidney weight.

The renotropic test is based on the latter item. Since all endogenic male hormones have this renotropic activity, castrated animals are taken as a basis.

*Animals employed in the test.*—Adult, castrated, male mice, weight 22 to 28 g. are used. The animals are used a fortnight after castration. During the test fodder and water is freely available.

*Method*

(a) The mice are divided into weight groups with a progression of 1 g.

(b) 4 replications of 6 animals from the weight groups of mice are formed.

(c) The animals of each replication are marked in the same manner.

(d) 6 test groups of 4 animals are formed by random allocation. The individual weights of the mice in each test group are noted.

The actual test is carried out in accordance with Procedure 311.

*Literature.*—Kochakian, C. D.: Am. J. Physiol. 142: 315, 1944. Kochakian, C. D.: C. E. Stettner. Am. J. Phys. 155: 255, 1948.

The results of these tests for representative novel retrosteroids of our invention are shown in the following Table I.

TABLE I

| Compound number | Activities | | | | | | | | | | | | | |
|---|---|---|---|---|---|---|---|---|---|---|---|---|---|---|
| | Par. Progestational | Or. Progestational | Uterotrophic | Anti-uterotrophic | Estrogenic | Anti-estrogenic | Androgenic | Androgenic in ♀ fetus | Anabolic | Renotrophic | Anti-androgenic | Glycogen storage adrenalectomized | Anti-inflam. | |
| 1 | − | − | − | − | − | − | − | | − | + | − | − | − | <thymus, <testes. |
| 2 | + | − | − | − | | | − | | − | + | − | − | | <testes, > adrenals. |
| 3 | + | | | | | | | | | | | | | anti-pituitary. |
| 3A | | | | | | | + | | + | + | | | | ca. retention postive phosphate balance. |
| 4 | − | − | + | + | − | − | + | | − | − | − | − | − | increases libido in male caviae. |
| 4A | + | − | + | + | − | − | + | | − | − | − | − | | |
| 5 | + | + | + | + | − | − | + | | − | − | − | − | | increases libido in male caviae. |
| 5A | − | | + | + | | | − | | − | − | | − | | |
| 6 | − | | + | | | | | | | | | | − | |
| 7 | − | − | + | + | − | − | − | | + | + | + | − | − | anti-endrogenic estrogenic, <adrenals. |
| 8 | − | − | − | − | | | − | | + | + | − | − | | |
| 9 | | | | | | | | | + | + | + | | | <thymus, <ovaries. |
| 10 | − | − | + | + | | | − | | − | − | + | − | | <testes (anti-pituitary). |
| 11 | | | | | | | − | | − | − | − | − | | in comb. with testosterone produces a stronger antipituitary action. |
| 12 | | | − | − | | | − | | + | − | + | − | − | < testes. |
| 12.5 | | | | | | | | | + | − | + | − | | < testes. |
| 13 | − | + | + | + | | | + | | − | + | − | − | | |
| 13A | + | − | + | + | | | + | | + | + | − | − | | |
| 14 | + | + | − | − | | − | + | | + | − | − | | | |
| 14A | + | + | | | − | | + | | | | | − | + | |
| 15 | + | − | | | − | | − | | − | − | − | − | + | diuretic Na/K, diuretic Na↑. |
| 15A | + | + | + | + | − | − | − | | − | − | − | − | | |
| 16 | + | + | + | + | | | + | | − | − | − | − | | |
| 16A | + | + | + | + | − | − | − | | − | − | − | − | | |
| 17 | | | | | | | − | | | | | | | prolonged progestational activity after s.c. inj. |
| 18 | − | − | − | − | | | − | | − | − | − | | | < testes. |
| 19 | | | | | | | − | | − | − | − | | | <prostate. |
| 20 | + | + | − | + | | | − | | − | − | − | − | | |
| 21 | − | | − | − | | | − | | − | − | − | − | − | |
| 22 | − | | | − | − | | | | − | − | − | − | − | Stimulates formation of corpora lutea, antipituitary. |
| 23 | | | | | | | | | | | | + | − | |
| 23A | − | | − | | | | | | | | | | | |
| 24 | − | | − | − | | | + | | + | + | − | − | | ov. inhibition, pit. inhibition. |
| 24A | | | | | | | + | | + | + | − | | | |
| 25 | + | + | + | + | | | − | | − | − | − | | − | |
| 26 | + | − | | | | | − | | − | − | − | − | | |
| 27 | − | | − | − | | | − | | − | − | − | − | − | >testes; pit. stimulating. |
| 28 | | | | | | | + | | + | + | − | | | |
| 28A | | | | | | | + | | + | + | | | | |
| 29 | | | + | + | | | | | | | | | | |
| 30 | − | | − | − | − | + | + | | + | + | − | − | − | no effect in lymph organs. |
| 30A | | | | | | | + | | + | + | | | | <lymph organs. |
| 31 | | | − | + | − | | + | | + | + | − | − | − | no sterility effect on new born rats. |
| 31A | | | + | + | | | + | | + | + | | | | in new born rats produces permanent sterility. |
| 32 | − | | + | + | | | − | | + | + | | | | |
| 32A | | | | | | | + | | + | + | | | | |
| 33 | + | + | + | + | − | − | + | | + | + | − | − | | |
| 33A | + | + | + | + | − | − | + | | + | + | − | | | |
| 33B | + | + | + | + | + | − | + | | + | + | + | | | |
| 34 | − | | | | | | + | | + | + | + | | | pit. inhibition. |
| 34A | + | + | + | + | − | + | + | + | + | + | + | | | pit. inhib. ov. inhibition. |
| 34B | + | + | + | + | + | + | + | + | + | + | + | | | pit. inhib. ov. inhibition. |
| 35 | + | + | + | + | − | − | + | | + | + | + | − | | deciduoma form; ov. inhib. |
| 35A | + | | + | + | − | − | + | | + | + | − | − | − | no deciduoma effect. |
| 35B | + | + | + | + | − | − | + | + | + | + | − | | | deciduoma form; ov. inhib. |
| 36 | + | + | + | + | + | − | − | | − | − | + | | | deciduoma form. |
| 36B | + | + | + | + | + | − | − | | + | − | + | | | |
| 37 | + | + | + | + | − | − | − | | − | − | − | − | − | anti-fertile+Normal steroid−. |
| 37A | + | | + | + | − | − | − | | − | − | − | | | pregnancy maint.+Normal steriod+. deciduoma form−Normal steriod+. |
| 38 | − | − | + | + | − | − | − | | − | | − | − | − | |
| 39 | + | | − | | | | | | | | | | | not mineralo corticoid. |
| 39A | + | | | | | | − | | − | | − | − | − | mineralo corticoid. |
| 40 | + | + | + | + | − | − | − | | − | − | + | − | − | prolonged activity. |
| 40A | + | | + | + | | | | | | | + | | | |
| 41 | | | | | | | − | | − | − | + | − | − | Not thymolytic not catabolic even in tact animal. |
| 41A | − | | | | | | | | | | − | + | + | thymolytic, catabolic. |
| 42 | + | | + | + | | | | | − | | − | | | |
| 42A | − | | | | | | + | | | | − | − | − | |
| 43 | − | | | | | | + | | | | − | | | |
| 44 | + | + | + | + | | | − | | − | − | − | − | − | pit. stimulating <thymus. |
| 44A | + | | | | | | | | | | | | | increases libido in male caviae. |
| 45 | − | | − | + | | | − | | − | − | | − | − | |
| 46 | − | | − | + | − | | | | − | − | − | − | | anti-indogenic estrogenic. |
| 47 | + | | − | + | − | | | | − | − | − | − | | |
| 48 | − | | | | | | | | − | − | − | | | |
| 49 | − | | | | | | | | + | + | − | − | | |
| 50 | + | + | | | | | − | | − | | − | − | | |
| 51 | − | | + | + | | | − | | − | − | − | − | − | Increase in size of prostate in combination with testosterone. |
| 52 | + | + | | | − | − | − | | − | | − | − | | |
| 53 | + | | | | | | | | | | | | | |
| 54 | − | | − | + | | | | | | | | | | |
| 55 | + | + | − | + | | | + | | − | − | | − | | |
| 55A | + | | − | | | | + | | − | − | | | | |
| 56 | − | − | − | + | | | + | | − | − | − | | | pit. inhibition. |

TABLE I—Continued

| Compound number | Activities | | | | | | | | | | | | | |
|---|---|---|---|---|---|---|---|---|---|---|---|---|---|---|
| | Par. Progestational | Or. Progestational | Uterotrophic | Anti-uterotrophic | Estrogenic | Anti-estrogenic | Androgenic | Androgenic in ♀ fetus | Anabolic | Renotrophic | Anti-androgenic | Glycogen storage adrenalectomized | Anti-inflam. | |
| 57 | + | + | + | + | | | − | | − | | | | | |
| 58 | | | | | | | | | | | + | | | |
| 59 | + | + | + | − | | | | | − | − | + | − | − | |
| 60 | | | | | | | | | | | | | | |
| 60A | | | | | | | + | | | + | + | | | |
| 61 | + | − | + | + | − | − | + | | | | | | | increases libido in caviae. |
| 61A | + | + | − | | | | | | | | | | | |
| 62 | + | + | + | + | | | | | + | | | | | increases libido in caviae. >testes pit. stimulating. |
| 62A | + | − | | | | | | | + | | | | | |
| 63 | | | − | − | | | − | | − | − | − | − | − | <testes. |
| 64 | | | + | − | | | − | | | | | | | |
| 65 | + | + | − | + | | | − | | | + | | | − | |
| 66 | − | | | | | | | | | | | | | |
| 67 | | | − | + | | | | | | | − | | | |
| 68 | | + | + | + | | | | | | | | | | |
| 69 | | + | + | + | | | | | | | | | | |
| 70 | | + | + | + | | | − | | − | | − | − | − | |
| 71 | + | + | + | + | − | − | − | | − | | − | | − | |
| 71A | + | − | + | + | | | | | | | | | | |

The terms employed in Table I which are not clearly obvious have the following definitions:

Par. Progestational—parenteral progestational;
Or. Progestational—oral progestational;
♀ fetus—female fetus;
Glycogen storage in Adrenalectomized
— corticoid activity by glycogin storage in liver of adrenalectomized rats;
Anti-inflam—anti-inflammatory;
< thymus—decreases weight of thymus;
< testes—decreases weight of testes;
> testes—increases weight of testes;
> adrenals—increases weight of adrenals;
anti-pituitary—decreases weight of target glands;
anti-endogenic estrogenic—antagonizes production or the effect of estrogens produced by the body but does not antagonize estrogens which are introduced from the outside, for example by injection;
< ovaries—decreases weight of ovaries;
in comb. with testosterone produces a stronger anti-pituitary action—the compound shows a stronger anti-pituitary action if combined with testosterone;
diuretic—Na↑—diuretic with an increase of the Na/K ratio;
diuretic Na/K—diuretic with no increase in the Na/K ratio;
< prostate—decreases weight of prostate;
pit. inhibition—target organs (testes, ovaries, etc.) of the trophic hormones are significantly smaller than non-treated animals;
pit. stimulating—effect on pituitary opposite to that of pituitary inhibition;
ov. inhibition—inhibits activities of ovaries;
> testes—increases weight of testes;
< lymph organs—decreases weight of lymph organs;
deciduoma form—deciduoma formation;
anti-fertile in rats—has an anti-fertility effect in rats;
pregnancy maint.—tends to maintain pregnancy when given to pregnant rats;
increase in prostate in comb. with testosterone—increases weight of the prostate gland when combined with testosterone;
+—significantly positive activity;
——no activity.

The chemical names of the compounds whose activities are shown in Table I are listed in the following Table II.

TABLE II.—NAMES OF COMPOUNDS IN TABLE I

| Compound No. | Name of Compound |
|---|---|
| 1 | 9β,10α-androst-4-ene-3ξ, 17β-diol. |
| 2 | 9β,10α-androsta-1,4-dien-17β-ol-3-one. |
| 3 | 17α-methyl-9β,10α-androsta-1, 4-dien-17-ol-3-one. |
| 4 | 9β,10α-pregna-1,4-diene-3,20-dione. |
| 5 | 17α-acetoxy-9β,10α-pregna-1,4-diene-3,20-dione. |
| 6 | 9β,10α-androsta-4,6-diene-3,17-dione. |
| 7 | 9β,10α-androsta-4,6-dien-17β-ol-3-one. |
| 8 | 9β,10α-androsta-4,6-dien-17β-ol-3-one 17-acetate. |
| 9 | 9β,10α-androsta-4,6-dien-17β-ol-3-one 17-phenylpropionate. |
| 10 | 9β,10α-androsta-4,6-dien-17β-ol-3-one 17-propionate. |
| 11 | 9β,10α-androsta-4,6-dien-17β-ol-3-one 17-hexyloxyphenylpropionate. |
| 12 | 9β,10α-androsta-4,6-dien-17β-ol-3-one 17-hemisuccinate. |
| 12.5 | 9β,10α-androsta-4,6-dien-17β-ol-3-one 17-hemisuccinate Na-salt. |
| 13 | 17α-ethynyl-9β,10α-androsta-4,6-dien-17-ol-3-one. |
| 14 | 9β,10α-pregna-4,6-diene-3,20-dione. |
| 15 | 21-acetoxy-9β,10α-pregna-4,6-diene-3,20-dione. |
| 16 | 17α-acetoxy-9β,10α-pregna-4,6-diene-3,20-dione. |
| 17 | 17α-hydroxy-9β,10α-pregna-4,6-diene-3,20-dione 17-caproate. |
| 18 | 17α,21-dihydroxy-9β,10α-pregna-4,6-diene-3,20-dione 21-acetate. |
| 19 | 9β,10α-bisnorchola-4,6,dien-3-on-22-ol. |
| 20 | 9β,10α-pregna-4,6-dien-20ξ-ol-3-one (A-isomer). |
| 21 | 9β,10α-pregna-4,6-dien-20ξ-ol-3-one (B-isomer). |
| 22 | 9β,10α-pregna-1,4,6-triene-3,20-dione. |
| 23 | 11α,17α,21-trihydroxy-9β,10α-pregn-4-ene-3,20-dione. |
| 24 | 3,17β-diacetoxy-9β,10α-androsta-3,5-diene. |
| 25 | 3-acetoxy-9β,10α-pregna-3,5-dien-20-one. |
| 26 | 3,17α-diacetoxy-9β,10α-pregna-3,5-dien-20-one. |
| 27 | 9β,10α-pregna-5,7-dien-3β-ol-20-one. |
| 28 | 2β-methyl-9β,10α-androst-4-en-17β-ol-3-one. |
| 29 | 2β-methyl-9β,10α-pregn-4-ene-3,20-dione. |
| 30 | 9β,10α-androst-4-ene-3,17-dione. |
| 31 | 9β,10α-androst-4-en-17β-ol-3-one 17-propionate. |
| 32 | 9β,10α-androst-4-en-17β-ol-3-one 17-p-hexyloxy-phenylpropionate. |
| 33 | 17α-vinyl-9β,10α-androst-4-en-17β-ol-3-one. |
| 34 | 17α-ethynyl-9β,10α-androst-4-en-17-ol-3-one. |
| 35 | 17α-(2'-methallyl)-9β,10α-androst-4-en-17-ol-3-one. |
| 36 | 17α-allyl-9β,10α-androst-4-en-17-ol-3-one. |
| 37 | 9β,10α-pregn-4-ene-3,20-dione. |
| 38 | 21-fluoro-9β,10α-pregn-4-ene-3,20-dione. |
| 39 | 21-acetoxy-9β,10α-pregn-4-ene-3,20-dione. |
| 40 | 9β,10α-pregn-4-en-17α-ol-3,20-dione 17-caproate. |
| 41 | 17α,21-dihydroxy-9β,10α-pregn-4-ene-3,20-dione 21-acetate. |
| 42 | 9β,10α-pregn-4-en-20ξ-ol-3-one. |
| 43 | 17α-ethyl-5ξ,9β,10α-androstan 17-ol-3-one (B-isomer). |
| 44 | 6α-fluoro-17α-hydroxy-9β,10α-pregn-4-ene-3,20-dione 17-acetate. |
| 45 | 7ξ-methyl-9β,10α-androst-4-ene-3,17-dione. |
| 46 | 7ξ-methyl-9β,10α-androst-4-en-17β-ol-3-one. |
| 47 | 7ξ-methyl-9β,10α-pregn-4-ene-3,20-dione. |
| 48 | 9β,10α-androsta-4,6-diene-3ξ,17β-diol. |
| 49 | 5ξ,9β,10α-androstane-3ξ,17β-diol. |
| 50 | 6-methoxy-9β-10α-pregna-4,6-dien-17α-ol-3,20-dione 17-acetate. |
| 51 | 3-ethoxy-9β,10α-pregna-3,5,7-trien-20-one. |
| 52 | 3,17α-diacetoxy-9β,10α-pregna-3,5,7-trien-20-one. |
| 53 | 4-bromo-9β,10α-pregna-4,6-diene-3,20-dione. |
| 54 | 6ξ-bromo-9β,10α-pregn-4-ene-3,20-dione. |
| 55 | 6ξ-chloro-9β,10α-pregn-4-ene-3,20-dione. |
| 56 | 7ξ-methyl-9β,10α-androst-4-ene-3ξ,17β-diol. |
| 57 | 6-chloro-9β,10α-pregna-4,6-diene-3,20-dione. |
| 58 | 6β-acetoxy-9β,10α-androst-4-en-17β-ol-3-one 17-acetate. |

TABLE II—Continued

| Compound No. | Name of Compound |
|---|---|
| 59 | 2β-fluoro-9β,10α-pregna-4,6-dien-17α-ol-3,20-dione 17-acetate. |
| 60 | 6β-fluoro-9β,10α-androst-4-en-17β-ol-3-one 17-acetate. |
| 61 | 6β-fluoro-9β,10α-pregna-4-ene-3,20-dione. |
| 62 | 6β-fluoro-9β,10α-pregn-4-en-17α-ol-3,20-dione 17-acetate. |
| 63 | 4,4-dimethyl-9β,10α-androst-5-en-17β-ol-3-one. |
| 64 | 2ξ-methyl-9β,10α-pregna-4,6-dien-3,20-dione. |
| 65 | 9β,10α-pregna-4,16-dien-3,20-dione. |
| 66 | 2-hydroxy methylene-9β,10α-androst-4-en-17β-ol-3-one. |
| 67 | 9β,10α-androst-4-en-17β-ol. |
| 68 | 17α-methyl-9β,10α-androst-4-en-17-ol. |
| 69 | 17α-ethynyl-9β,10α-androst-4-en-17-ol. |
| 70 | 6β-fluoro-9β,10α-pregna-1,4-diene-3,20-dione. |
| 71 | 17α-acetoxy-9β,10α-pregn-4-ene-3,20-dione. |

Compounds 3A, 4A, 5A, 13A, 14A, 15A, 16A, 23A, 24A, 28A, 30A, 31A, 32A, 33A, 34A, 37A, 39A, 40A, 41A, 42A, 44A, 55A, 60A, 61A, 62A and 71A are the corresponding normal i.e. 10β, 9a steroids, Compounds designated as 33B, 34B, 35B and 36B are the corresponding 19 nor normal steroids.

While we have described our invention in connection with specific embodiments and applications, other modifications thereof will be readily apparent to those skilled in this art without departing from the spirit and scope of the invention as defined in the appended claims.

What we claim is:

1. A 10α methyl 9β, 8β, 13β, 14α hormonal steriod of the pregnane series having more than 19 carbon atoms in the molecule, a halogen free $C_3$ position on the steroid nucleus and wherein the substituent attached to the $C_{17}$ carbon atom of the steroid nucleus in the β position is

wherein R' is selected from the group consisting of monohydroxy substituted methyl and acyloxy substituted methyl.

2. The steroid of claim 1 wherein the substituent attached to the $C_{17}$ carbon atom of the steroid nucleus in the α position is OR wherein each R is independently selected from the group consisting of hydrogen and acyl.

3. The steroid of claim 2 wherein hydroxy is attached to the $C_{11}$ carbon atom of the steroid nucleus.

4. The steroid of claim 2 wherein oxo is attached to the $C_{11}$ carbon atom of the steroid nucleus.

5. 11α, 17α, 21-trihydroxy-retro-pregn-4-ene-3,20-dione.

6. 17α,21-dihydroxy-retro-pregn-4-ene-3, 20-dione 21-acetate.

References Cited

Shoppee: "Chemistry of the Steroids" (1958) Butterworth Scientific Publication London, pages 198–201.

ELBERT L. ROBERTS, *Primary Examiner.*

LEWIS GOTTS, *Examiner.*